(12) United States Patent
Mallinson

(10) Patent No.: US 10,241,573 B2
(45) Date of Patent: Mar. 26, 2019

(54) SIGNAL GENERATION AND DETECTOR SYSTEMS AND METHODS FOR DETERMINING POSITIONS OF FINGERS OF A USER

(71) Applicant: Sony Interactive Entertainment Inc., Tokyo (JP)

(72) Inventor: Dominic Mallinson, Redwood City, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 15/644,013

(22) Filed: Jul. 7, 2017

(65) Prior Publication Data

US 2017/0308166 A1   Oct. 26, 2017

Related U.S. Application Data

(63) Continuation of application No. 14/587,761, filed on Dec. 31, 2014, now Pat. No. 9,746,921.

(51) Int. Cl.
*A63F 13/21* (2014.01)
*G06F 3/01* (2006.01)
(Continued)

(52) U.S. Cl.
CPC ............ *G06F 3/014* (2013.01); *A63F 13/212* (2014.09); *A63F 13/213* (2014.09); *A63F 13/235* (2014.09); *A63F 13/24* (2014.09); *A63F 13/285* (2014.09); *A63F 13/5255* (2014.09); *A63F 13/825* (2014.09); *A63F 13/98* (2014.09); *G02B 27/017* (2013.01); *G06F 1/163* (2013.01); *G06F 3/011* (2013.01); *G06F 3/016* (2013.01); *G06F 3/017* (2013.01); *G06F 3/0304* (2013.01); *G09G 5/18* (2013.01); *G02B 2027/014* (2013.01); *G02B 2027/0178* (2013.01); *G02B 2027/0187* (2013.01); *G06F 2203/0331* (2013.01); *G09G 2330/00* (2013.01)

(58) Field of Classification Search
CPC ..................................................... A63F 13/21
See application file for complete search history.

(56) References Cited

U.S. PATENT DOCUMENTS

| 5,495,576 A | 2/1996 | Ritchey |
| 8,323,106 B2 | 12/2012 | Zalewski |

(Continued)

FOREIGN PATENT DOCUMENTS

| JP | 2000029619 A | 1/2000 |
| JP | 2012503244 A | 2/2012 |

OTHER PUBLICATIONS

CN2015800719864, Search Report, State Intellectual Property Office of the People's Republic of China, Beijing, China, dated Feb. 6, 2018.

*Primary Examiner* — Omkar Deodhar
(74) *Attorney, Agent, or Firm* — Penilla IP, APC

(57) ABSTRACT

A method for determining positions of fingers of a user is described. The method includes transmitting a power signal from a head mounted display (HMD) to provide power to a plurality of light emitters. The light emitters emit light in a sequence upon receiving the power signal. The method includes using the light emitted by the light emitters to determine a plurality of positions of the light emitters. The positions are used to play a game using the HMD.

18 Claims, 40 Drawing Sheets

(51) Int. Cl.
*G02B 27/01* (2006.01)
*G09G 5/18* (2006.01)
*G06F 3/03* (2006.01)
*A63F 13/212* (2014.01)
*A63F 13/285* (2014.01)
*A63F 13/213* (2014.01)
*A63F 13/825* (2014.01)
*A63F 13/24* (2014.01)
*A63F 13/5255* (2014.01)
*A63F 13/235* (2014.01)
*A63F 13/98* (2014.01)
*G06F 1/16* (2006.01)

(56) References Cited

U.S. PATENT DOCUMENTS

| | | |
|---|---|---|
| 8,784,203 B2 | 7/2014 | Zalewski |
| 2008/0261693 A1 | 10/2008 | Zalewski |
| 2013/0002038 A1* | 1/2013 | Lee .......................... H02J 7/00 307/104 |
| 2013/0002550 A1 | 1/2013 | Zalewski |
| 2013/0267318 A1 | 10/2013 | Pryor et al. |
| 2014/0364209 A1* | 12/2014 | Perry ..................... G06F 3/013 463/31 |
| 2014/0364212 A1* | 12/2014 | Osman .................. A63F 13/213 463/31 |

\* cited by examiner

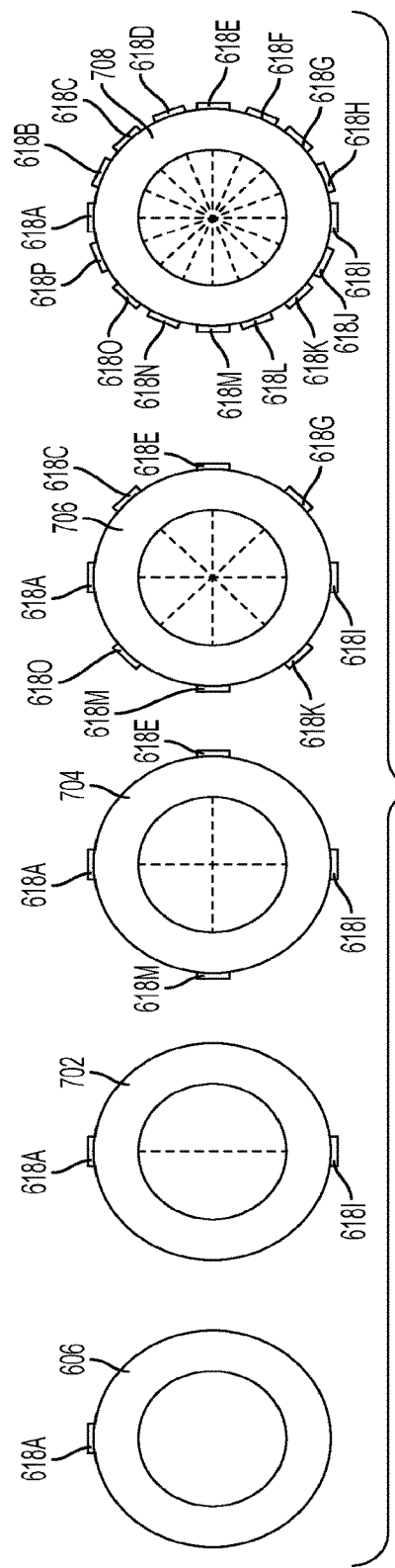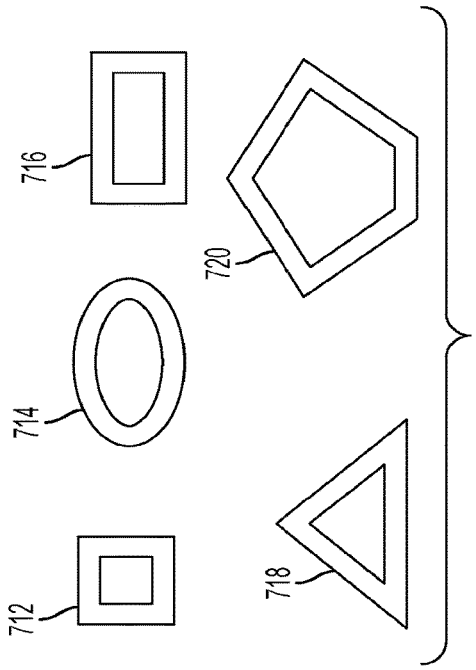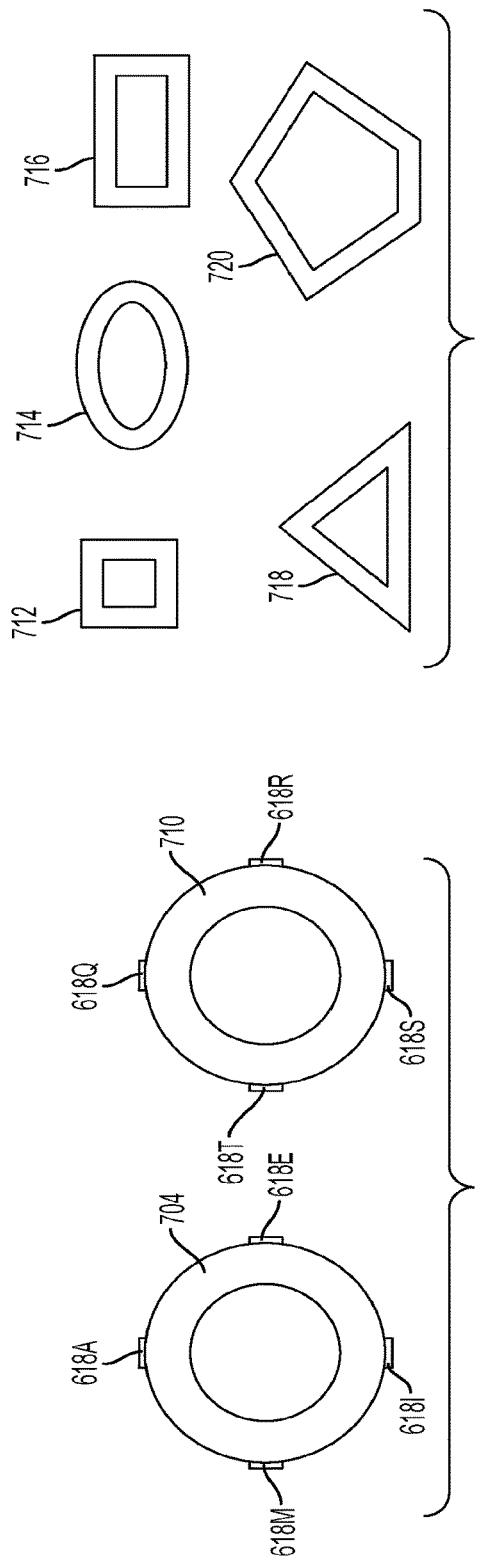
FIG. 7A
FIG. 7B
FIG. 7C

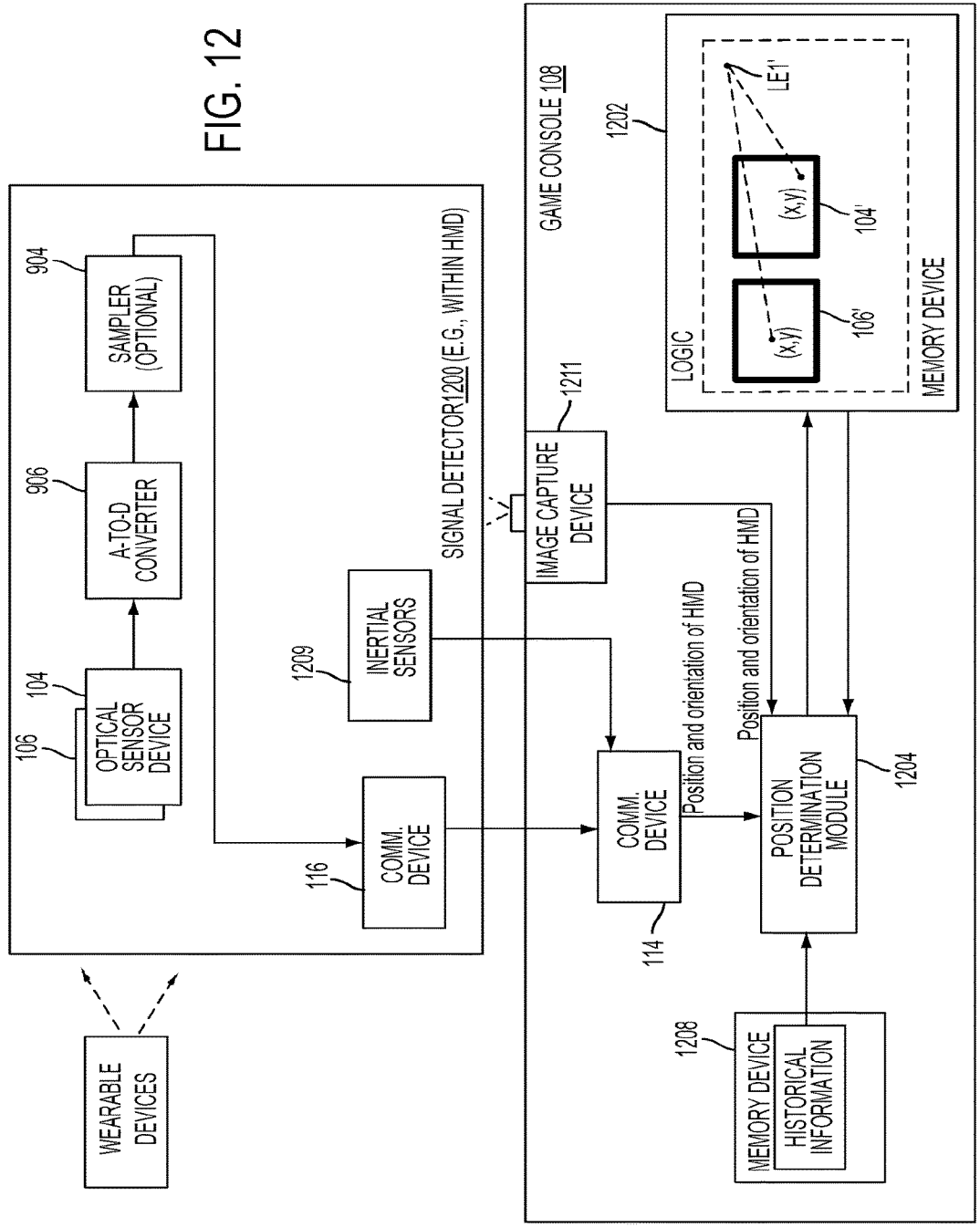

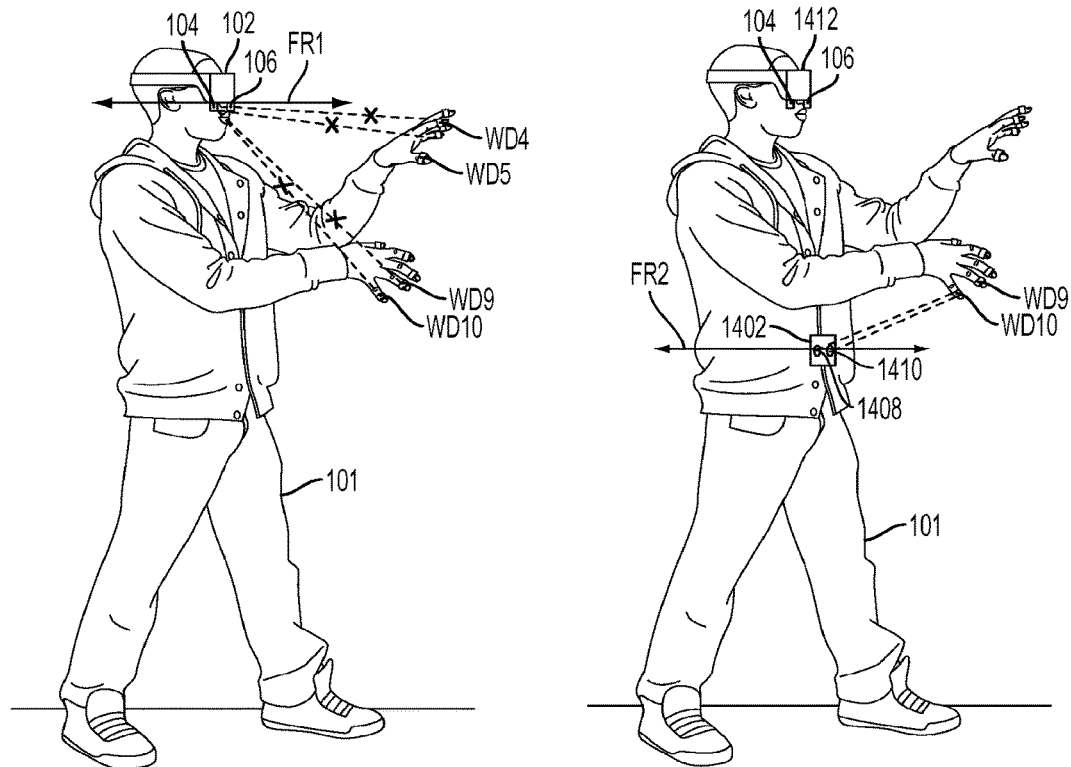
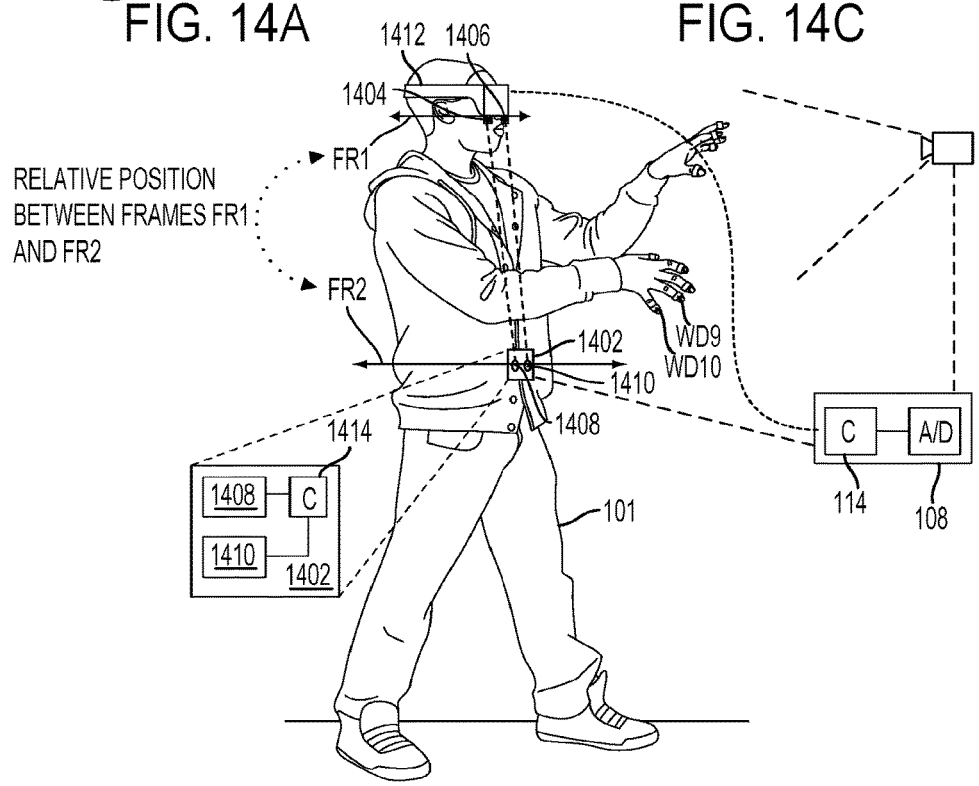
FIG. 14A
FIG. 14C
FIG. 14B

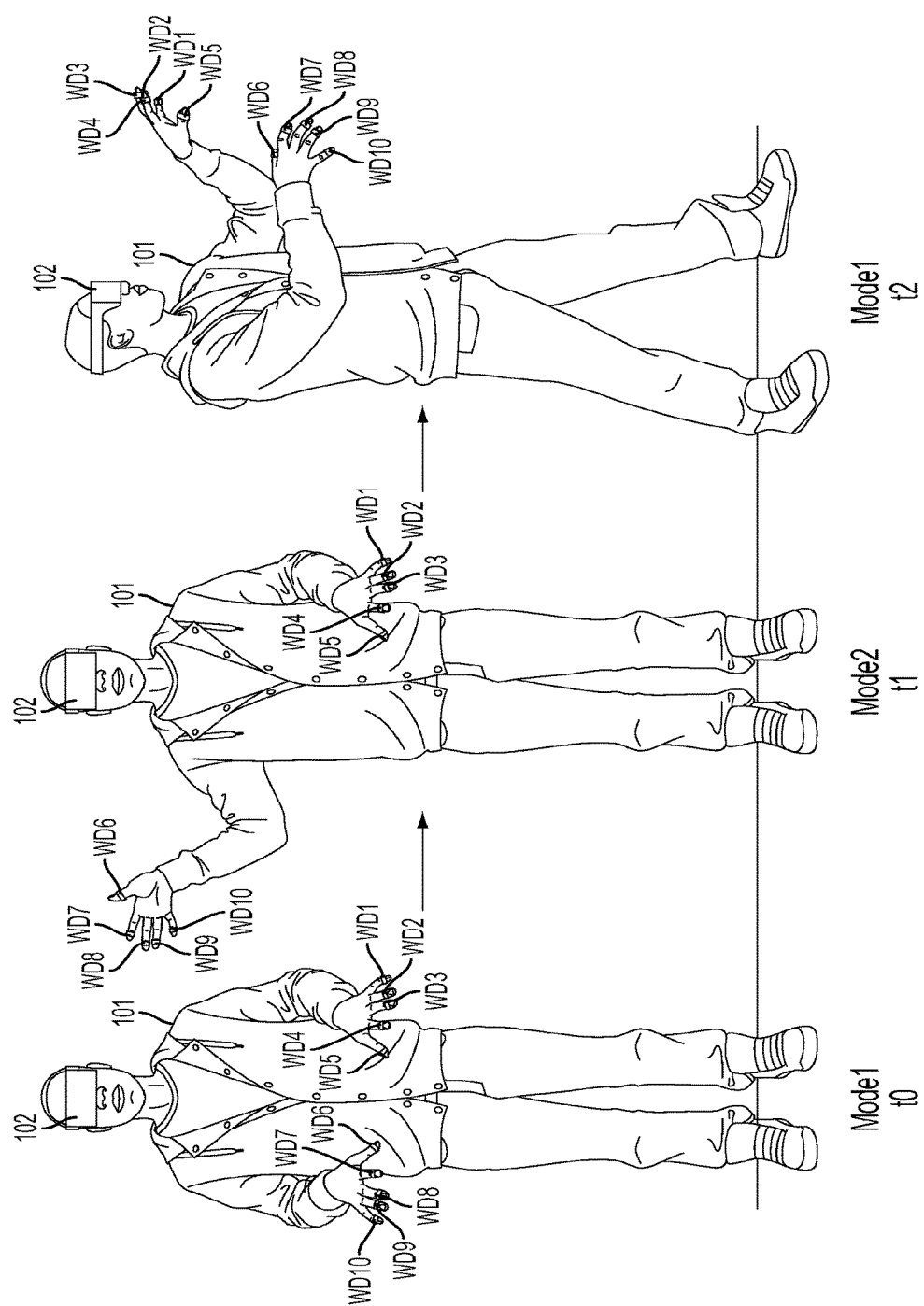

TIME →

| | | | | | | | | | |
|---|---|---|---|---|---|---|---|---|---|
| SEQUENCE 1 | 1 | 2 | 3 | 4 | 5 | 6 | 7 | 8 | 9 | 10 |
| SEQUENCE 2 | 10 | 9 | 8 | 7 | 6 | 5 | 4 | 3 | 2 | 1 |
| SEQUENCE 3 | 5 | 4 | 3 | 2 | 1 | 6 | 7 | 8 | 9 | 10 |
| SEQUENCE 4 | 1 | 6 | 2 | 7 | 3 | 8 | 4 | 9 | 5 | 10 |
| SEQUENCE 5 | 6 | 1 | 7 | 2 | 8 | 3 | 9 | 4 | 10 | 5 |

FIG. 19

SIGNAL GENERATION AND DETECTOR SYSTEMS AND METHODS FOR DETERMINING POSITIONS OF FINGERS OF A USER

CLAIM OF PRIORITY

The present patent application is a continuation of and claims the benefit of and priority, under 35 U.S.C. § 120, to U.S. nonprovisional patent application Ser. No. 14/587,761, filed on Dec. 31, 2014, and titled "SIGNAL GENERATION AND DETECTOR SYSTEMS AND METHODS FOR DETERMINING POSITIONS OF FINGER OF A USER", which is incorporated by reference herein in its entirety.

FIELD

The present disclosure relates to signal generation and detector systems and methods for determining positions of fingers of a user.

BACKGROUND

A variety of devices have been developed for game play. For example, various gaming companies have created gaming consoles to provide a user with a unique gaming experience. To illustrate, the user can play war games, kungfu games, dancing games, etc.

Some gaming companies have developed a display device that goes over a head of the user and provides the user with a display of a game. The user feels as if he/she is in a game during use of such display device to play the game.

However, some gaming devices lack accuracy and are expensive.

SUMMARY

Embodiments of the present disclosure provide signal generation and detector systems and methods for determining positions of fingers of a user.

Other aspects of the present disclosure will become apparent from the following detailed description, taken in conjunction with the accompanying drawings, illustrating by way of example the principles of embodiments described in the present disclosure.

In some embodiments, the present disclosure relates to wearing devices, e.g., rings, patches, bracelets, etc., on fingers that have small infrared (IR) light emitting diodes (LEDs). Light emitted from the IR LEDs is detected using an IR sensor to determine a position of wearable devices in which the IR LEDs are implemented.

Some embodiments of the present disclosure relate to using a very short, very bright pulse of IR light from each wearable device in conjunction with a synchronized sensor that collects IR light over the same period of time as the illumination. For this application, the power used on the wearable devices, e.g., to illuminate an IR LED of a wearable device, etc., is small making a wireless power system practical. It may be possible to use skin as part of a transmission circuit to transmit a power signal wirelessly to the wearable devices.

In various embodiments, resonant inductive coupling is designed specifically for short-range to medium-range distance power transfer. For example, some systems can harvest power directly from existing Wi-Fi signals by inductively coupling of the Wi-Fi signals to a power storage device, e.g., a capacitor plate, a wire, etc.

Since the power is sent wirelessly, in some embodiments, a synchronization signal is also sent. The power and the synch signal are broadcast to all the wearable devices. Each wearable device has an identifier (ID), which determines its illumination timeslot with respect to all other rings (LEDs). For example, the IR sensor samples light at a frequency of 1000 hertz (Hz). In case of 10 LEDs of 10 wearable devices worn on 10 fingers, the 10 LEDs are illuminated in sequence for each 1/1000th second frame, then each LED is effectively sampled at 100 Hz due to this time multiplexed sampling. From a perspective of a sensor, an LED is by far the brightest object when a notch IR filter is used to match a frequency of the IR illumination on the sensor side. Detection of a wearable device becomes easy since there is a single bright point in a view frustum of the sensor at each sample interval. Furthermore, in various embodiments, this bright point is not visible in other sample intervals adding to the confidence of identifying the point.

Examples of the sensor include a camera, e.g., a charge-coupled device (CCD) camera, a complementary metal-oxide-semiconductor (CMOS) camera, etc., or it can be a position sensitive device (PSD). The PSD returns a point, e.g., a centroid, etc., of the light.

Furthermore, in various embodiments, during synchronization, a wearable device whose position is determined is identified with an identification code. The identification code is associated with a wearable device and therefore, with a finger of a user. For example, the user is instructed to wear a wearable device on a particular finger of the user. The instruction is displayed on a display screen of a head-mounted display (HMD) and is generated by a game processor of a game console. In various embodiments, the instruction is provided in an instruction booklet that is provided with the HMD, the game console, and the wearable devices to the user.

In various embodiments, a single sensor is used to determine a two-dimensional (2D) ray from its location to an LED but cannot be used to determine a position of the LED along that ray with respect to a frame of reference. In this case, multiple sensors are used to triangulate a position of a wearable device in a three-dimensional (3D) space. For example, two sensors are mounted on the HMD itself using a baseline of the HMD. This would allow the frame of reference to be tied to the HMD.

However, in several embodiments, the two HMD mounted sensors do not have a line-of-sight from some of the wearable devices due to obstruction by fingers and/or hands of the user as the fingers and/or hands are moved. In these embodiments, additional sensors are used in front of the user pointing back at the torso of the user. For these additional sensors, their reference frames are determined. To get the additional sensor reference frames, two or more time multiplexed pulsed IR LEDs are placed on the HMD. So long as each of the additional sensors has two HMD IR LEDs in its view frustum, the HMD layout is determined to further determine a relative position between the frame of reference of the additional sensors and the HMD's frame of reference.

In some embodiments, with multiple sensors, there may be LEDs on the wearable devices that are occluded or out of view of one or more of the sensors. If the light emitted from the wearable devices is detected by two of the sensors then a reliable relative position of the wearable devices is determined. If more than two sensors detect light from an LED of a wearable device, then a position of the LED is determined more precisely. If, in various embodiments, only a single sensor detects light from an LED, then world knowledge of constraints of the fingers of the user and/or other LEDs that are not obstructed from the single sensor are used to estimate a distance along a ray for the LED in question.

In various embodiments, if an LED is occluded from all sensors, then data, e.g., image capture data, recent position data of the LED, etc., is used to determine a position of the LED.

In some embodiments, the systems and methods described herein are applicable to wearable LED "patches". For example, the LEDs are attached to a glove that is worn on a hand of the user. As another example, the patches are attached to clothing of the user by using Velcro™ or other methods of attachment. As another example, positions of a wrist and an arm of the user are determined when patches are worn on the wrist and the arm. For example, a wearable device includes a wrist band or an arm band.

In several embodiments, a calibration operation is performed. For example, the user is instructed to wear the wearable devices at a distal end of their fingers. In this example, if there is some variation from user to user and/or from one interface session to another interface session, the calibration facilitates reliability in determining positions of fingers of the user. As another example, when LEDs are attached to other parts of a body of the user, e.g., wrist, forearm, etc., the calibration facilitates a determination of relative positions between the other body parts of different users.

In various embodiments, a calibration operation is not needed. For example, in the case of LEDs attached to a glove, no calibration is performed. The glove fits to hands of multiple users.

In several embodiments, a method for tracking hand and finger positions for interfacing with a virtual environment via an HMD interfaced with a game console is described. The method includes transmitting a power signal from the HMD to a plurality of wearable devices associated with a plurality of fingers of a hand of a user wearing the HMD and sequentially transmitting identifiers (IDs) to the plurality of wearable devices. Each ID identifies one of the plurality of wearable devices. Each of the plurality of wearable devices is caused to activate a corresponding light source, such that each of the plurality of wearable devices is active for a time slot and each wearable device repeats being active in respective time slots based on the sequentially transmitted IDs by the HMD. Moreover, for each transmitted ID, the method includes determining a spatial position of at least two optical sensors attached to the HMD and detecting emitted light from one of the plurality of wearable devices using the at least two sensors disposed on the HMD for the detected spatial position. The detecting of emitted light is synchronized to the sequentially transmitted IDs. Also, for each transmitted ID, the method includes sending from the HMD to the game console data for the detected emitted light and the determined spatial position to determine a current position of one of the plurality of wearable devices that is associated with a current position of one of the fingers. The operations of determining a spatial position, detecting emitted light, and sending data for the detected emitted light from the HMD to the game console are repeated for each of the sequentially transmitted IDs so as to identify over time moving positions of the wearable devices.

In some embodiments, a method for tracking hand and finger positions for interfacing with a virtual environment via an HMD is described. The method includes transmitting a power signal from the HMD to a plurality of wearable devices associated with a plurality of fingers of a hand of a user wearing the HMD. The method further includes sequentially transmitting IDs to the plurality of wearable devices. Each ID identifies one of the plurality of wearable devices. Also, each of the plurality of wearable devices is caused to activate a corresponding light source, such that each of the plurality of wearable devices is active for a time slot and each wearable device repeats being active in respective time slots based on the sequentially transmitted IDs by the HMD. The method also includes detecting emitted light from one of the plurality of wearable devices using at least two sensors disposed on the HMD. The operation of detecting of emitted light is synchronized to the sequentially transmitted IDs. The method includes providing data regarding emitted light for determining a position of each of the wearable devices. The position of each of the wearable devices is determined with respect to a reference frame between the at least two sensors of the HMD, such that the position of the each wearable device is associated to a position of one of the fingers. The method includes displaying the hand of the user in the virtual environment. The hand of the user includes the fingers that are displayed based on the determined position.

In a number of embodiments, a method for determining a position of a wearable device is described. The method includes transmitting a power signal from an HMD to provide power to a plurality of wearable devices having a plurality of light emitters. The light emitters emit light in an ordered sequence based on power that is received within the power signal. The ordered sequence being one in which the light emitters repeat multiple sequences of emission of the light and in which each light emitter has a frequency of emission of a portion of the light. The method includes detecting the light emitted by the light emitters to generate electrical signals and providing for analysis data regarding the electrical signals to determine a plurality of positions of the wearable devices. The positions of the wearable devices are used for determining one or more positions of representations of fingers of a hand of a user within an interactive environment that is displayed within the HMD.

In various embodiments, a system for displaying images of an interactive environment is described. The system includes an HMD to be worn on a head of a user. The HMD includes a power source for generating a power signal and a transmitter coupled to the power source for transmitting the power signal towards one or more light emitter devices. The one or more light emitter devices are integrated in corresponding one or more wearable devices. The one or more wearable devices are configured to be worn on one or more body parts of a user. The one or more light emitter devices emit light in a sequence based on the power signal. The HMD further includes a signal detector for sensing at least a portion of the light to generate a plurality of electrical signals. The system further includes a game console coupled to the HMD. The game console includes a position determination module associated with the signal detector for determination of one or more positions of one of the wearable devices from the electrical signals. The HMD also includes a communication device that receives image data from the game console. The image data is generated based on the one or more positions. The HMD includes a display screen for displaying one or more images of based on the image data.

In some embodiments, a light emitter system that is controlled to emit light based on a synchronization signal is described. The light emitter system includes one or more wearable devices for being worn on respective one or more body parts of a user during game play. Each wearable device includes a receiver for receiving a power signal and a synchronization signal from an HMD to generate a demodulated signal. The synchronization signal includes identifiers of the wearable devices. Moreover, each wearable device includes a storage device connected to the receiver for storing a charge generated from the demodulated signal and a light source coupled to the storage device for generating light upon receiving a current signal generated based on the charge. The light source is controlled to emit the light based on the identifiers in the synchronization signal.

Some advantages of the herein described systems and methods include providing an accurate position of fingers of a user during game play. For example, based on light that is emitted by a number of light sources that are worn on fingers of the user and detection of the light by optical sensors that are coupled to an HMD, positions of the fingers are determined. The positions are used to play a game on a display screen of the HMD. A coupling of a light source with a finger of the user facilitates an increase in an accuracy of a position of the finger.

Other advantages of the herein described systems and method include providing an accurate position of a body part, e.g., an elbow, a wrist, etc., of the user during game play. A light source is coupled to the body part and light emitted from the light source is used to determine a position of the body part. The coupling of the light source to the body part facilitates to increase an accuracy of the position of the body part during game play. The position of the body part is used to play a game that is displayed on the HMD.

In some embodiments, the accuracy is increased when light sources emit light sequentially. When the light sources emit light sequentially, optical sensors can distinctly detect each light source on a finger or the body part of the user.

Further advantages of the herein described systems and methods include reducing an expense of playing a game using the HMD. For example, a digital camera that is used to capture an image of the fingers or of the body part is more expensive than light sources and optical sensors. With the use of light sources, there is often no need to use the digital camera and cost of playing a game using the HMD is reduced.

BRIEF DESCRIPTION OF THE DRAWINGS

Various embodiments of the present disclosure are best understood by reference to the following description taken in conjunction with the accompanying drawings in which:

FIG. 7A is a diagram used to illustrate rings having different number of light sources, in accordance with one embodiment of the present disclosure.

FIG. 7B is a diagram of multiple rings to illustrate sequencing of light emission from light sources, in accordance with one embodiment of the present disclosure.

FIG. 7C is a diagram to illustrate rings of different shapes, in accordance with one embodiment of the present disclosure.

FIG. 8A-1 is a diagram of a head mounted display (HMD) to illustrate locations of optical sensors under the HMD, in accordance with one embodiment of the present disclosure.

FIG. 8A-2 is a diagram of the HMD of FIG. 8A-1 to illustrate locations of optical sensors at various positions on a front face and edges of the HMD, in accordance with one embodiment of the present disclosure.

FIG. 10A-1 is a block diagram of a wearable device to illustrate components of the wearable device, in accordance with one embodiment of the present disclosure.

FIG. 10A-2 is a block diagram of a wearable device to illustrate use of a charge sensor in the wearable device, in accordance with one embodiment of the present disclosure.

FIG. 11A-1 is a diagram of a signal generator for illustrating generation of a power signal and a synchronization signal, in accordance with one embodiment of the present disclosure.

FIG. 11A-2 is a diagram of a signal generator for illustrating generation of a synchronization signal to synchronize collection of light by an optical sensor with emission of light by a light source, in accordance with one embodiment of the present disclosure.

FIG. 12 is a diagram of a signal detector for determining a position of wearable devices based on incidence positions of light emitted by light emitters within the wearable devices, in accordance with one embodiment of the present disclosure.

FIG. 14A is used to illustrate occlusion of a wearable device from an optical sensor on the HMD, in accordance with one embodiment of the present disclosure.

FIG. 14B illustrates a torso device to provide a reference frame relative to a reference frame of the HMD, in accordance with one embodiment of the present disclosure.

FIG. 14C is used to illustrate a determination of a position of the occluded wearable device with respect to a reference frame of the HMD, in accordance with one embodiment of the present disclosure.

FIG. 18A is a diagram of various positions of hands of the user to illustrate a change in a sampling rate or a change in a frequency of emission of light by light sources based on positions of wearable devices worn by the user, in accordance with one embodiment of the present disclosure.

FIG. 19 is a diagram to illustrate different sequences of emission of light by light sources worn on fingers of the user, in accordance with one embodiment of the present disclosure.

DETAILED DESCRIPTION

Figure 1:
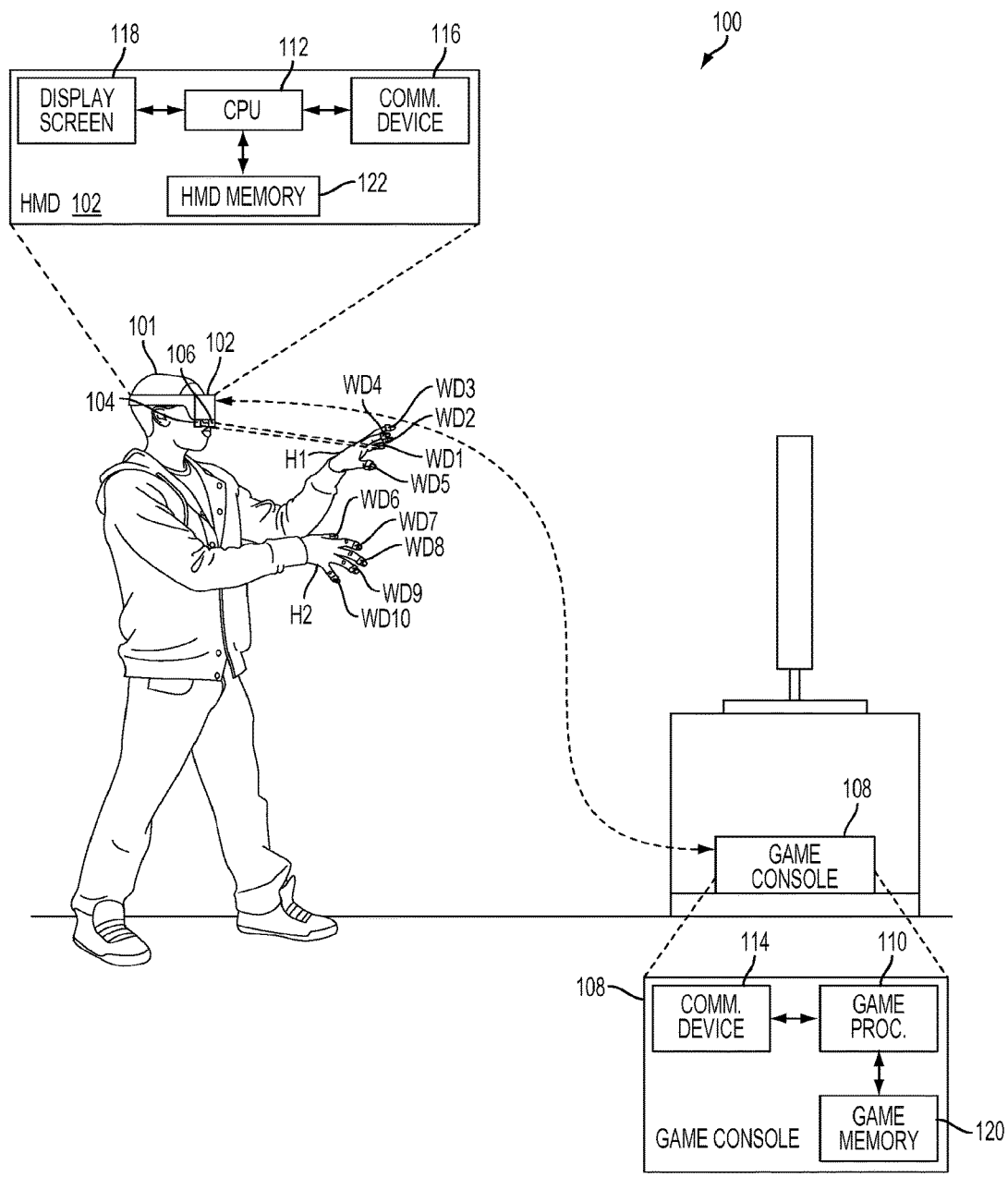
FIG. 1 is diagram of a system for illustrating use of wearable devices on fingers of a user to play a game, in accordance with one embodiment of the present disclosure.

Signal generation and detector systems and methods for determining positions of fingers of a user are described. It should be noted that various embodiments of the present disclosure are practiced without some or all of these specific details. In other instances, well known process operations have not been described in detail in order not to unnecessarily obscure various embodiments of the present disclosure.

In one embodiment, the system includes a computer, a controller, and a display. In various embodiments, the computer is a general purpose computer, a special purpose computer, or other such device which executes an interactive program, e.g., a computer software program, a computer software application, etc., for generating interactive data, which is rendered to display interactive content on a display device. In some embodiments, instead of the computer, a game console is used. Examples of game consoles include those manufactured by Sony Computer Entertainment Inc. or other manufacturers. Examples of the display device include a television, a monitor, a projector display, a head mounted display (HMD), or other such displays and display systems, which are capable of receiving and rendering video output from the computer. A user provides input to the interactive program by moving one or more light sources. The light sources act as a motion controller that enables the user to interface with and provide input to the interactive program by moving the light sources. In some embodiments, the light sources communicate wirelessly with the display device, as this provides for greater freedom of movement of the light sources than a wired connection.

In some embodiments, multiple wearable devices are provided to enhance an interaction of a user with an interactive environment. Example of the wearable devices include rings, patches, bracelets, wrist bands, arm bands, rubber bands, plastic bands, metal bands, etc. Moreover, examples of the interactive environment include a virtual reality environment, a game environment, and an augmented reality environment.

The wearable devices are worn by the user and used in conjunction with a head-mounted display (HMD), which is worn over a head of the user to cover the eyes of the user. The user moves his/her fingers and positions of the fingers are determined to generate corresponding positions of the fingers or another virtual object in the interactive environment, which is displayed on one or more display screens of the HMD. For example, when the user moves his/her finger up, a representation of the finger or a virtual object also move up in the interactive environment. As another example, when the user moves his/her finger by a distance in a real world, a virtual finger of another virtual object moves by a corresponding amount in the interactive environment. Such determination of positions of the fingers of the user provides the user with an indulging and engaging experience in the interactive environment. The user feels as if he/she is in the interactive environment and is actually interacting with the interactive environment. The experience creates an impression in the mind of the user that the interactive environment is real, e.g., exists in the real world.

To facilitate the determination of positions of the fingers, the HMD is fitted with two or a higher number of optical sensors. The optical sensors sense light that is emitted by light sources that are integrated within the wearable devices. The sensed light is used to determine a position of a light source from a reference frame of the optical sensors.

In various embodiments, the system includes one or more cameras, which captures images of the user or of a room in which the user is located. A spatial position and movement of the light sources are then determined through analysis of the images captured by the one or more cameras.

FIG. 1 is diagram of an embodiment of a system 100 for illustrating use of wearable devices WD1, WD2, WD3, WD4, WD5, WD6, WD7, WD8, WD9, and WD10 to play a game, e.g., a two-dimensional game, a three-dimensional game, a single-player game, a multi-player game, etc. An example of each wearable device WD1 thru WD10 includes a ring. A ring, as used herein, is of any shape, e.g., a square shape, a round shape, an elliptical shape, etc. In some embodiments, each wearable device, described herein, is made of a plastic or a metal. The plastic, in various embodiments, is flexible or is non-flexible. Each wearable device, in some embodiments, is transparent, translucent, or opaque. For example, the wearable devices WD1 thru WD10 are made of a transparent flexible plastic material.

Each wearable device is worn on a finger of a user 101. For example, the wearable device WD1 is worn on a baby finger of a left hand H1 of the user 101, the wearable device WD2 is worn on a ring finger of the left hand, the wearable device WD3 is worn on a middle finger of the left hand, the wearable device WD4 is worn on an index finger of the left hand, and the wearable device WD5 is worn on a thumb of the left hand. As another example, the wearable device WD6 is worn on a thumb of a right hand H2 of the user 101, the wearable device WD7 is worn on an index finger of the right hand, the wearable device WD8 is worn on a middle finger of the right hand, the wearable device WD9 is worn on a ring finger of the right hand, and the wearable device WD10 is worn on a baby finger of the right hand.

Each wearable device includes a light source, e.g., a light emitter, a light emitting diode (LED), etc., that generates and emits light. For example, an LED is a pn-junction diode that emits light when provided with electrical energy. An LED emits visible or infrared light. Other examples of a light source include a halogen light source, a light-emitting electrochemical cell (LEC), an electroluminescent wire, etc.

The user 101 is wearing a head mounted display (HMD) 102 on his/her head. The HMD 102 covers eyes of the user 102 and includes a display screen, e.g., an LED display screen, a liquid crystal display (LCD) screen, a plasma display screen, etc., to display images of a game to the user 101. In some embodiments, the HMD 102 includes multiple display screens. In various embodiments, the HMD 102 is an optical head-mounted display (OHMD), which has a capability of projecting images as well as see-through capability.

In some embodiments, the HMD 102 displays a computer-generated image (CGI), e.g., a virtual image, etc. In various embodiments, the HMD 102 displays a real-world image of the real world in front of the user 102 and the real-world image is superimposed on the CGI. A composite image that is generated based on the superimposition is an augmented reality image.

At a bottom surface of the HMD 102 are attached optical sensors 104 and 106. As an example, an optical sensor changes light into an electrical signal. An example of an optical sensor includes a position sensitive device (PSD). A PSD measures a position of a light spot in one or multiple dimensions on a surface of the PSD. The optical sensors 104 and 106 are attached, e.g., connected via magnets, etc., to the bottom surface of the HMD 102. In some embodiments, the optical sensors 104 and 106 are integrated within a body of the HMD 102 and have a portion that is exposed to light.

The system 100 further includes a game console 108, and an optional display device, e.g., a television, a computer screen, etc. The game console 108 includes a game processor 110 that executes a game code, e.g., a game computer program, etc., to facilitate a play of a game by the user 101. In some embodiments, the game code is executed in response to receiving an indication of an action performed, e.g., an input, etc., by the user 101. Examples of the action performed by the user 101 include a selection of a game object, a movement of a finger of the user 101, a movement of a hand of the user 101, a movement of an eye of the user 101, etc. As used herein, a game object is displayed on a display screen of the HMD 102 during play of a game. Examples of a game object include a background environment in a game, an avatar of a game, a number of points during a game, an award for the user 101 during a game, etc.

In various embodiments, the game code is executed as a game routine to reach from one state of a game to another state of the game. In these embodiments, an action performed by the user 101 does not act as a trigger for execution of the game code.

The game code is executed by the game processor 110 of the game console 108 to generate game data, e.g., a position of a game object, a color of the game object, a texture of the game object, a shading of the game object, a number of points won or lost by the user 101 during a play of a game, a shape of the game object, etc. A central processing unit (CPU) 112 of the HMD 102 receives the game data from the game processor 110 via a communication device 114 of the game console 108 and a communication device 116 of the HMD 102. The CPU 112 renders the game data to display a game on one or more display screens 118 of the HMD 102.

As used herein, a processor is an application specific integrated circuit (ASIC), or a programmable logic device (PLD), or a microprocessor, or a microcontroller, or a CPU, etc. Also, a communication device, as used herein, includes a wired communication device that communicates via a wired medium, e.g., one or more physical electrical conductors, etc., with another device or includes wireless communication device that communicates wirelessly with another device. The wired communication device applies a standard, e.g., Ethernet, Institute of Electrical and Electronics Engineers (IEEE) 1394, serial, parallel, radio frequency, Universal Series Bus (USB), etc., to transfer data between two devices. Examples of wireless communication include radio frequency (RF) communication, modulation, demodulation, a wireless data communication, a Wi-Fi communication, a Bluetooth communication, a communication using acoustic energy, a communication using light energy, and a communication using magnetic energy.

During a play of a game, the user 101 moves his/her fingers. With the movement of the fingers of the user 101, the wearable devices WD1 thru WD10 move. The wearable devices WD1 thru WD10 emit light sequentially. For example, the wearable devices WD1 thru WD10 emit light in a forward sequence. To illustrate, the wearable device WD1 emits light first, the wearable device WD2 emits light second, and so on until the wearable device WD10 emits light in a tenth place. As another example, the wearable devices WD1 thru WD10 emit light in a reverse sequence. To illustrate, the wearable device WD10 emits light first, the wearable device WD9 emits light second, and so on until the wearable device WD1 emits light tenth. As yet another example, the wearable devices WD1 thru WD10 emit light in a random sequential order. To illustrate, the wearable device WD5 emits light first, the wearable device WD3 emits light second, the wearable device WD2 emits light third, etc.

In some embodiments, a sequential emission of light by the wearable devices WD1 thru WD10 allows determination of a position of each individual finger of the user 101. For example, it is indicated on a wearable device that the wearable device is to be worn on a certain finger of a certain hand of the user 101. Light emitted from a wearable device is sensed to determine positions of a finger on which the wearable device is worn.

The optical sensors 104 and 106 detect light that is sequentially emitted by the wearable devices WD1 thru WD10 to generate electrical signals. The electrical signals are converted from an analog form into a digital form by an analog-to-digital converter (A-to-D converter) of the HMD 102 to generate digital data, which is processed by an HMD processor (not shown) of the HMD 102 to facilitate determination of positions of the wearable devices WD1 thru WD10.

In some embodiments, instead of the HMD processor determining the positions of the wearable devices WD1 thru WD10, the digital data generated by the A-to-D converter is communicated by the communication device 116 of the HMD 102 to the communication device 114 of the game console 108 for processing by the game processor 110 of the game console 108 to determine positions of the wearable devices WD1 thru WD10.

The positions of the wearable devices WD1 thru WD10 are used to play a game. For example, the game processor 110 of the game console 108 changes positions of game objects, e.g., virtual fingers of the user 101, virtual positions of game objects, etc., of a game that is displayed on the one or more display screens 118 based on the positions of the wearable devices WD1 thru WD10. As another example, the game processor 110 moves a game object in the same direction, e.g., an upward direction, a downward direction, a sideward direction, etc., as that of movement of one of the wearable devices WD1 thru WD10. As yet another example, the game processor 110 displaces a game object by the same distance as that of displacement of one of the wearable devices WD1 thru WD10.

In some embodiments, the user 101 wears any number of wearable devices. For example, the user 101 wears the wearable device WD1, the wearable device WD3, and the wearable device WD5 and does not wear the wearable device WD2 and does not wear the wearable device WD4. As another example, the user 101 wears more than one wearable device on his/her finger. As yet another example, the user 101 wears a wearable device on every alternate finger.

It should be noted that in some embodiments, game data and/or the game code are stored in a game memory device 120 of the game console 120. Game data and/or the game code are accessed from the game memory device 120 by the game processor 108. In various embodiments, game data is stored in an HMD memory device 122 of the HMD 102. Game data is accessed by the CPU 112 from the HMD memory device 122 for display of a game on the one or more display screens 118.

As used herein, a memory device includes a non-transitory computer-readable medium e.g., a read-access memory (RAM), or a read-only memory (ROM), or a combination thereof, etc. Examples of a memory device include a flash memory, a redundant array of storage disks, a hard disk, a magnetic memory, a compact disc, etc.

It should be noted that each wearable device WD1 thru WD10 is worn on any finger of the user 101. For example, the wearable device WD5 is worn on an index finger of the left hand H1 of the user 101 or on a thumb of the right hand H2 of the user 101. As another example, the wearable device WD8 is worn on a thumb of the left hand H1 of the user 101.

Other examples of wearable devices include a wristwatch, a bracelet, a wristband, a rubber band, a metal band, a wrist band, a necklace, a chain, etc.

Figure 2A:
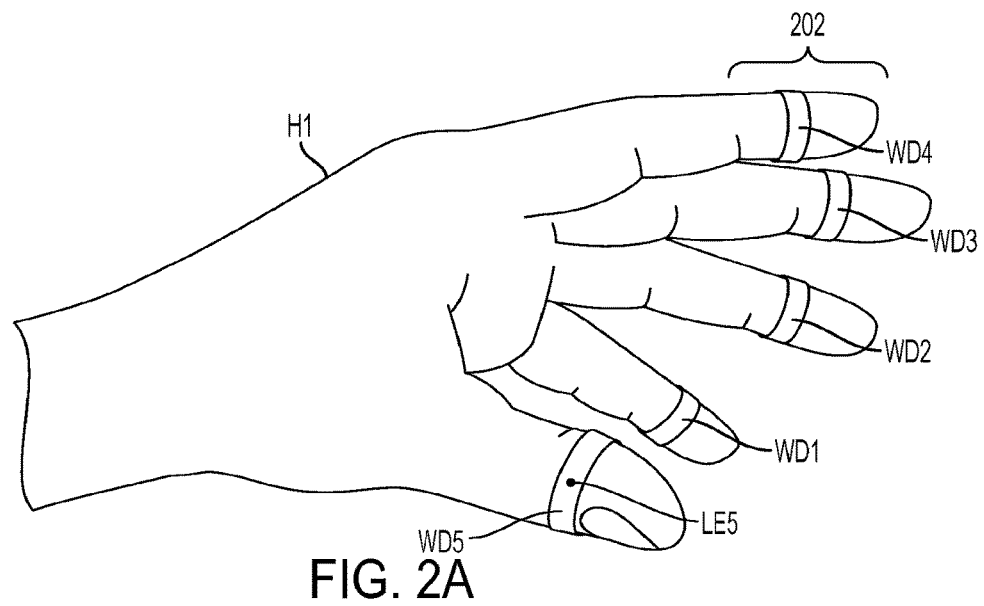
FIG. 2A is a diagram of a left hand of the user to illustrate that the wearable devices are worn on distal ends of fingers of the left hand, in accordance with one embodiment of the present disclosure.

FIG. 2A is a diagram of an embodiment of the left hand of the user 101 (FIG. 1) to illustrate that the wearable devices WD1 thru WD5 are worn on a distal end, e.g., a distal phalanx, etc., of fingers of the left hand. For example, the wearable device WD4 is worn on a distal end 202 of an index finger of the left hand of the user 101. Each finger except for a thumb of the user 101 has three portions, including a proximal portion, a middle portion, and a distal end. The proximal portion, e.g., a proximal phalanx, etc., is connected to the middle portion, e.g., a middle phalanx, etc., by a finger joint, e.g., an interphalangeal joint, etc., and the middle portion is connected to the distal end via another finger joint, e.g., an interphalangeal joint, etc. A thumb of the user 101 has two portions, a proximal portion and a distal end. In some embodiments, a wearable device is worn to surround at least a portion of a distal end of a finger of the user 101. A light source LES that is integrated within the wearable device WD5 is visible on a thumb of the left hand of the user 101.

Figure 2B:
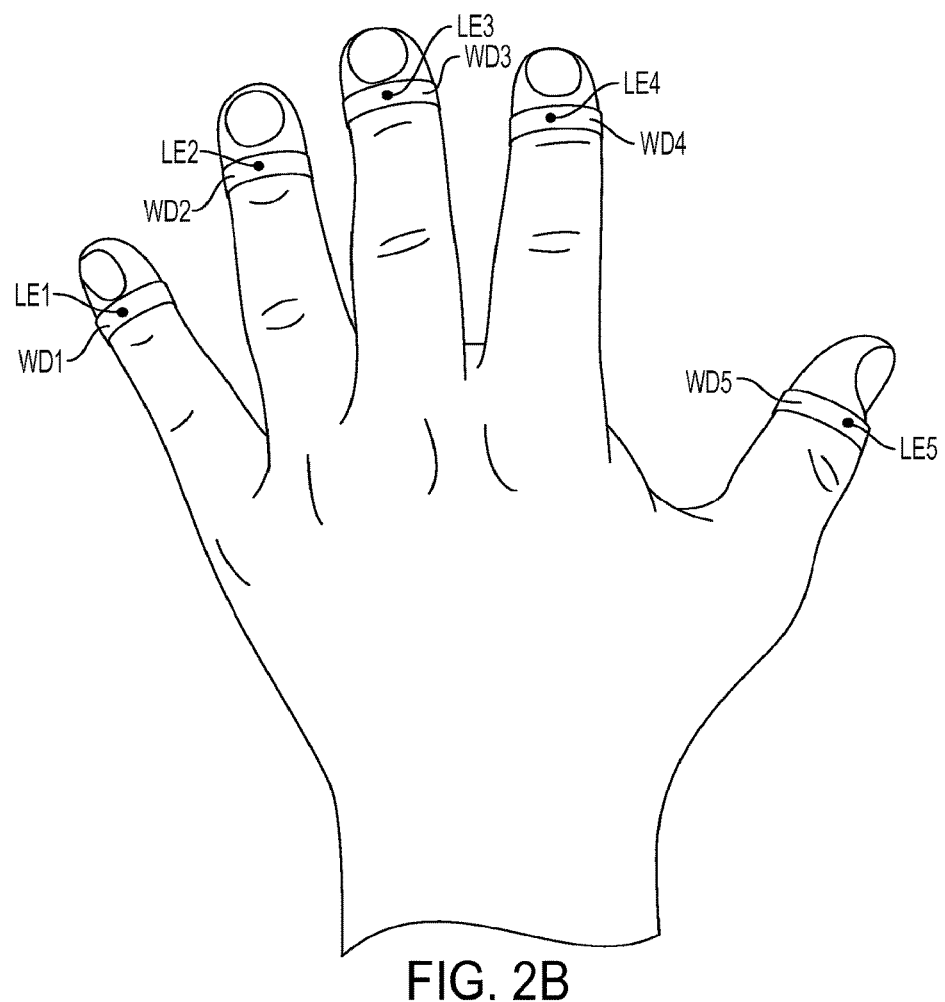
FIG. 2B is a diagram of the left hand of the user to illustrate light sources that are integrated within wearable devices, which are worn on distal ends of the fingers of the left hand of the user, in accordance with one embodiment of the present disclosure.

FIG. 2B is a diagram of an embodiment of the left hand of the user 101 (FIG. 1) to illustrate light sources, e.g., LEs 1 thru 5, etc., that are integrated within wearable devices WD1 thru WD5, which are worn on distal ends of fingers of the user 101. The wearable devices WD1 thru WD5 are worn by the user 110 to facilitate light sources LE1 thru LE5 to be located on a dorsal side of the left hand of the user 101. The location on the dorsal side facilitates access by the optical sensors 104 and 106 (FIG. 1) to light emitted by the light sources LE1 thru LE5. Similarly, a plurality of light sources LE6 thru LE10, which are further described below, are integrated in the wearable devices WD6 thru WD10 and are positioned on the right hand of the user 101 to facilitate access by the optical sensors 104 and 106 to light emitted by the light sources LE6 thru LE10.

Figure 2C:
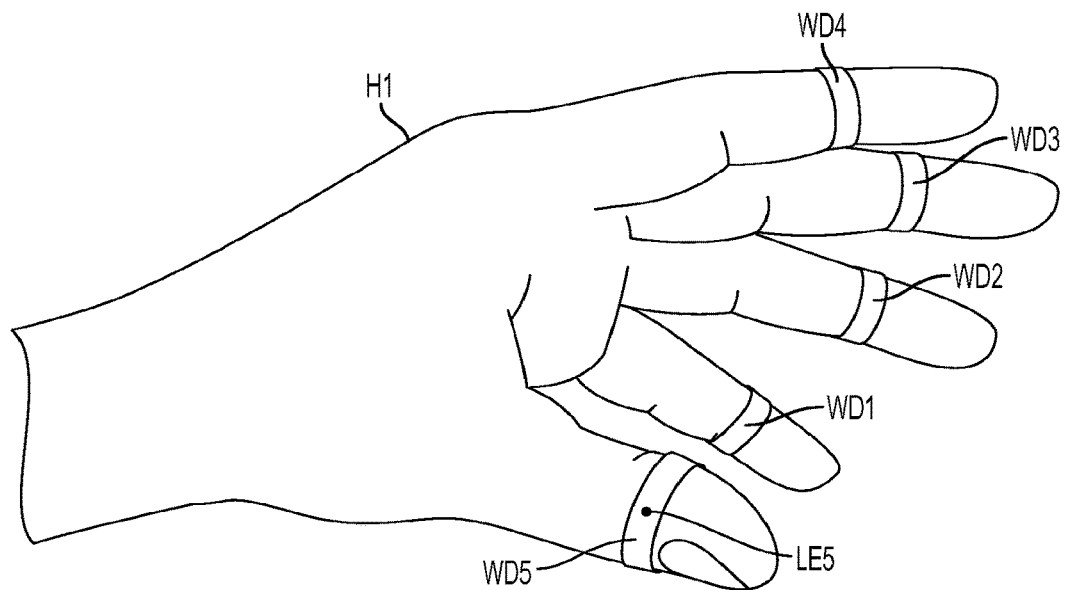
FIG. 2C is a diagram of the left hand of the user to illustrate positioning of wearable devices on finger joints between distal ends and middle portions of corresponding fingers of the user, in accordance with one embodiment of the present disclosure.

FIG. 2C is a diagram of an embodiment of the left hand of the user 101 (FIG. 1) to illustrate positioning of the wearable devices WD1 thru WD5 on finger joints between distal ends and middle portions of corresponding fingers of the user 101. For example, the wearable device WD1 is worn on an interphalangeal joint that connects a distal end of a baby finger of the left hand of the user 101.

Figure 2D:
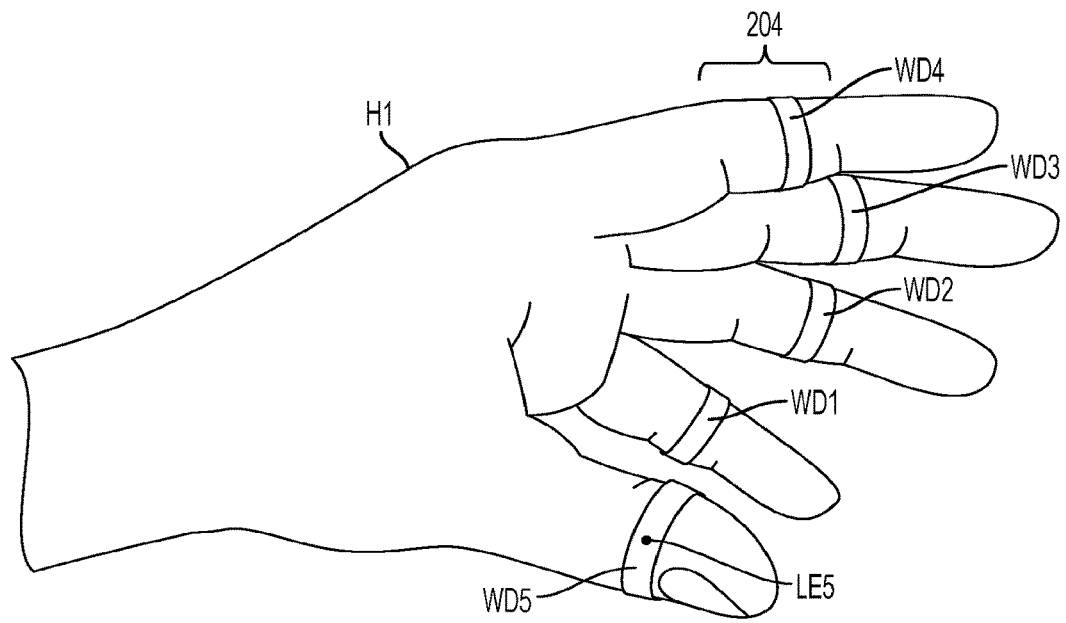
FIG. 2D is a diagram of the left hand of the user to illustrate positioning of the wearable devices on middle portions of corresponding fingers of the user, in accordance with one embodiment of the present disclosure.

FIG. 2D is a diagram of an embodiment of the left hand of the user 101 (FIG. 1) to illustrate positioning of the wearable devices WD1 thru WD5 on middle portions of the corresponding fingers of the user 101. For example, the wearable device WD4 is worn to surround a middle portion 204 of an index finger of the left hand of the user 101 and the wearable device WD3 is worn to surround a middle portion of a middle finger of the left hand of the user 101.

Figure 2E:
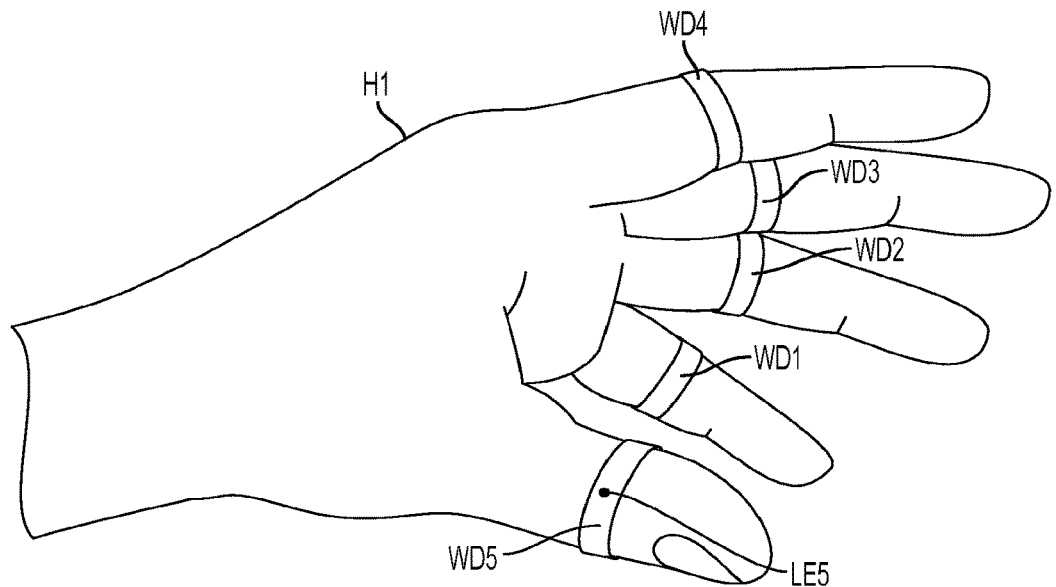
FIG. 2E is a diagram of the left hand of the user to illustrate locations of wearable devices on a finger joint connecting middle portions of corresponding fingers of the left hand of the user and proximal portions of the fingers, in accordance with one embodiment of the present disclosure.

FIG. 2E is a diagram of an embodiment of the left hand of the user 101 (FIG. 1) to illustrate locations of the wearable devices WD1 thru WD5 on a finger joint connecting middle portions of corresponding fingers of the left hand of the user 101 and proximal portions of the fingers. The wearable device WD5 is worn on a thumb of the left hand of the user 101 to be positioned on a finger joint between a distal end of the thumb and a proximal portion of the thumb.

Figure 2F:
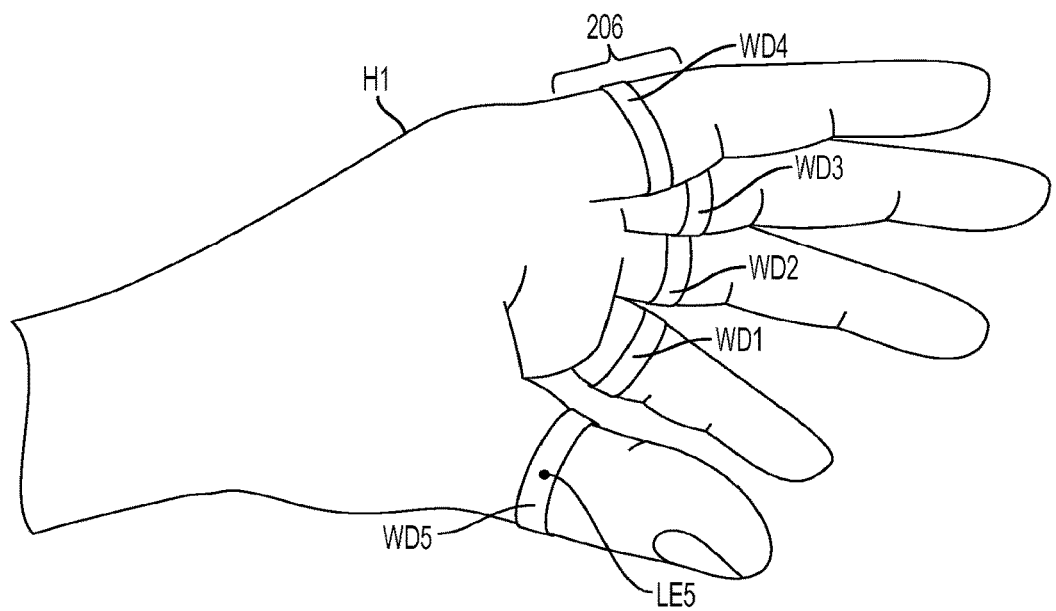
FIG. 2F is a diagram of the left hand of the user to illustrate locations of the wearable devices on proximal portions of fingers of the user, in accordance with one embodiment of the present disclosure.

FIG. 2F is a diagram of an embodiment of the left hand of the user 101 (FIG. 1) to illustrate locations of the wearable devices WD1 thru WD5 on proximal portions of fingers of the user 101. For example, the wearable device WD4 is worn to abut and fit a proximal portion of an index finger of the left hand of the user 101.

Figure 3A:
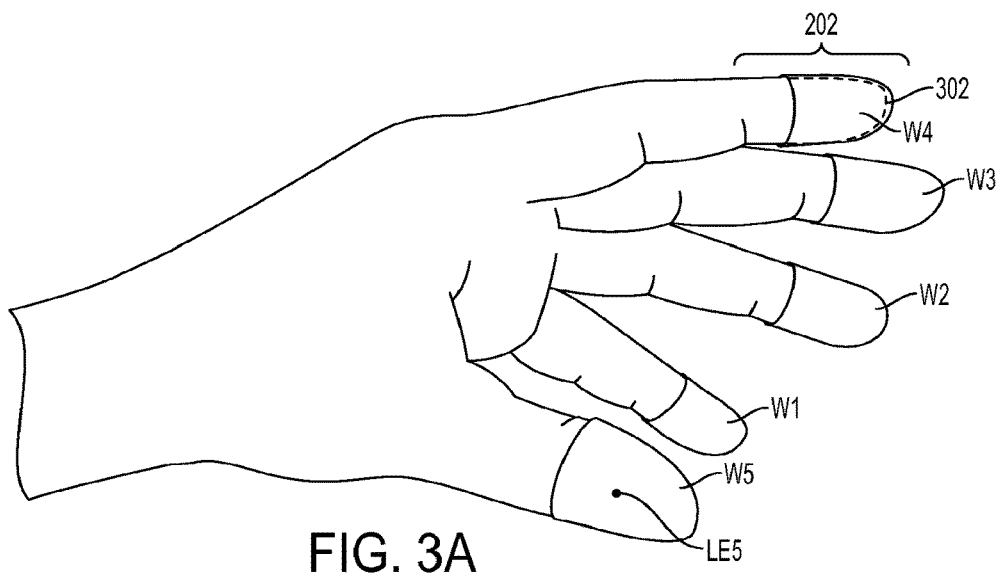
FIG. 3A is a diagram of the left hand of the user to illustrate use of wearable devices that are worn on portions of distal ends of fingers of the left hand of the user, in accordance with one embodiment of the present disclosure.

FIG. 3A is a diagram of an embodiment of the left hand H1 of the user 101 (FIG. 1) to illustrate use of wearable devices W1, W2, W3, W4, and W5 that are worn on portions of distal ends of fingers of the left hand of the user 101 to cover nails of the fingers. For example, the wearable device W4 is worn on at least a portion of the distal end 202 of an index finger of the left hand of the user 101 to cover a tip 302 of the index finger. As another example, the wearable device W4 is worn on at least a portion of the distal end 202 to act as a cap over the portion.

It should be noted that portions of fingers of the right hand of the user 101 are also covered with similar wearable devices, e.g., similar to the wearable devices W1 thru W5, etc.

Figure 3B:
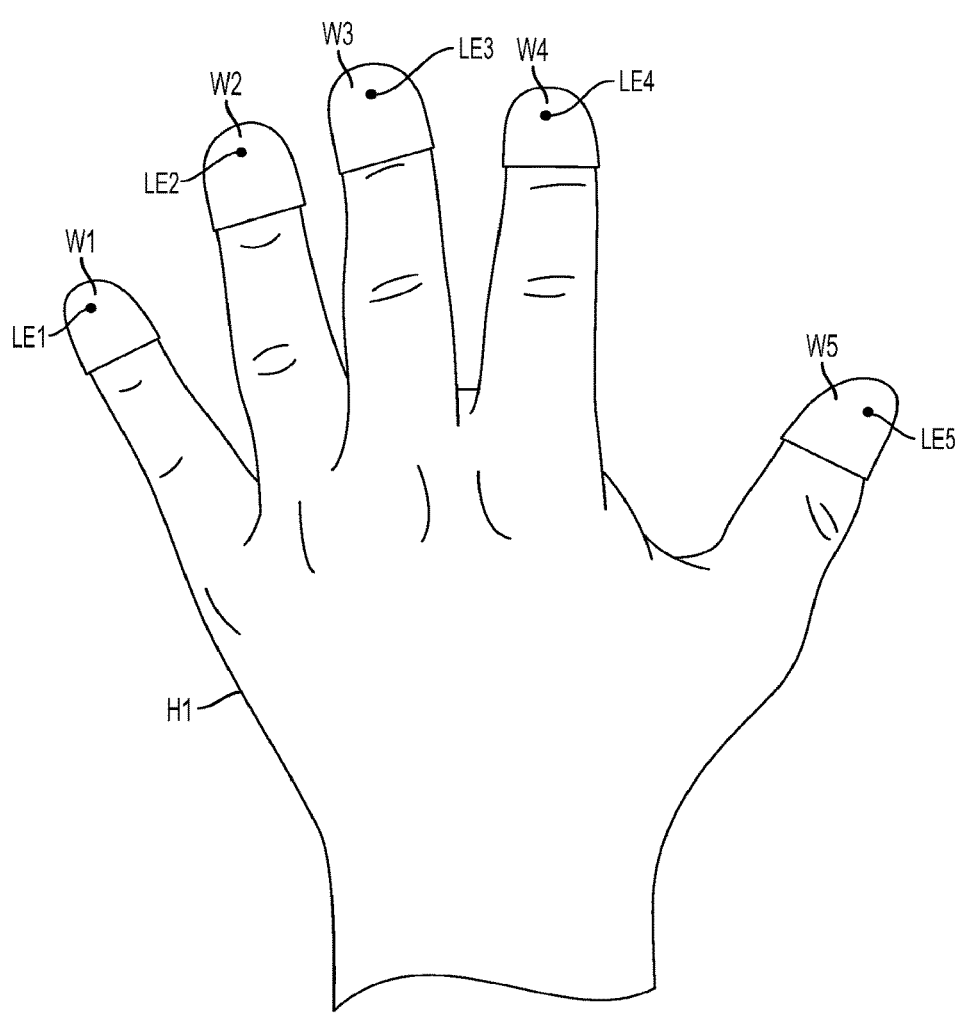
FIG. 3B is a diagram of the left hand of the user to illustrate integration of light sources in thimbles, in accordance with one embodiment of the present disclosure.

FIG. 3B is a diagram of an embodiment of the left hand of the user 101 to illustrate integration of the light sources LE1 thru LE5 in corresponding wearable devices W1 thru W5. For example, the light source LE1 is integrated to be a part of the wearable device W1. The wearable devices W1 thru W5 are worn to facilitate the light sources LE1 thru LE5 to be visible on a dorsal side of the left hand of the user 101. The visibility of the light sources LE1 thru LE5 allows access of light emitted by the light sources LE1 thru LE5 by the optical sensors 104 and 106 (FIG. 1). Similarly, wearable devices that are similar to the wearable devices W1 thru W5 are worn on the right hand of the user 101 to facilitate corresponding light sources integrated within the similar wearable devices to be visible on a dorsal side of the right hand.

Figure 4A:
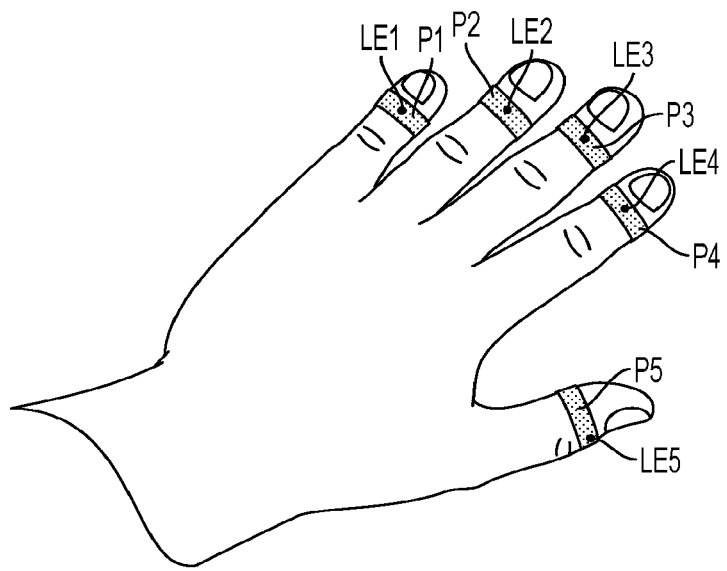
FIG. 4A is a diagram of the left hand of the user to illustrate use of patches as wearable devices, in accordance with one embodiment of the present disclosure.

FIG. 4A is a diagram of an embodiment of the left hand of the user 101 (FIG. 1) to illustrate use of patches P1, P2, P3, P4, and P5 as wearable devices. The patches P1 thru P5 are made of a cloth, e.g., Velcro™ material, fabric, cotton, polyester, nylon, etc. In some embodiments, the patches P1 thru P5 are made of a flexible plastic material. The patches P1 thru P5 are worn on distal ends of fingers of the left hand of the user 101. In some embodiments, the patches P1 thru P5 are worn on any other potions, e.g., middle portions, proximal portions, finger joints, etc., of fingers of the left hand of the user 101. Similarly, patches are worn on fingers of the right hand of the user 101.

The light sources LE1 thru LE5 are integrated with the corresponding patches P1 thru P5. When the patches P1 thru P5 are worn on fingers of the user 101, the light sources LE1 thru LE5 are positioned to be visible on a dorsal part of the left hand of the user 101. The visibility allows access to light that is generated by the LEs 1 thru LE5 by the optical sensors 104 and 106 (FIG. 1).

In some embodiments, a patch is attached, e.g., glued, attached using Velcro™, fastened with a pin, clipped on, etc., to a piece of clothing of the user 101 to determine a position of a location at which the patch is attached. In various embodiments, a patch is attached to a wearable device, e.g., a wristwatch, sunglasses, prescription glasses, etc.

Figure 4B:
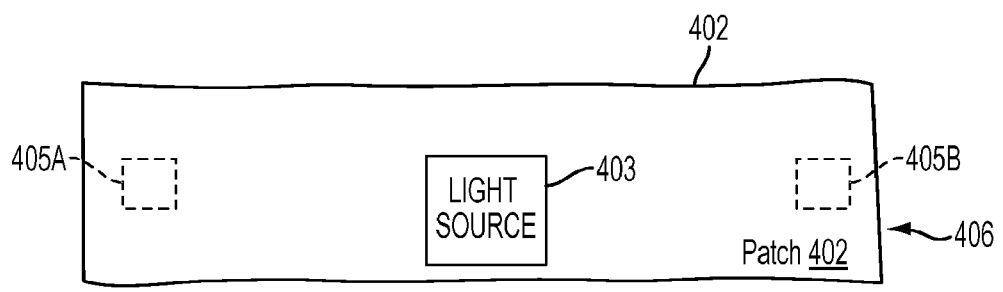
FIG. 4B is a diagram of a patch that is worn on a finger of the user, in accordance with one embodiment of the present disclosure.

FIG. 4B is a diagram of an embodiment of a patch 402 that is worn on a finger of the user 101 (FIG. 1). The patch 402 is an example of any of the patches P1 thru P5 or of any patch that is worn on the right hand of the user 101. The patch 402 has a light source 403 that emits light on a top surface 404 of the patch 402 for access by the optical sensors 104 and 106 (FIG. 1). The light source 403 is an example of any of the light sources LE1 thru LE10. Moreover, the patch 402 has Velcro™ on a bottom surface 406 (not visible in FIG. 4B), which is opposite to the top side 404. The user 101 wears the patch 402 on his/her finger to surround and abut the finger with the bottom surface 406, and positions the patch 402 to facilitate visibility of the light source 403 to the optical sensors 104 and 106.

In some embodiments, instead of the patch 402, a clip, a band, a stretchable fabric, a plastic material, a rubber band, a metal band, etc., is used as a wearable device that has an integrated light source.

Figure 5:
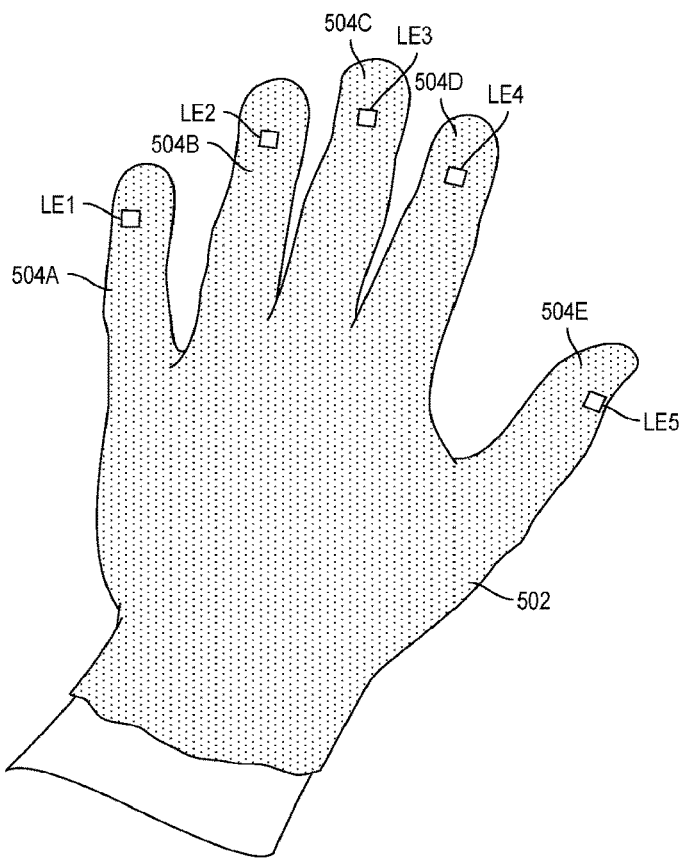
FIG. 5 is a diagram of the left hand of the user to illustrate that light sources are integrated in finger portions of a glove, in accordance with one embodiment of the present disclosure.

FIG. 5 is a diagram of an embodiment of the left hand of the user 101 (FIG. 1) to illustrate that the LEs1 thru 5 are integrated in finger portions 504A, 504B, 504C, 504D, and 504F of a glove 502. For example, the light source LE1 is integrated with the finger portion 504A, the light source LE2 is integrated with the finger portion 504B, the light source LE3 is integrated with the finger portion 504C, the light source LE4 is integrated with the finger portion 504D, and the light source LE5 is integrated with the finger portion 504E. In some embodiments, the glove 502 is made of a fabric or a plastic. The glove 502 is worn on the left hand of the user 101. The light sources LE1 thru LE5 are located on a dorsal side of the glove 502. The location on the dorsal side facilitates a line of sight between the light sources LE1 thru LE5 and the optical sensors 104 and 106 (FIG. 1). It should be noted that a similar glove is worn on the right hand of the user 101 and the glove has integrated therewith the light sources LE6 thru LE10.

In some embodiments, any number of light sources are located on a finger portion of the glove 502. For example, multiple light sources are integrated with the finger portion 504A. In various embodiments, the light sources LE1 thru LE5 are located in a pattern, e.g., a zigzag pattern, a straight line, a curved pattern, etc., on the finger portions 504A, 504B, 504C, 504D, and 504F. In some embodiments, light sources are located on alternate finger portions. For example, the light source LE1 is integrated with the finger portion 504A, the finger portion 504B lacks a light source, the light source LE3 is integrated with the finger portion 504C, the finger portion 504D lacks a light source, and the light source LE5 is integrated with the finger portion 504E.

Figure 6A:
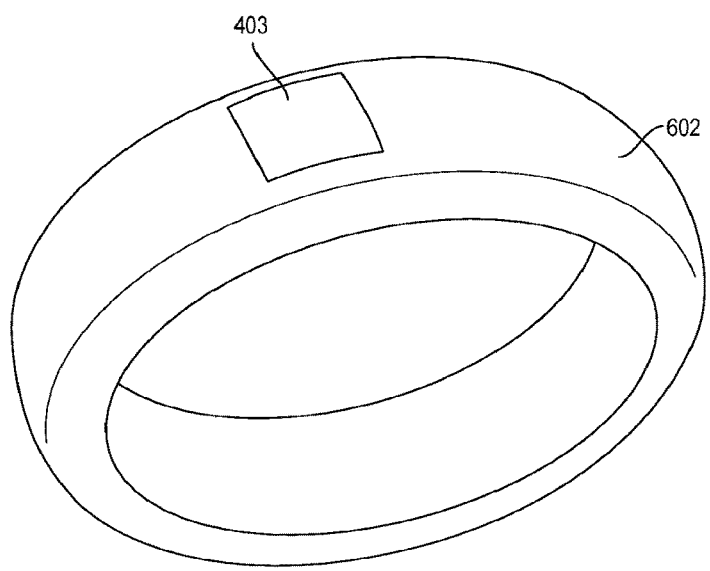
FIG. 6A is a diagram of a ring that has a light source, in accordance with one embodiment of the present disclosure.

FIG. 6A is a diagram of an embodiment of a ring 602 that has the light source 403 and that is worn on a finger of the user 101 (FIG. 1). The light source 403 is integrated with the ring 602. The ring 602 is an example of any of the wearable devices WD1 thru WD10 and the light source 403 is an example of any of the light sources LE 1 thru LE 10.

Figure 6B:
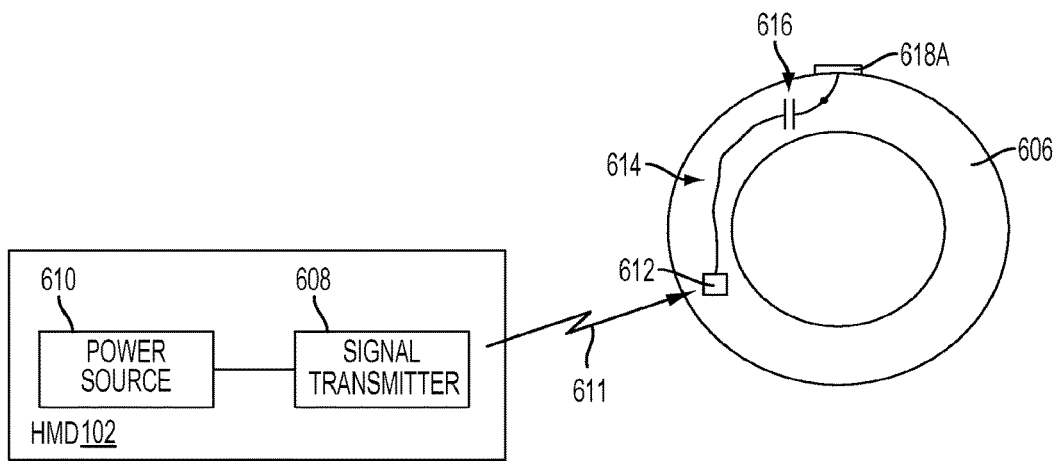
FIG. 6B is a diagram of an embodiment of a ring that is charged by a power signal received from a signal transmitter, in accordance with one embodiment of the present disclosure.

FIG. 6B is a diagram of an embodiment of a ring 606 that is charged by a power signal received from a signal transmitter 608. The ring 606 is an example of any of the wearable devices WD1 thru WD10 (FIG. 1). The signal transmitter 608 is connected to a power source 610.

Examples of the power source 610 include a radio frequency (RF) power supply, a battery, a battery pack, and a programmable power supply. In some embodiments, the RF power supply includes a low voltage power supply, e.g., less than hundreds of volts, etc. Moreover, in various embodiments, the programmable power supply is programmable to be controlled via an analog or a digital interface. For example, an amount of power and a frequency of the power that is generated by the programmable power supply are controlled by a remote processor. An example of the signal transmitter 608 includes a modulator that modulates a carrier waveform with a signal that is generated by the power source 610 to generate a power signal 611.

The power signal 611 is transmitted to a signal receiver 612 that is integrated within the ring 606. For example, a distance between the signal transmitter 608 and the signal receiver 612 is of a range between one to two meters to facilitate a transmission of the power signal 610 to the signal receiver 612. The signal receiver 612 demodulates the power signal 610 to generate a power signal 614 that is supplied via a conductor, e.g., a wire, etc., to a capacitor 616, which is located inside a space, e.g., a hollow, etc., of the ring 606. The capacitor 616 is charged with the power signal 614 and after the capacitor 616 is charged, the capacitor 616 provides power to a light source 618A. The light source 618A is an example of any of the light sources LE1 thru LE10. The light source 618A emits light upon receiving the power from the capacitor 616.

In some embodiments, instead of the capacitor 616, a group of capacitors is placed inside the space within the ring 606. For example, the group includes capacitors that are coupled with each other in parallel to enable charging the capacitors in parallel by the power signal 614.

Figure 6C:
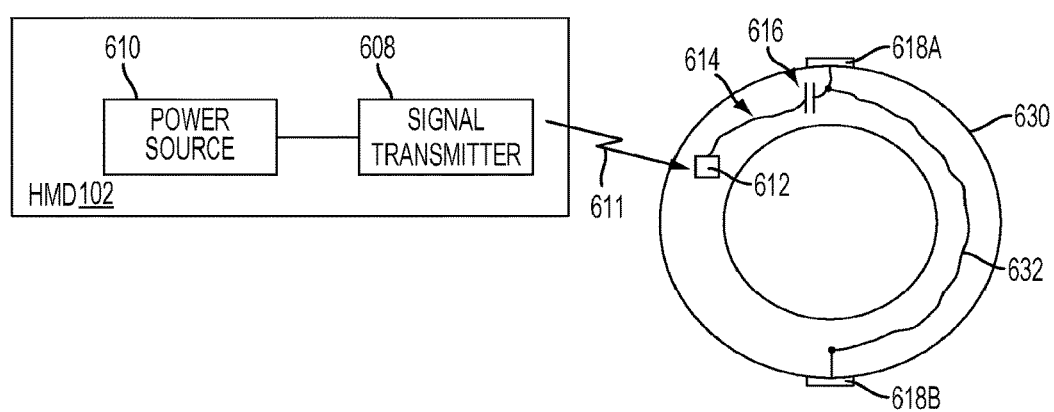
FIG. 6C is a diagram of an embodiment of another ring that includes multiple light sources that are charged by the power signal received from the signal transmitter, in accordance with one embodiment of the present disclosure.

FIG. 6C is a diagram of an embodiment of another ring 630 that includes multiple light sources 618A and 618B. The ring 630 is an example of any of the wearable devices WD1 thru WD10. The light source 618B is an example of any of the light sources LE1 thru LE10. A portion of the power that is stored by the capacitor 616 is provided by the capacitor 616 to the light source 618A and the remaining portion is provided via a conductor 632 to the light source 618B. Upon receiving the remaining portion of the power, the light source 618B emits light.

In some embodiments, the signal receiver 612 includes a splitter that splits a demodulated signal that is generated by the signal received 612 to generate two split signals. One of the two split signals is provided to the capacitor 616. Another one of the two split signals is provided via the splitter to another capacitor (not shown) that is connected to the splitter. The other capacitor is also connected to the light source 618B. The other capacitor is charged by the other split signal and provides the charged power to the light source 618B. The light source 618B emits light upon receiving the power from the other capacitor. An example of the splitter includes a conductor that connects the signal receiver 612 to the other capacitor. The embodiments exclude the conductor 632.

In some embodiments, skin of the user 101 is used to transmit a power signal. In various embodiments, power signal that is generated by the power source 610 is extracted from Wi-Fi signals.

FIG. 7A is a diagram used to illustrate embodiments of rings 606, 702, 704, 706, and 708 having different number of light sources. For example, the ring 606 has the light source 618A. The ring 702 has light sources 618A and 618I. The ring 704 has light sources 618A, 618E, 618I, and 618M. The ring 706 has light sources 618A, 618C, 618E, 618G, 618I, 618K, 618M, and 618O. The ring 708 has the light sources 618A, 618B, 618C, 618D, 618E, 618F, 618G, 618H, 618I, 618J, 618K, 618L, 618M, 618N, 618O, and 618P. Each ring 606, 702, 704, 706, and 708 is an example of any of the wearable devices WD1 thru WD10. Any of the light sources 618A, 618B, 618C, 618D, 618E, 618F, 618G, 618H, 618I, 618J, 618K, 618L, 618M, 618N, 618O, and 618P is an example of any of the light sources LE1 thru LE10.

It should be noted that light sources of a ring are located at a periphery of the ring. For example, the light sources 618A and 618I are located at opposite ends of a diameter of the ring 606. When light sources 618A and 618I are located at opposite ends, the optical sensors 104 and 106 (FIG. 1) do not have access at a time to light that is emitted by the light sources 618A and 618I at a time. This enables the optical sensors to determine a position of the light source 618A and a position of the light source 618I.

In various embodiments, light sources of a ring emit light sequentially, e.g., consecutively, in a round robin fashion, in a random fashion, etc. For example, the light source 618A emits light, then the light source 618E emits light, thereafter the light source 618I emits light, and then the light source 618M emits light on the ring 704 to emit light consecutively in a round robin fashion. As another example, the light source 618A emits light, then the light source 618G emits light, then the light source 618M emits light, then the light source 618E emits light, etc. In this example, the light sources 618A, 618G, 618M, and 618E emit light in a random sequential fashion.

In some embodiments, light sources of a ring are equidistant from each other. For example, a peripheral distance between the light source 618A and 618B of the ring 708 is the same as a peripheral distance between the light source 618B and 618C.

In various embodiments, light sources of a ring are not equidistant from each other. For example, a peripheral distance between the light source 618A and 618B of the ring 708 is greater than or less than a peripheral distance between the light source 618B and 618C.

FIG. 7B is a diagram of an embodiment of multiple rings 704 and 710 to illustrate sequencing of light emission from light sources 618A, 618E, 618I, 618M, 618Q, 618R, 618S, and 618T. The ring 710 is an example of any of the wearable devices WD1 thru WD10. Moreover, any of the light sources 618Q, 618R, 618S, and 618T is an example of any of the light sources LE1 thru LE10. The light sources 618Q, 618R, 618S, and 618T are located on a periphery of the ring 710 and are equidistant from each other. In some embodiments, the light sources 618Q, 618R, 618S, and 618T are not equidistant from each other. Both the rings 704 and 710 have the same number of light sources.

In some embodiments, the ring 704 is worn on one finger of the user 101 (FIG. 1) and the ring 710 is worn on another finger of the user 101. As an example, the ring 704 is worn on the left hand of the user 101 and the ring 710 is worn on the right hand of the user 101. As another example, the ring 704 is worn on one finger of a hand of the user 101 and the ring 710 is worn on another finger of the hand of the user 101.

The light sources of the rings 704 and 710 emit light sequentially and alternatively. For example, there is an alternate sequence of emission of light by the light sources 618A, 618E, 618I, 618M, 618Q, 618R, 618S, and 618T. To further illustrate, the light source 618A emits light first, the light source 618Q emits light second, the light source 618M emits light third, followed by the light source 618T emitting light fourth, the light source 618I emits light fifth, followed by the light source 618S emitting light sixth, then followed by the light source 618E emitting light seventh, and then the light source 618R emits light in eighth.

FIG. 7C is a diagram to illustrate rings of different shapes. For example, a ring 712 is of a square shape, another ring 714 is of an elliptical shape, a ring 716 is of a rectangular shape, a ring 718 is of a triangular shape, and another ring 720 is of a pentagonal shape. In some embodiments, a ring is of a polygonal shape. In various embodiments, a ring is of a combination of curved and straight shapes. In several embodiments, a ring is of a curved shape. Each ring 712, 714, 716, and 720 is an example of any of the wearable devices WD1 thru WD10.

Figures 1, 8A:
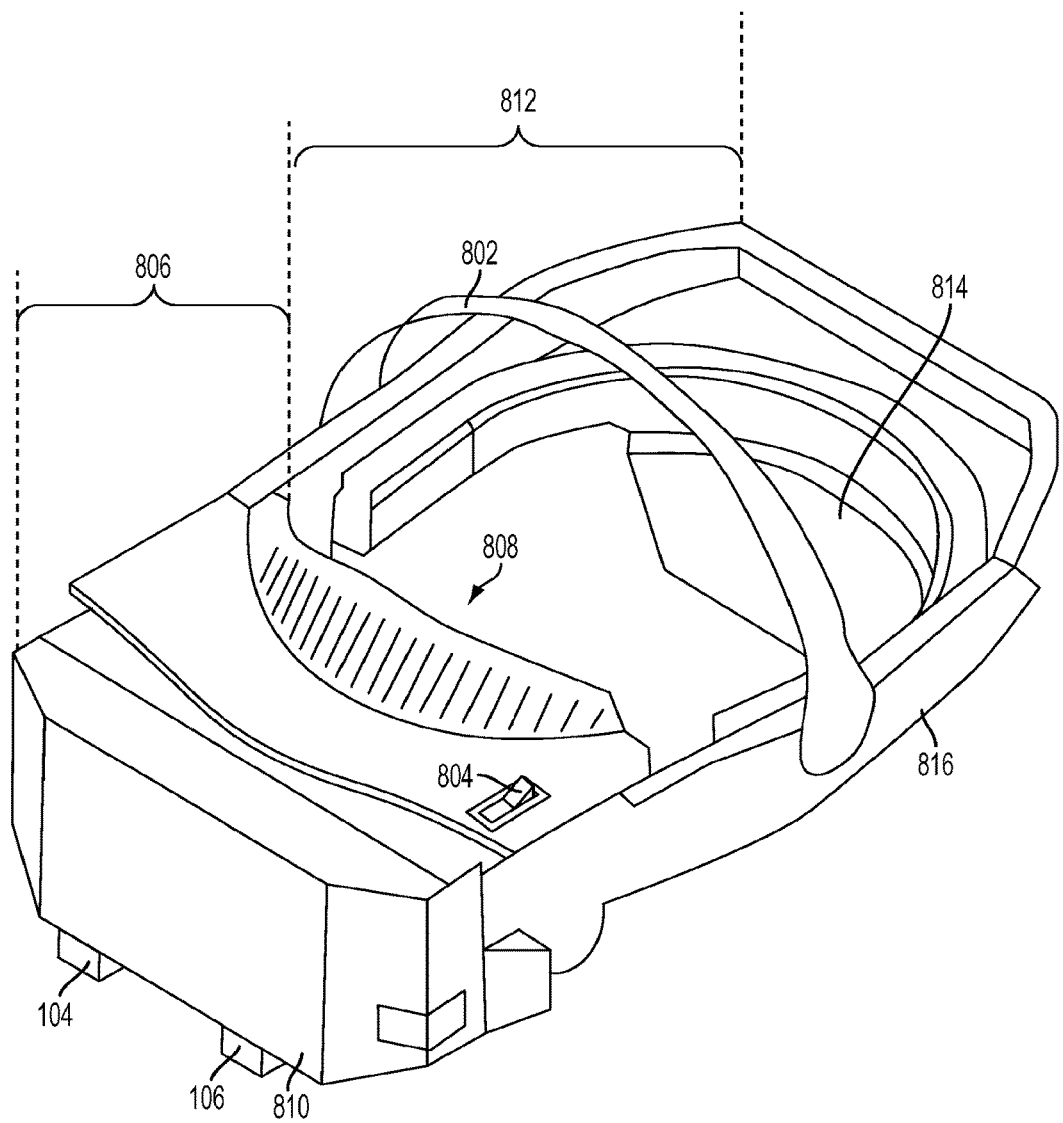

FIGS. 8A-8I are diagrams to illustrate different locations L1, L2, L3, L4, L5, L6, L7, L8, L9, L10, L11, L12, L13, L14, L15, L16, L17, L18, L19, L20, and L21 at which a number of optical sensors are placed on an HMD 800. For example, the optical sensor 104 (FIG. 1) is placed at any of the positions L1 thru L21 on the HMD 800. As shown in FIG. 8A-1, the HMD 800 is an example of the HMD 102 (FIG. 1). In some embodiments, the HMD 800 is a product of research and development by Sony Computer Entertainment America LLC. The HMD 800 includes a head support 802 that supports the HMD 800 on the user 101's (FIG. 1) head. The HMD 800 includes an on/off switch 804 that allows the HMD 800 to be powered on or powered off.

The HMD 800 includes a frame 806 that is placed in front of eyes of the user 101 to cover the eyes with one or more display screens 808. The frame 806 embeds and protects the one or more display screens 808. A game is displayed on the one or more display screens 808 to provide the user 101 with an entertaining, game playing, experience. The frame 806 has a front face 810 that faces a side of the frame 806 opposite to a side at which remaining body 812 of the HMD 800 is located. The remaining body 814 includes a back support 810, which supports a back side of the head of the user 101. The remaining body 814 also includes a frame 816 that fits around sides and back of the user 101's head. The optical sensors 104 and 106 are attached to the HMD 800 at a bottom surface of the frame 806 of the HMD 800. The optical sensor 104 is located to the location L19, shown in FIG. 8A-2, and the optical sensor 106 is located at the location L20, which is also shown in FIG. 8A-2.

Figures 2, 8A:
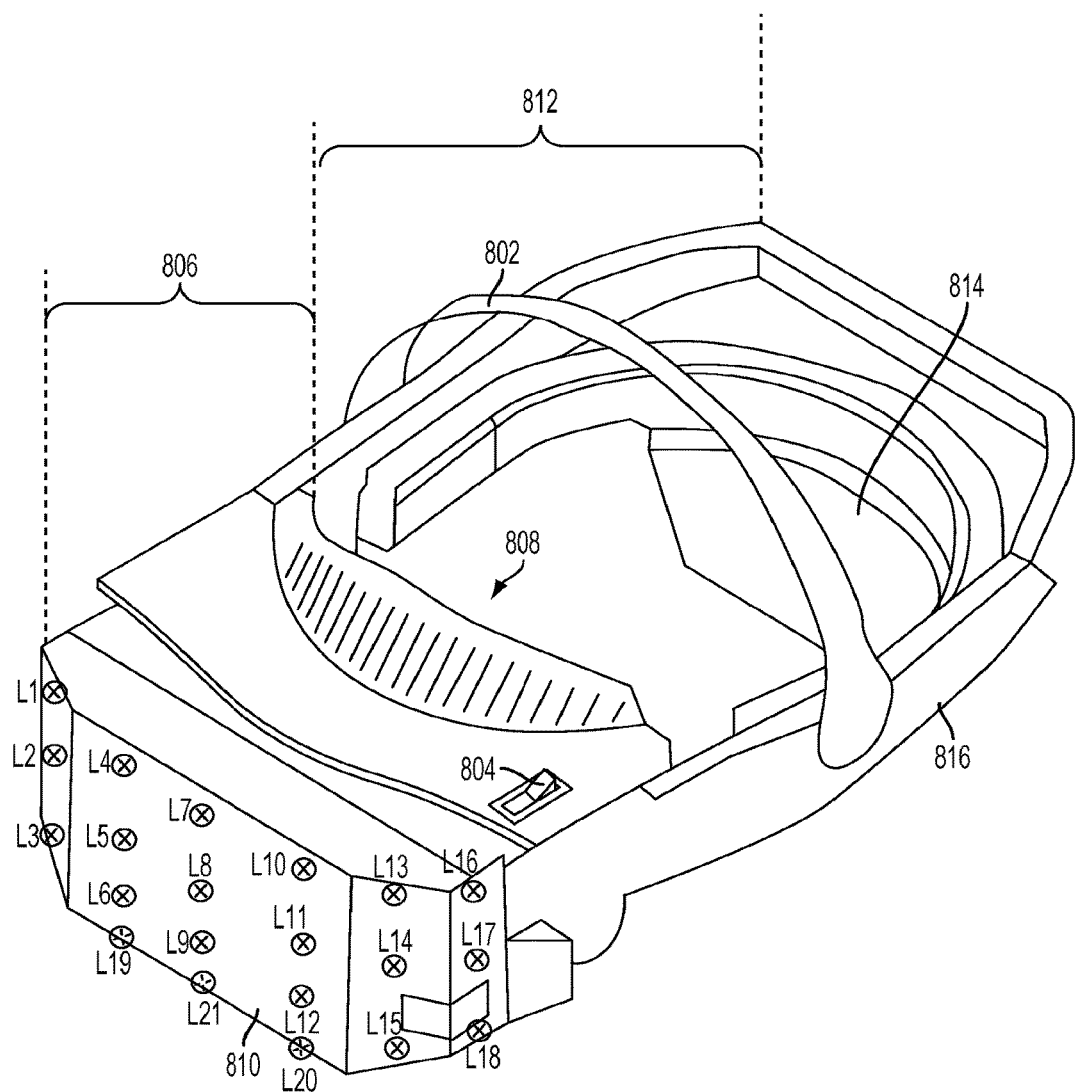

FIG. 8A-2 is a diagram of an embodiment of the HMD 800 to illustration various other locations, e.g., L1, L2, L3, L4, L5, L6, L7, L8, L9, L10, L11, L12, L13, L14, L15, L16, L17, L18, and L21, etc., at which an optical sensor is attached to an outside of the frame 806 of the HMD 800.

In some embodiments, one or more markers, e.g., light sources, reflective tape, reflective material, etc., are placed at one or more of the locations L1, L2, L3, L4, L5, L6, L7, L8, L9, L10, L11, L12, L13, L14, L15, L16, L17, L18, L19, L20, and L21 to allow an image capture device to capture an image of the markers to determine a position and/or an orientation of the HMD 800.

As used herein, an image capture device is a digital camera, or a stereo camera, or a depth sensing image capture device, or a depth camera, or an infrared camera, etc.

Figure 8B:
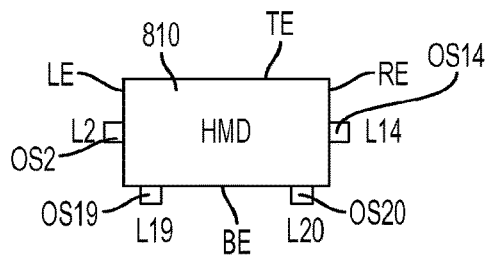
FIG. 8B is a diagram used to illustrate positions at which optical sensors are located on the HMD, in accordance with one embodiment of the present disclosure.

With reference to FIG. 8B, which provides a front view of an embodiment of the front face 810 of the HMD 800, a number of optical sensors OS2, OS14, OS19, and OS20 are located at the locations L2, L14, L19, and L20. The optical sensor OS2 is located at a left edge LE of the front face 810 and the optical sensor OS14 is located at a right edge RE of the front face 810. The optical sensors OS19 and OS20 are located at a bottom edge BE of the front face 810.

In some embodiments, the bottom edge BE is substantially perpendicular, e.g., ranging from 80 degrees to 100 degrees, etc., or is perpendicular to each of the left and right edges. In various embodiments, a top edge TE of the front face 810 is substantially perpendicular or is perpendicular to each of the left and right edges, and is parallel or substantially parallel to the bottom edge BE.

Figure 8F:
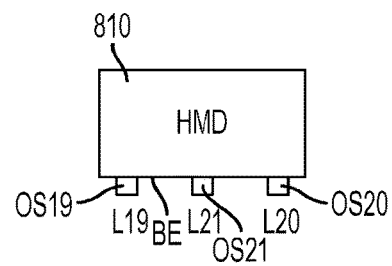
FIG. 8F is a diagram used to illustrate positions at which optical sensors are located on the HMD, in accordance with one embodiment of the present disclosure.
Figure 8C:
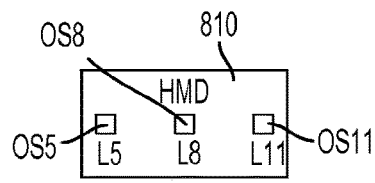
FIG. 8C is a diagram used to illustrate positions at which optical sensors are located on the HMD, in accordance with one embodiment of the present disclosure.

FIG. 8C is a front view of an embodiment of the front face 810 of the HMD 800 (FIG. 8A). Multiple optical sensors OS5, OS8, and OS11 are located at the locations L5, L8, and L11 on the front face 810. It should be noted that in some embodiments, the optical sensors OS5, OS8, and OS11 are located at equal distances from each other. In various embodiments, the optical sensors OS5, OS8, and OS11 are located at unequal distances from each other. For example, a distance between the optical sensors OS5 and OS8 is greater than or less than a distance between the optical sensors OS8 and OS11.

Figure 8G:
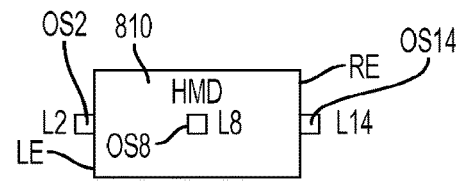
FIG. 8G is a diagram used to illustrate positions at which optical sensors are located on the HMD, in accordance with one embodiment of the present disclosure.
Figure 8D:
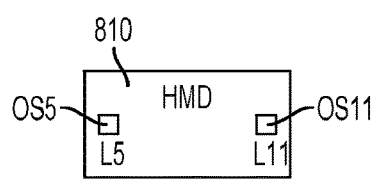
FIG. 8D is a diagram used to illustrate positions at which optical sensors are located on the HMD, in accordance with one embodiment of the present disclosure.

FIG. 8D is a front view of an embodiment of the front face 810 of the HMD 800 (FIG. 8A). As shown in FIG. 8D, the optical sensors OS5 and OS11 are located on the front face 810 at the corresponding positions L5 and L11.

Figure 8H:
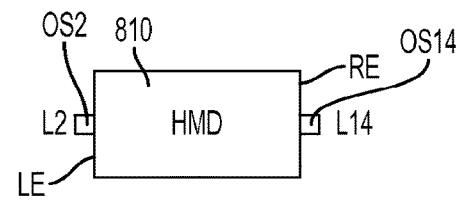
FIG. 8H is a diagram used to illustrate positions at which optical sensors are located on the HMD, in accordance with one embodiment of the present disclosure.
Figure 8E:
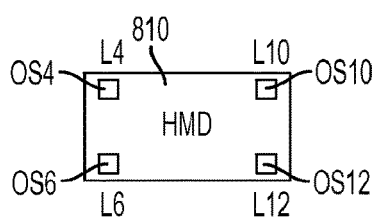
FIG. 8E is a diagram used to illustrate positions at which optical sensors are located on the HMD, in accordance with one embodiment of the present disclosure.

FIG. 8E is a diagram of an embodiment of the front face 810 of the HMD 800 (FIG. 8A). Multiple optical sensors OS4, OS6, OS10, and OS12 are located at corners of the front face 810. For example, the optical sensor OS4 is located at a top left corner at the location L4 on the front face 810, the optical sensor OS10 is located at a top right corner at the location L10 on the front face 810, the optical sensor OS12 is located at a bottom right corner at the location L12 on the front face 810, and the optical sensor OS6 is located at a bottom left corner at the location L6 on the front face 810.

A distance between the optical sensors OS4 and OS10 is the same as or different from a distance between the optical sensors OS6 and OS12. Moreover, a distance between the optical sensors OS4 and OS6 is the same as or different from a distance between the optical sensors OS10 and OS12.

FIG. 8F is a diagram of an embodiment of the front face 810 to illustrate locations of optical sensors OS19, OS20, and OS21 at the bottom edge BE of the front face 810. For example, the optical sensor OS19 is located at the location L19, the optical OS20 is located at the location L20, and the optical sensor OS21 is located at the location L21.

In various embodiments, the optical sensors OS19, OS21, and OS20 are equidistant from each other. In several embodiments, a distance between the optical sensors OS19 and OS21 is different from a distance between the optical sensors OS20 and OS21.

FIG. 8G is a diagram of an embodiment of the front face 810 to illustrate locations of the optical sensors OS2 and OS14 at the corresponding left and right edges of the front face 810. Moreover, in FIG. 8G, the optical sensor OS8 is located at the location 18 on the front face 810.

In some embodiments, the optical sensors OS2, OS8, and OS14 are located equidistant from each other. In various embodiments, a distance between the optical sensors OS2 and OS8 is different from a distance between the optical sensors OS8 and OS14.

FIG. 8H is a diagram of an embodiment of the front face 810 on which the optical sensors OS2 and OS14 are located at the respective left and right edges of the front face 810.

In some embodiments, the optical sensors OS2 and OS14 are located at centers of corresponding left and right edges of the front face 810. In various embodiments, the optical sensors OS2 and OS14 are located at the respective left and right edges but at a distance from a center of the respective left and right edges.

Figure 8I:
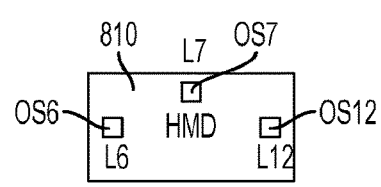
FIG. 8I is a diagram used to illustrate positions at which optical sensors are located on the HMD, in accordance with one embodiment of the present disclosure.

FIG. 8I is a diagram of an embodiment of the front face 810 to illustrate optical sensors OS6, OS7, and OS12 located at respective locations L6, L7, and L12. It should be noted that the locations 16, 17, and 112 form a triangular pattern on the front face 810.

In various embodiments, a distance between the optical sensors OS6 and OS7 is the same as a distance between the optical sensors OS7 and OS12. In some embodiments, a distance between the optical sensors OS6 and OS7 is different from a distance between the optical sensors OS7 and OS12.

Figure 9A:
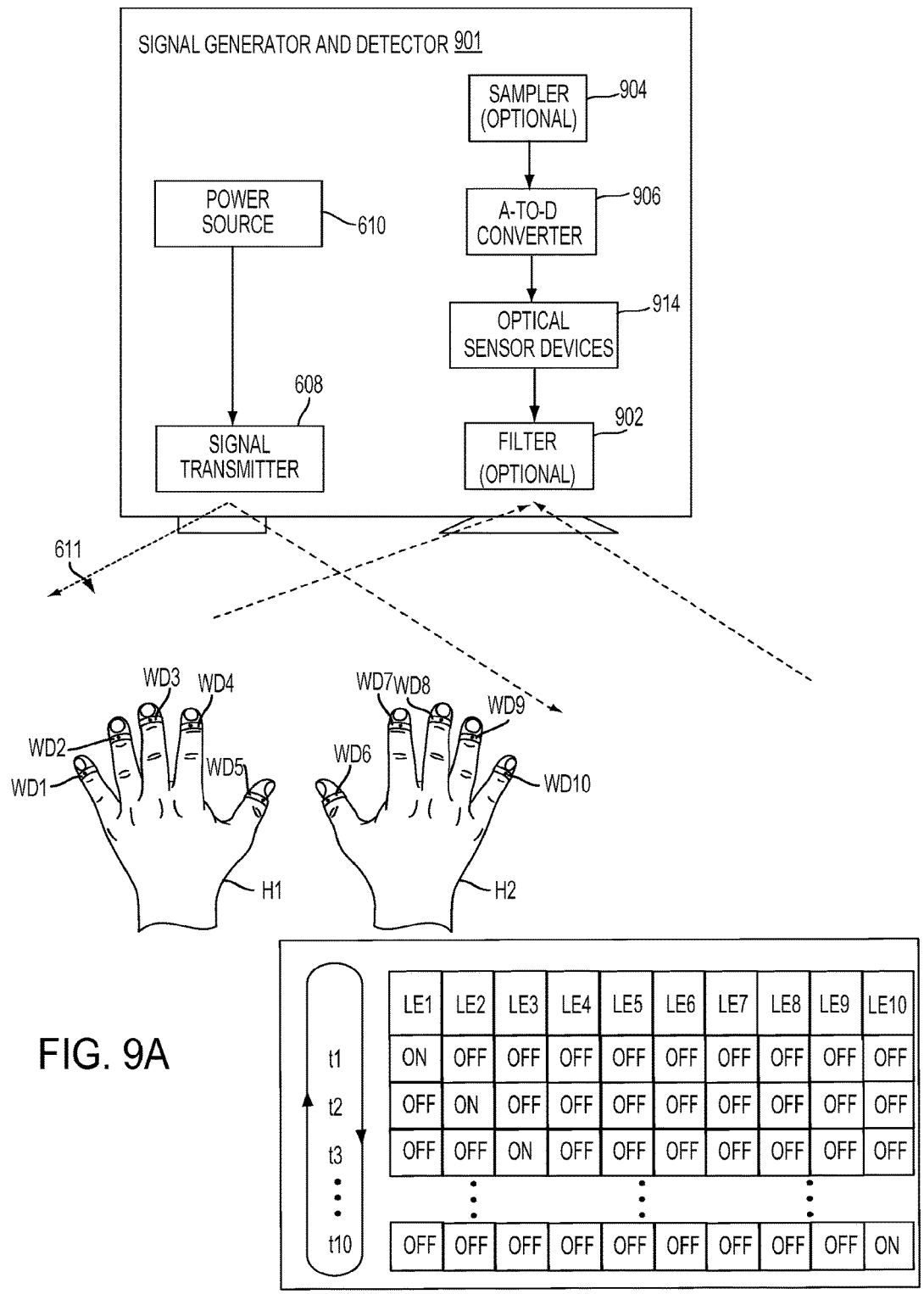
FIG. 9A is a diagram of a signal generator and detector (SGD) to illustrate transmission of a power signal to wearable devices, and reception of a light signal from each of the wearable devices, in accordance with one embodiment of the present disclosure.

FIG. 9A is a diagram of an embodiment of a signal generator and detector (SGD) 901 to illustrate transmission of a power signal to the wearable devices WD1 thru WD10, and reception of a light signal from each of the wearable devices WD1 thru WD10. The SGD 901 includes the signal transmitter 608 and the power source 610. The SGD 901 further includes a filter 902 and a sampler 904, both of which are optional. Moreover, the SGD 901 includes an A-to-D converter 906 and multiple optical sensor devices 914, e.g., the optical sensors 104 and 106 (FIG. 1), etc.

Upon receiving the power signal 611 that is broadcast to all the wearable devices WD1 thru WD10, the wearable devices WD1 thru WD10 emit light sequentially. For example, the LE1 emits light during a time period t1, the LE2 emits light during a time period t2, the LE3 emits light during a time period t3, and so on until the LE10 emits light during a time period t10. It should be noted that in some embodiments, a time period and a time slot are used interchangeably herein. The emission of light by the LEs 1 thru 10 repeats. For example, the LE1 emits light after the LE10 emits light at an end of a sequence. The filter 902 filters in a portion of the light that falls into a visible spectrum or an infrared spectrum. For example, when the LE1 (FIG. 1) emits visible light, the filter 902 filters in the visible light to remove any infrared light, e.g., infrared light from surroundings, infrared light from the LE1, etc.

The optical sensor devices 914 detect the light that is emitted by the wearable devices WD1 thru WD10 sequentially to generate electrical signals. The electrical signals are converted from an analog form to a digital form by the A-to-D converter 906 and to generate digital data, which is provided from the A-to-D converter 906 to the sampler 904. In various embodiments, the A-to-D converter 906 is a part of the optical sensor devices 914. The sampler 904 samples the digital data to generate multiple samples of data.

It should be noted that in some embodiments, the SGD 901 is located within the HMD 102 (FIG. 1).

In various embodiments, the SGD 901 excludes the A-to-D converter 906 and the sampler 904. In these embodiments, the electrical signals that are generated by the optical sensor devices 914 are transmitted by the communication device 116 (FIG. 1) of the HMD 102 to the communication device 114 (FIG. 1) of the game console 108 (FIG. 1). The optical sensor devices 914 are coupled to the communication device 116 of the HMD 102. Further, in these embodiments, the game console 108 includes the A-to-D converter 906 and the sampler 904, which is optional in the game console 108. The A-to-D converter 906 in the game console 108 is connected to the communication device 114 to receive the electrical signals that are generated by the optical sensor devices 914.

In some embodiments, the A-to-D converter 906 and the sampler 904 are located within the game console 108 instead of within the HMD 102. For example, the electrical signals are communicated from the optical sensor device 914 via the communication devices 114 and 116 to the A-to-D converter 906 within the game console 108.

Figure 9B:
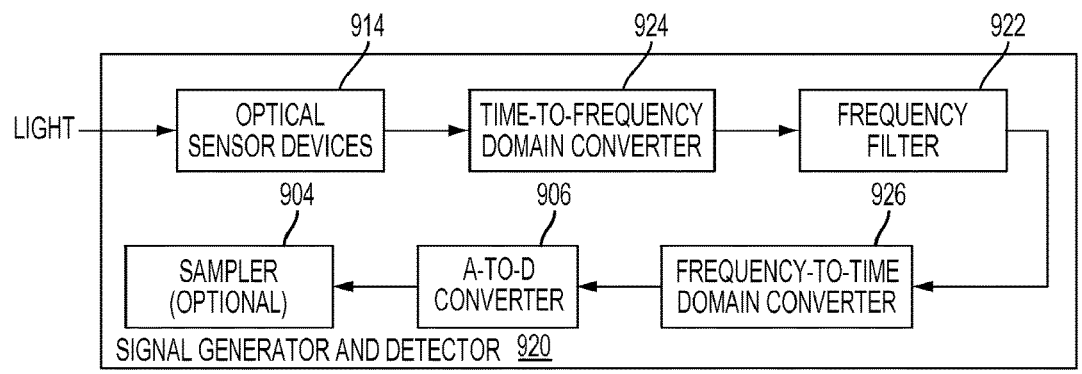
FIG. 9B is a diagram of another SGD that includes a frequency filter to filter out undesirable frequencies, in accordance with one embodiment of the present disclosure.

FIG. 9B is a diagram of an embodiment of another SGD 920 that includes a frequency filter 922 to filter out undesirable frequencies. The SGD 920 includes the optical sensor devices 914, a time-to-frequency domain converter 924, the frequency filter 922, a frequency-to-time domain converter 926, the A-to-D converter 906, and the sampler 904. It should be noted that the sampler 904 is optionally included in the SGD 920.

The optical sensor devices 914 sense the light that is emitted by the wearable devices WD1 thru WD10 sequentially to generate the electrical signals. The time-to-frequency domain converter 924 converts the electrical signals from a time domain to a frequency domain to generate frequency domain signals. The frequency filter 922 filters out visible or infrared frequencies to generate a filtered signal. For example, when the LEs 1 thru 10 emit visible light, the frequency filter 922 filters out the infrared frequencies and when the LEs 1 thru 1 emit infrared light, the frequency filter 922 filters out visible frequencies.

The frequency-to-time domain converter 926 receives the filtered signal and converts the filtered signal from the frequency domain back to the time domain. The A-to-D converter 906 converts the time domain signal that is received from the frequency-to-time domain converter 926 from an analog form to a digital form to generate a digital signal. The sampler 904 samples the digital signal that is received from the A-to-D converter 906 to generate a sampled signal.

In some embodiments, the SGD 920 is located in the HMD 102 (FIG. 1).

In various embodiments, the time-to-frequency domain converter 924, the frequency filter 922, the frequency-to-time domain converter 926, the A-to-D converter 906, and the sampler 904 are located within the game console 108 instead of within the HMD 102. For example, the electrical signals are communicated via the communication devices 114 and 116 to the time-to-frequency domain converter 924 within the game console 108.

Figures 1, 10A:
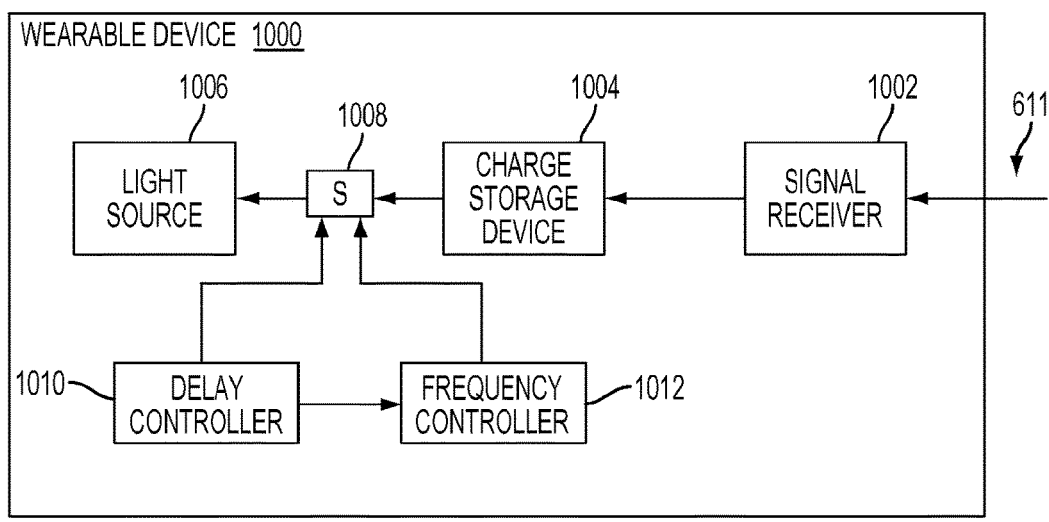
Figures 2, 10A:
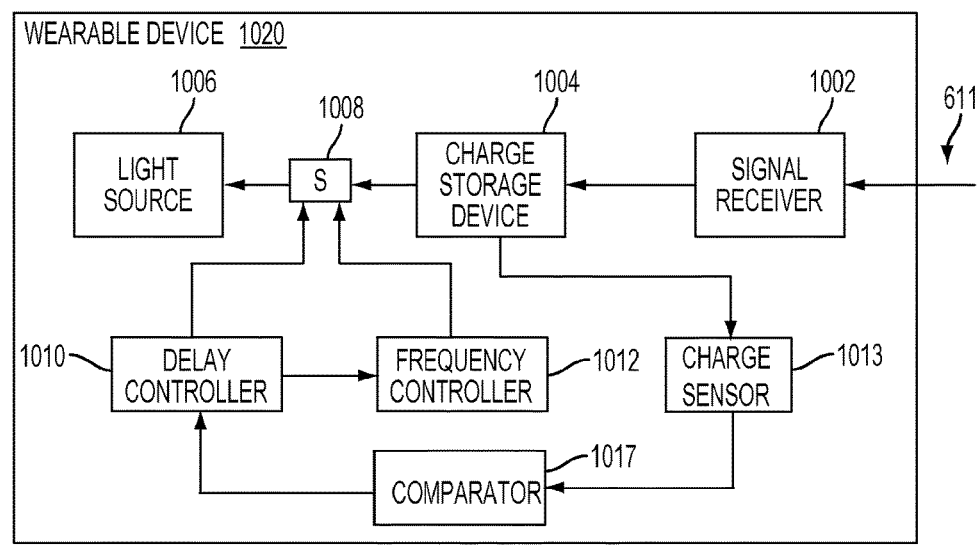

FIG. 10A-1 is a block diagram of an embodiment of a wearable device 1000 to illustrate components of the wearable device 1000. The wearable device 1000 is an example of any of the wearable devices WD1 thru WD10 (FIG. 1). The wearable device 1000 includes a light source 1006, which is an example of any of the LEs 1 thru 10 (FIG. 1). The wearable device 1000 includes a signal receiver 1002, a charge storage device 104, and a switch 1008. Examples of the charge storage device 1004 include one or more capacitors, e.g., the capacitor 616 (FIG. 6C). Another example of the charge storage device 1004 includes a battery. Examples of the switch 1008 include a transistor or a group of transistors.

The signal receiver 1002 receives the power signal 611 from the signal transmitter 608 (FIG. 9A) and demodulates the power signal 611 to generate a charge signal, which is provided by the signal receiver 1002 to the charge storage device 1004. The charge storage device 1004 stores a charge of the charge storage signal and provides the stored charge to the light source 1006 via the switch 1008 when the switch 1008 is closed. The light source 1006 is pre-programmed to emit light upon receiving the charge of the charge storage signal. The light source 1006 receives the charge of the charge storage signal when the switch 1008 is closed and does not receive the charge storage signal when the switch 1008 is open.

The switch 1008 opens or closes based on a signal sent by a delay controller 101 and a signal sent by a frequency controller 1012. In some embodiments, a controller, as used herein, includes a processor, an ASIC, a PLD, or a combination thereof. The delay controller 1010 is pre-programmed with a time delay to close the switch 1008. For example, the delay controller 1010 controls the switch 1008 to close after a time delay that is pre-programmed into the delay controller 1010. The light source 1006 emits light after the time delay when the charge stored in the charge storage device 1004 is received from the charge storage device 1004. In some embodiments, the time delay is pre-programmed to allow for the charge storage device 1004 to be charged beyond a pre-determined level.

After controlling the switch 1008 to close, the delay controller 1010 sends a signal to the frequency controller 1012. Upon receiving the signal from the frequency controller 1012, the frequency controller 1012 generates a signal that controls a frequency with which the switch 1008 opens and closes. The light source 1006 emits light at the frequency with which the switch 1008 closes until an amount of charge in the charge storage device 1004 falls below a level.

In some embodiments, one or more light sources that are integrated within a glove are provided power by a power source, e.g., a battery, a capacitor, multiple capacitors, etc. For example, each finger portion of a glove includes a capacitor or multiple capacitors that are charged by the power signal 611. Examples of a battery include a rechargeable battery and a non-rechargeable battery. In case a battery is used to provide power to a light source of a glove, the power signal 611 is not needed and the switch 1008 is connected to the battery to allow or not allow provision of power to the light source 1006. In some embodiments, a backup battery is connected to the charge storage device 1004 to charge the charge storage device 1004 in case the charge storage device 1002 is not charged with the power signal 611 beyond a pre-determined level.

FIG. 10A-2 is a diagram of an embodiment of a wearable device 1020 to illustrate use of a charge sensor 1013 to trigger an emission of light by the light source 1006. The wearable device 1020 is an example of any of the wearable devices WD1 thru WD10 (FIG. 1). The charge sensor 1013 is connected to the charge storage device 1004 and to a comparator 1017. In various embodiments, the comparator 1017 is implemented as a controller, or an ASIC, or a PLD, or a combination thereof.

The charge sensor 1013 measures an amount of an electrostatic charge that is stored in the charge storage device 1004 and provides the measured charge to the comparator 1017 of the wearable device 1020. The comparator 1017 determines whether the measured charge exceeds a pre-determined amount and sends a signal to the delay controller 1010 to activate the delay controller 1010. When the delay controller 1010 is activated, the delay controller 1010 waits for an amount of a pre-programmed delay for the wearable device 1020 and sends a signal to the switch 1008 after the delay to close the switch 1008. Moreover, upon sending the signal to close the switch 1008, the delay controller 1010 also sends a signal to the frequency controller 1012 to open and close the switch 1008 at a pre-determined or a pre-programmed frequency.

It should be noted that an amount of delay that is pre-programmed into the delay controller 1010 is different for each of the wearable devices WD1 thru WD10. For example, an amount of delay that is pre-programmed into the delay controller 1010 of WD1 is less than an amount of delay that is pre-programmed into the delay controller 1010 of WD2, and an amount of delay that is pre-programmed into the delay controller 1010 of WD2 is less than an amount of delay that is pre-programmed into the delay controller 1010 of WD3, and so on.

Moreover, it should be noted that in some embodiments, a frequency with which the switch 1008 is turned on and off and that is pre-programmed into the frequency controller 1012 is the same for all of the wearable devices WD1 thru WD10.

Figure 10B:
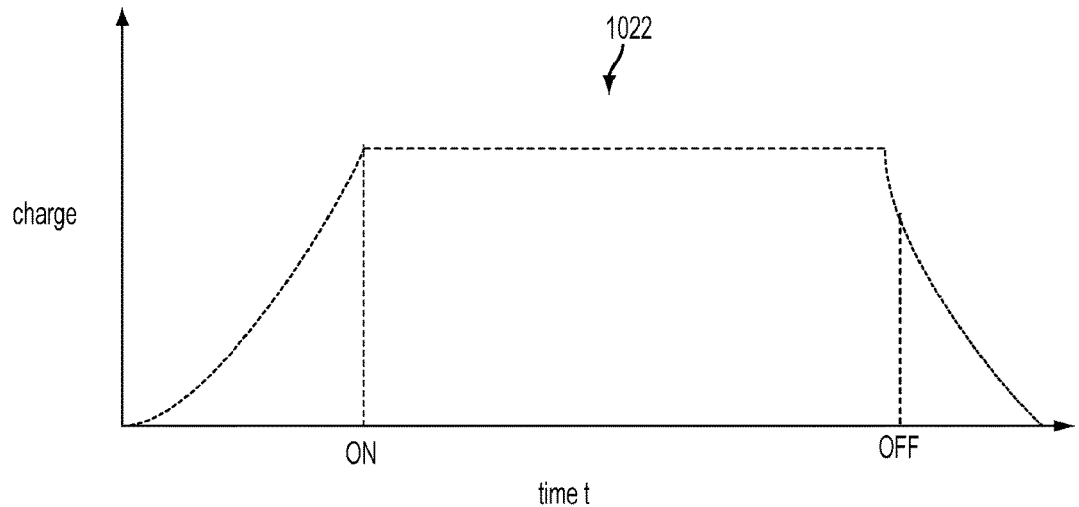
FIG. 10B is a graph to illustrate turning on and off of light sources, in accordance with one embodiment of the present disclosure.

FIG. 10B is an embodiment of a graph 1022 to illustrate charging and discharging of the charge storage device 1004 (FIG. 10A-1, FIG. 10A-2). The graph 1022 plots an amount of charge versus time t. With the reception of the power signal 611 (FIG. 10A-2), an amount of charge stored in the charge storage device 1004 increases. When the charge in the charge storage device 1004 reaches the pre-determined amount, the switch 1008 (FIG. 10A-1, FIG. 10A-2) is closed and the light source 1006 (FIG. 10A-1, FIG. 10A-2) emits light. The amount of charge in the charge storage device 1004 is held constant or substantially constant, e.g., within a pre-determined range, etc., after reaching the pre-determined amount. When the power signal 611 is no longer being broadcasted, the charge in the charge storage device 1004 dissipates, and eventually the light source 1006 does not turn on or remains off even when the switch 1008 is closed.

Figure 10C:
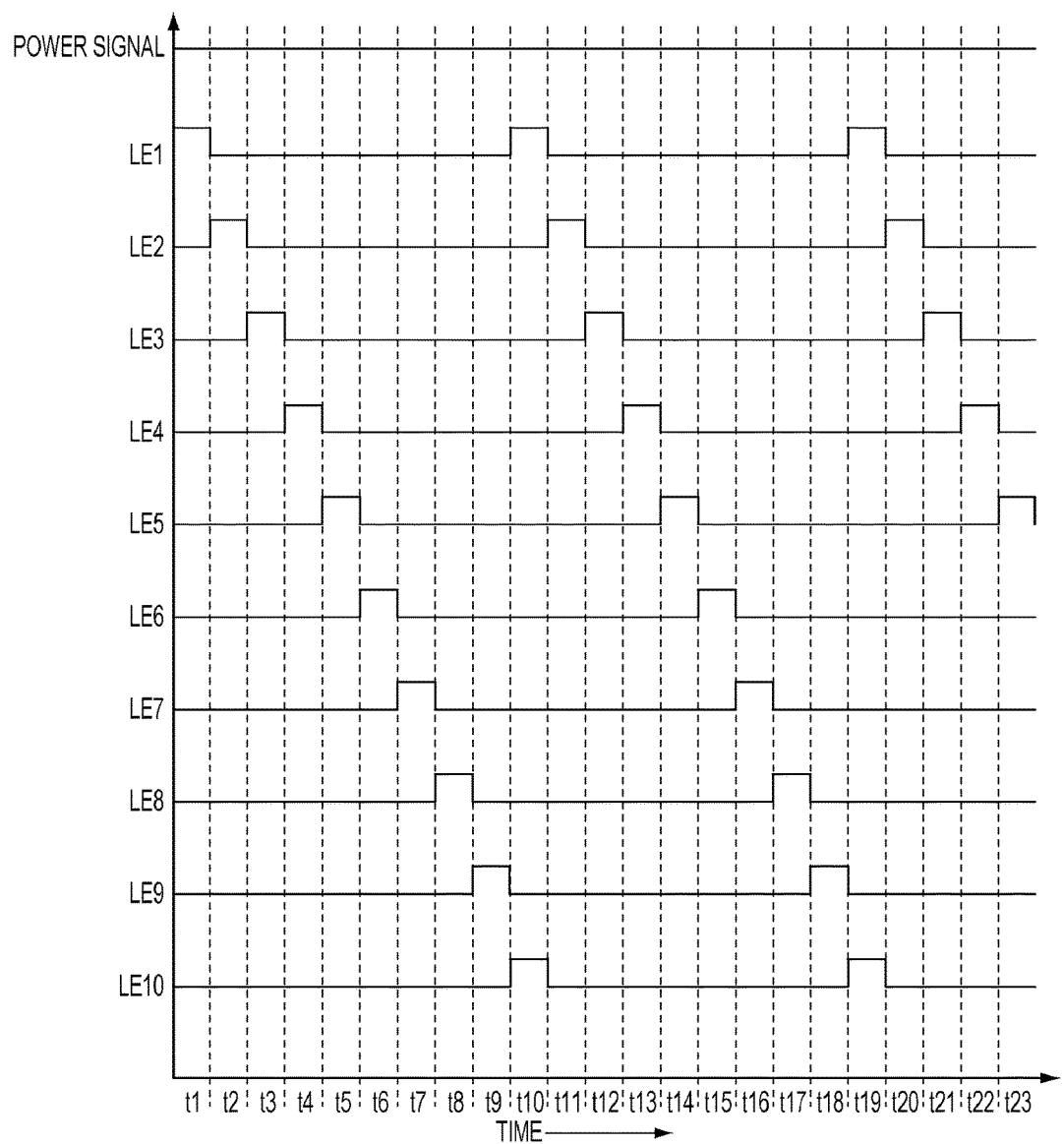
FIG. 10C is a timing diagram to illustrate sequential emission of light by light sources, in accordance with one embodiment of the present disclosure.

FIG. 10C is a timing diagram to illustrate sequential emission of light by the light sources LE1 thru LE10. Upon receiving the power signal 611 (FIG. 10A-1), the light source LE1 emits light. The light source LE1 stops emission of light after emitting light for the time period t1. Then, after the time period t1, upon receiving the power signal 611, the light source LE2 emits light for the time period t2. After the time period t2, the light source LE2 ceases to emit light and the light source LE3 starts emission of light for the time period t3. After the time period t3, the light source LE3 stops emission of light and the light source LE4 emits light for the time period t4. This continues for the time periods t5, t6, t7, t8, t9, and t10. During the time period t10, the light source LE10 emits light. After the light source LE10 emits light for the time period t10, the light source LE1 repeats emission of light for a time period t11. Another cycle of emission of light by the remaining light source LE2 thru L10 repeats after the time period t11. For example, emission of light repeats during time periods t12, t13, t14, t15, t16, t17, t18, t29, t20, t21, t22, and t23.

Figures 1, 11A:
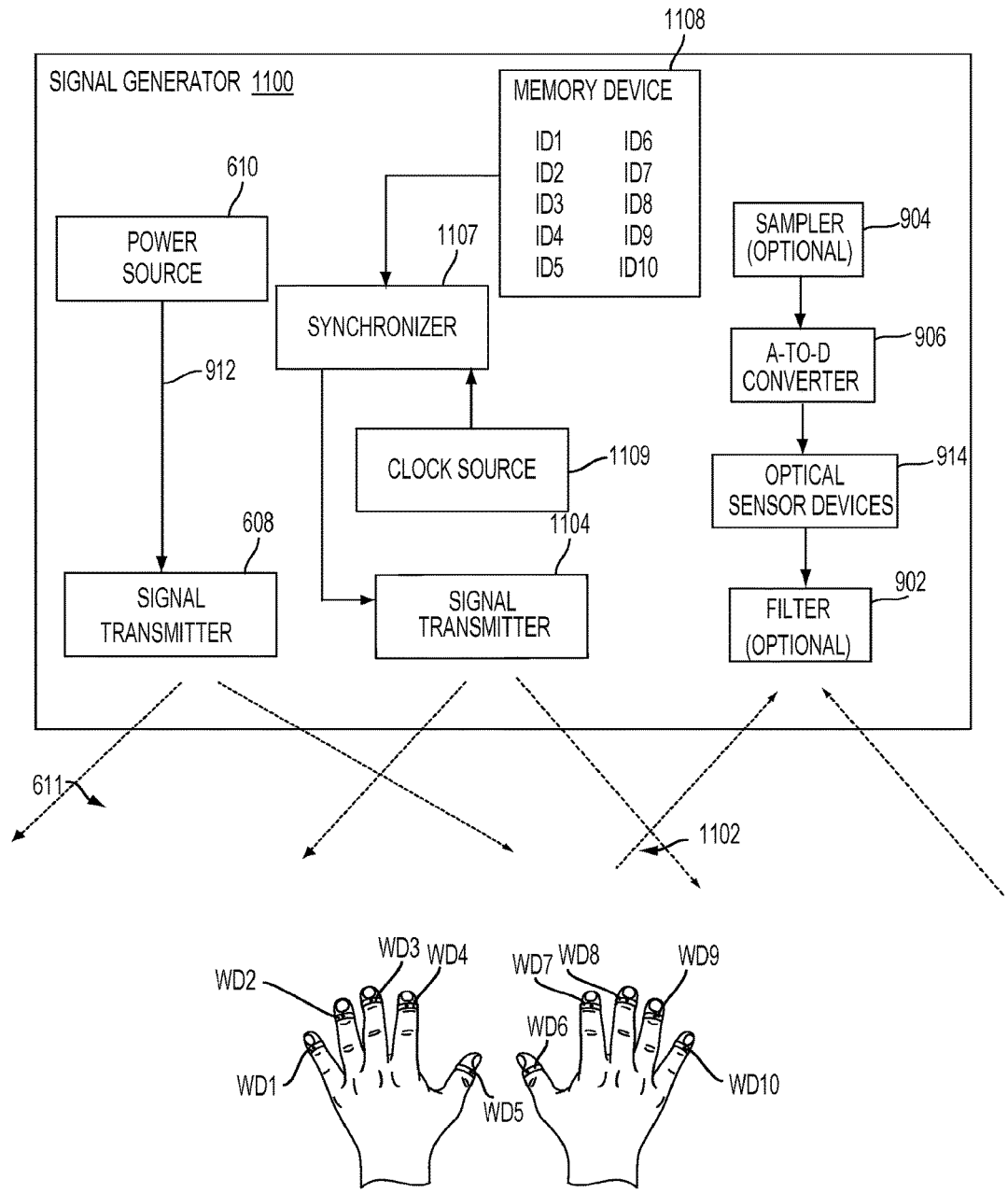
Figures 2, 11A:
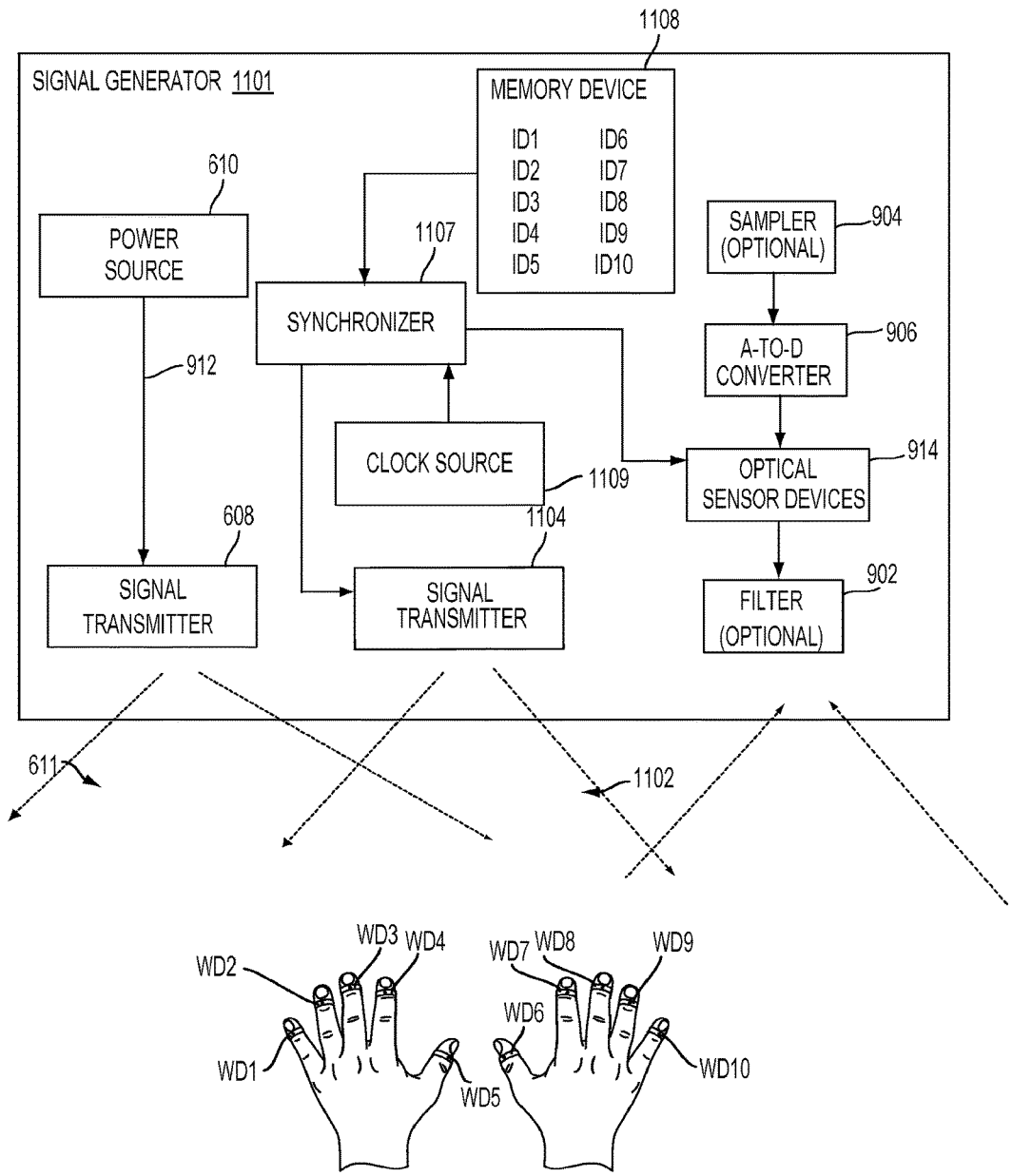

FIG. 11A-1 is a diagram of an embodiment of a signal generator 1100 for illustrating generation of the power signal 611 and a synchronization signal 1102. In some embodiments, the signal generator 1100 is located in the HMD 102 (FIG. 1). The signal generator 1100 includes the signal transmitter 608, the power source 610, another signal transmitter 1104 and a synchronizer 1107, a memory device 1108, and a clock source 1109. In various embodiments, the synchronizer 1107 is implemented as a controller, or an ASIC, or a PLD, or a combination thereof.

The memory device 1108 stores identification codes (IDs), e.g., numbers, alphanumeric characters, characters, etc., of the wearable devices WD1 thru WD10. For example, an ID1 is assigned to the wearable device WD1, another ID2 is assigned to the wearable device WD2, yet another ID3 is assigned to the wearable device WD3, yet another ID4 is assigned to the wearable device WD4, an ID5 is assigned to the wearable device WD5, another ID6 is assigned to the wearable device WD6, yet another ID7 is assigned to the wearable device WD7, yet another ID8 is assigned to the wearable device WD8, another ID9 is assigned to the wearable device WD9, and another ID10 is assigned to the wearable device WD10. In some embodiments, an identifier and an identification code are used interchangeably herein.

The power signal 611 is generated and transmitted, e.g., broadcasted, etc., to all of the wearable devices WD1 thru WD10 as described above. During the transmission of the power signal 611, the synchronizer 1107 retrieves an ID, e.g., ID1, etc., of one of the wearable devices WD1 thru WD10 from the memory device 1108 and generates a signal that embeds the ID. The signal that embeds the ID is generated during a clock cycle in synchronization with a clock signal that is generated by a clock source 1109, e.g., a clock oscillator, a clock oscillator with a phase-locked loop, etc. The signal embedding the ID is provided by the synchronizer 1107 to the signal transmitter 1104. An example of the signal transmitter 1104 includes a modulator that modulates a carrier waveform with the signal that is generated by and received from the synchronizer 1107. The carrier waveform is modulated by the signal transmitter 1104 to generate the synchronization signal 1102. The synchronization signal 1102 having the ID of one of the wearable devices WD1 thru WD10 is broadcasted by the signal transmitter 1104 to all of the wearable devices WD1 thru WD10.

During a next clock cycle, e.g., a clock cycle that consecutively follows the clock cycle during which the ID of one of the wearable devices WD1 thru WD10 is generated, etc., another signal that includes an ID, e.g., ID2, etc., of another one of the wearable devices, e.g., WD2, etc., is generated in synchronization with the clock signal and then transmitted by the signal transmitter 1104 to the wearable devices WD1 thru WD10. In this manner, generation and transmission of a synchronization signal is performed in synchronization with the clock signal for all the remaining wearable devices, e.g., WD3 thru WD10, etc., and then generation and transmission of synchronization signals for all the wearable devices WD1 thru WD10 is repeated in synchronization with the clock signal.

In some embodiments, both the signal that is generated by the synchronizer 1107 and the signal that is generated by the power source 610 are transmitted by either the transmitter 608 or the transmitter 1104. In these embodiments, the power source 610 and the synchronizer 1107 are connected to either the transmitter 608 or the transmitter 1104.

In several embodiments, in addition to embedding an ID of one of the wearable devices WD1 thru WD10, a time delay is also embedded within a sync signal. In these embodiments, the memory device 1108 includes a mapping between IDs of the wearable devices WD1 thru WD10 and time delays after which the wearable devices WD1 thru WD10 will emit light upon receiving the power signal 611. For example, the memory device 1108 includes a link between the ID1 and a time delay td1. The time delay td1 is a time delay of emission of light by the LE1 of the wearable device WD1 after the wearable device WD1 receives the power signal 611. The synchronizer 1107 embeds the IDs 1 thru 10, a mapping between the IDs 1 thru 10 and time delays, e.g., td1, td2, td3, td4, tf5, tf6, tf7, td8, td9, td10, etc., of emission of light by the light sources LE1 thru LE10, etc., of emission of light by the light sources LE1 thru LE10 in the sync signal. For example, the synchronizer 1107 embeds the ID1 and the time delay td1 during a first clock cycle of the clock signal that is generated by the clock source 1109 and embeds the ID2 and the time delay td2 during a second clock cycle of the clock signal. The second clock cycle is consecutive to the first clock cycle.

In various embodiments, in addition to embedding an ID of one of the wearable devices WD1 thru WD10, a time delay and a frequency are also embedded within a sync signal. In these embodiments, the memory device 1108 includes a mapping between IDs of the wearable devices WD1 thru WD10, time delays after which the wearable devices WD1 thru WD10 will emit light upon receiving the power signal 611, and frequency of emission of the light. For example, the memory device 1108 includes a link between the ID1, the time delay td1, and a frequency f1. The synchronizer 1107 embeds the IDs 1 thru 10, a mapping between the IDs 1 thru 10 and time delays, e.g., td1, td2, td3, td4, tf5, tf6, tf7, td8, td9, td10, etc., of emission of light by the light sources LE1 thru LE10, and a mapping between the IDs 1 thru 10 and frequencies, e.g., f1, f2, f3, f4, f5, f6, f7, f8, f9, f10, etc., of emission of light by the light sources LE1 thru LE10 in the sync signal. For example, the synchronizer 1107 embeds the ID1, the time delay td1, and the frequency f1 during the first clock cycle of the clock signal that is generated by the clock source 1109 and embeds the ID2, the time delay td2, and the frequency f2 during the second clock cycle of the clock signal.

FIG. 11A-2 is a diagram of an embodiment of a signal generator 1101 to illustrate synchronization of collection of light by the optical sensor devices 914 with emission of light by the light sources LE1 thru LE10. The signal generator 1101 is the same as the signal generator 1100 (FIG. 11A-1) except that synchronizer 1107 is connected to the optical sensor devices 914. Upon generation of the sync signal that includes a first ID, e.g., the ID1, etc., the synchronizer 1107 sends an activating signal to the optical sensor devices 914 to activate, e.g., enable, turn on, etc., the optical sensor devices 914 for collecting light. When the optical sensor devices 914 are activated, the optical sensor devices collect light that is emitted by a light source having the first ID. The synchronizer 1107 sends a deactivating signal to deactivate, e.g., disable, turn off, etc., the optical sensor devices 914 after a pre-determined time period after the activating signal is sent. Similarly, upon generating the sync signal that includes a second ID, e.g., the ID2, etc., the synchronizer 914 sends another activating signal to the optical sensor device 914 to activate the optical sensor devices 914 for collecting light from a light source having the second ID. In this manner, the optical sensor devices 914 are synchronized to emission of light by the light sources LE1 thru LE10.

In some embodiments, the optical sensor devices 914 turn on and off in synchronization with a clock signal that is generated by the clock source 1109. The clock source 1109 is connected to the optical sensor devices 914. For example, during an on duty cycle of a clock cycle of the clock signal, the synchronizer 914 sends the sync signal having the first ID and the optical sensor device 914 is activated by the on duty cycle to collect light from a light source having the first ID. During an off duty cycle of the clock cycle of the clock signal, the optical sensor device 914 is deactivated by the off duty cycle and cannot collect light from a light source.

Figure 11B:
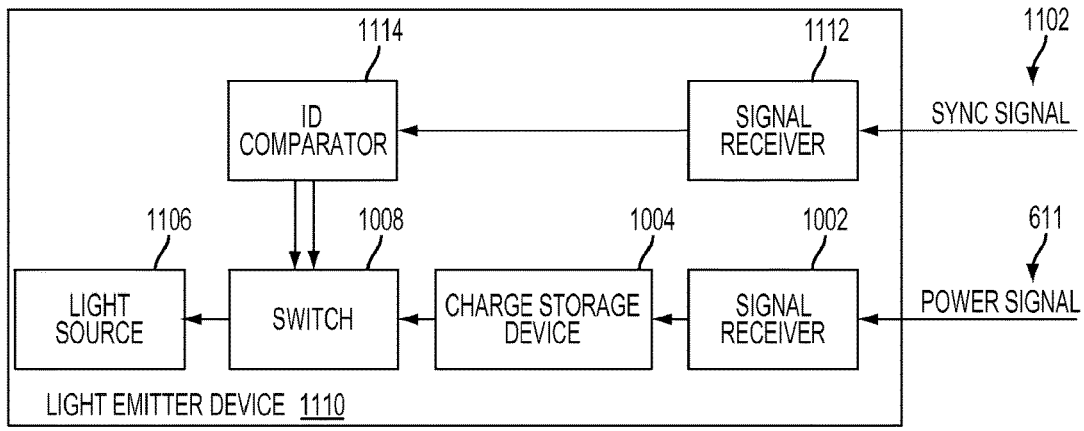
FIG. 11B is a diagram of a light emitter device to illustrate use of an identification code (ID) of a wearable device to generate light, in accordance with one embodiment of the present disclosure.

FIG. 11B is a diagram of an embodiment of a light emitter device 1110 to illustrate use of an identification code (ID) of one of the wearable devices WD1 thru WD10 (FIG. 1) to generate light. The light emitter device 1110 is implemented within any of the wearable devices WD1 thru WD10. The light emitter device 1110 includes the signal receiver 1002, the charge storage device 1004, the switch 1008, another signal receiver 1112, and an ID comparator 1114. In some embodiments, the ID comparator 1114 is implemented as a controller, or a PLD, or an ASIC, or a combination thereof.

The signal receiver 1102 receives the synchronization signal 1102 having an ID of one of the wearable devices WD1 thru WD10. The signal receiver 1102 demodulates the synchronization signal 1102 to generate a signal having an ID of one of the wearable devices WD1 thru WD10 to the ID comparator 1114. The ID comparator 1114 compares the ID that is received within the signal received from the signal receiver 1112 with an ID that is stored in a memory device of the ID comparator 1114 to determine whether the IDs match. Upon determining that the IDs match, the ID comparator 1114 sends a signal to the switch 1008 to close the switch 1008. When the switch 1008 is open, charge from the charge storage device 1004 is sent via the switch 1008 to the light source 1106. Upon receiving the charge, the light source 1106 emits light.

In various embodiments, the operations, described herein, as being performed by the signal receiver 1112 are performed by the signal receiver 1002. In these embodiments, the signal receiver 1002 is connected to both the charge storage device 1004 and the ID comparator 1114.

Figure 11C:
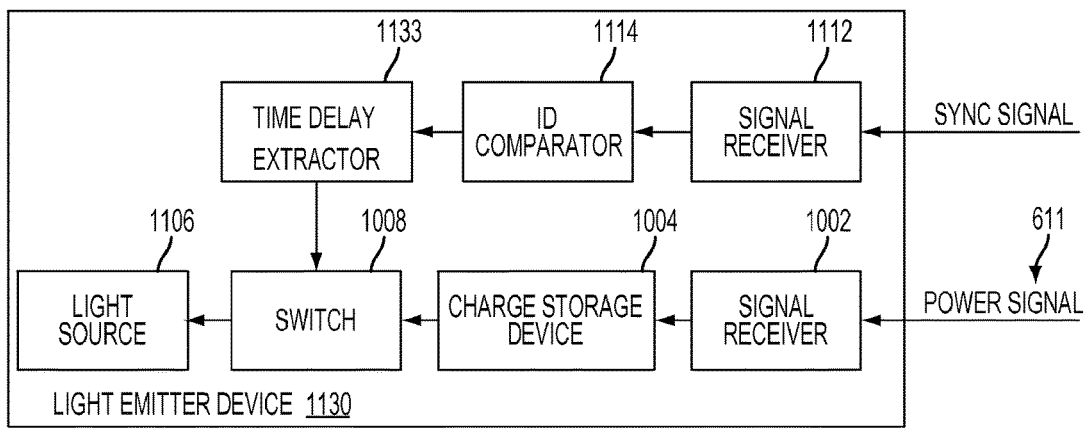
FIG. 11C is a diagram of an embodiment of another light emitter device to illustrate use of IDs of wearable devices with time delays, in accordance with one embodiment of the present disclosure.

FIG. 11C is a diagram of an embodiment of another light emitter device 1130 to illustrate use of IDs of the wearable devices WD1 thru WD10 (FIG. 1) and an association between the IDs and the time delays td1 thru td10. The light emitter device 1130 is implemented within any of the wearable devices WD1 thru WD10. The light emitter device 1130 includes the signal receiver 1002, the charge storage device 1004, the switch 1008, the signal receiver 1112, the ID comparator 1114, and a time delay extractor (TDE) 1133. In some embodiments, the TDE 1133 is implemented a controller, or a PLD, or an ASIC, or a combination thereof.

The sync signal that includes the associations between the IDs of the wearable devices WD1 thru WD10 and the time delays td1 thru td10 is received by the signal receiver 1112 of the light emitter device 1130. The signal receiver 1112 demodulates the sync signal to generate a signal having the associations between the IDs of the wearable devices WD1 thru WD10 and the time delays td1 thru td10. The ID comparator 1114 performs a comparison of the IDs 1 thru 10 received within the signal from the signal receiver 1112 and an ID that is stored in the memory device of the ID comparator 1114 to determine whether there is a match. Upon determining that there is a match, the ID comparator 1114, sends the matched ID and an association between the matched ID and one of the time delays td1 thru td1 to the TDE 1133.

The TDE 1133 extracts, e.g., identifies, etc., from the association between the matched ID and one of the time delays td1 thru td10, the time delay, and applies the time delay to the switch 1008. For example, the TDE 1133 sends a signal to the switch 1108 to close the switch after the time delay that corresponds to the matched ID. When the switch

1008 is closed, charge stored in the charge storage device 1004 is supplied from the charge storage device 1004 via the switch 1008 to the light source 1006 for emission of light by the light source 1006.

Figure 11D:
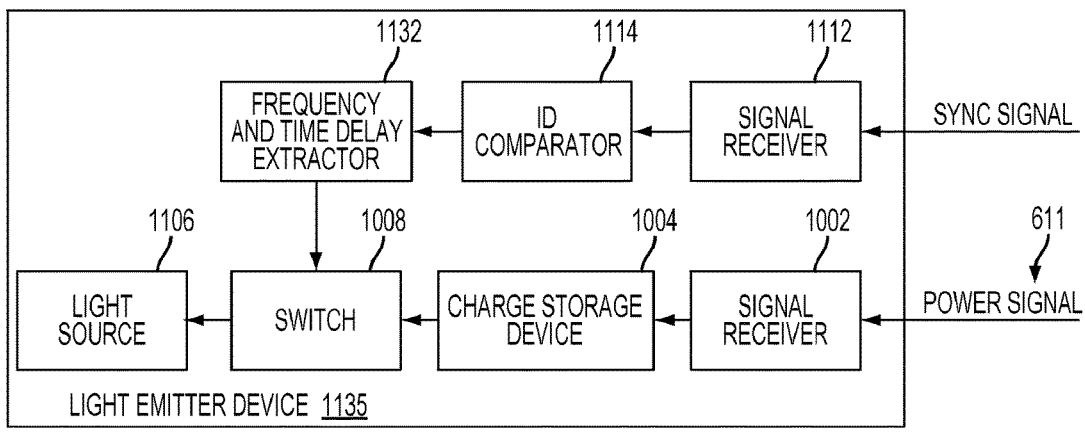
FIG. 11D is a diagram of an embodiment of another light emitter device to illustrate use of IDs of wearable devices with time delays and frequencies, in accordance with one embodiment of the present disclosure.

FIG. 11D is a diagram of an embodiment of another light emitter device 1135 to illustrate use of IDs of the wearable devices WD1 thru WD10 (FIG. 1), an association between the IDs and time delays td1 thru td10, and an association between the IDs and the frequencies f1 thru f10. The light emitter device 1135 is implemented within any of the wearable devices WD1 thru WD10. The light emitter device 1135 includes the signal receiver 1002, the charge storage device 1004, the switch 1008, the signal receiver 1112, the ID comparator 1114, and a frequency and time delay extractor (FTD) 1132. In some embodiments, the FTD 1132 is implemented a controller, or a PLD, or an ASIC, or a combination thereof.

The sync signal that includes the associations between the IDs of the wearable devices WD1 thru WD10, the time delays td1 thru td10, and the frequencies f1 thru f10 is received by the signal receiver 1112 of the light emitter device 1135. The signal receiver 1112 demodulates the sync signal to generate a signal having the associations between the IDs of the wearable devices WD1 thru WD10, the time delays td1 thru td10, and the frequencies f1 thru f10. The ID comparator 1114 performs a comparison of the IDs 1 thru 10 received within the signal from the signal receiver 1112 and an ID that is stored in the memory device of the ID comparator 1114 to determine whether there is a match. Upon determining that there is a match, the ID comparator 1114, sends the matched ID, an association between the matched ID and one of the time delays td1 thru td1, and an association between the matched ID and one of the frequencies f1 thru f10 to the FTD 1132.

The FTD 1132 extracts, e.g., identifies, etc., from the association between the matched ID and one of the time delays td1 thru td10 and one of the frequencies f1 thru f10, the time delay and the frequency, and applies the frequency and the time delay to the switch 1008. For example, the FTD 1132 sends a signal to the switch 1108 to close the switch after the time delay that corresponds to the matched ID and sends a signal to repeat opening and closing of the switch at the frequency that corresponds to the matched ID. When the switch 1008 is closed, charge stored in the charge storage device 1004 is supplied from the charge storage device 1004 via the switch 1008 to the light source 1006 for emission of light by the light source 1006.

FIG. 12 is a diagram of an embodiment of a system 1201 that includes a signal detector 1200 and the game console 108 for determining a position of the wearable devices WD1 thru WD10 based on light emitted by light emitters within the wearable devices WD1 thru WD10. The signal detector 1200 includes inertial sensors 1209, the optical sensor devices 104 and 106, the A-to-D converter 906, the sampler 904, and the communication device 116. Moreover, the game console 108 includes a memory device 1202, a position determination module 1204, an image capture device 1211, and a memory device 1208. The signal detector 1200 is implemented within the HMD 102 (FIG. 1). In some embodiments, the signal detector 1200 is implemented within the game console 108 (FIG. 1). As indicated above, the sampler 904 is an optional device.

In some embodiments, the position determination module 1204 is implemented as a PLD, or an ASIC, or a controller, or a combination thereof.

Samples that are generated by the sampler 904 are provided by the sampler 904 to the position determination module 1204 via the communication devices 116 and 114. Moreover, a position and orientation of the HMD 102 is provided via the communication devices 116 and 114 to the position determination module 1204. It should be noted that the position and orientation of the HMD 102 is the same as a position and orientation of a frame of reference FR1 of the HMD 102. The frame of reference FR1 is further described below.

In some embodiments, an image capture device, e.g., the image capture device 1211, etc., captures an image of the HMD 102 and the image provides a position and orientation of the HMD 102 in the real world to the position determination module 1204. When the image capture device is located outside the game console 108, e.g., on a television, etc., the image is transferred to the position determination module 1204 via a communication device of the image capture device and the communication device 114 of the game console 108.

In various embodiments, a position and orientation of the HMD 102 is measured using the inertial sensors 1209, e.g., one or more gyroscopes, or magnetometers, or accelerometers, or combinations thereof, and from data obtained from an image capture device.

The samples are used to determine a position, e.g., an (x, y) position, etc., of incidence of light on an imaging surface of the optical sensor 104 (FIG. 1). Data representing the imaging surface of the optical sensor 104 is shown in FIG. 12 as 104′. The light that is incident is generated by one of the light sources LE1 thru LE10. For example, the samples include data sampled from current signals that are generated by electrodes of the optical sensor 104. The position determination module 1204 calculates an x position and a y position on an imaging surface of the optical sensor 104 based on the sampled data generated from the current signals to determine the (x, y) position of incidence of light emitted from a light source on the imaging surface. Moreover, similarly, the position determination module 1204 calculates an x position and a y position on an imaging surface of the optical sensor 106 based on the sampled data generated from the current signals to determine the (x, y) position of incidence of light emitted from a light source on the imaging surface of the optical sensor 106. Data representing the imaging surface of the optical sensor 106 is shown in FIG. 12 as 106′. The (x, y) positions on the optical sensors 104 and 106 are determined with respect to the frame of reference FR1 by the position determination module 1204.

Moreover, the position determination module 1204 applies ray intersection calculation to determine a position of a light source, e.g., any of the light sources LE1 thru LE10, etc., with respect to the frame of reference FR1 between and passing through the optical sensors 104 and 106. The position of the light source is determined from light emitted by the light source and detected by the optical sensors 104 and 106. For example, the ray intersection calculation occurs from two or more rays, and each ray is a ray of light that is emitted by a light source, e.g., LE1, etc. An optical sensor, e.g., the optical sensor 104, the optical sensor 106, etc., is able to detect a point, e.g., the (x, y) position of incidence of light, a bright spot, etc., of light emitted from a light source on an imaging surface of the optical sensor, and information indicating that the frame of reference FR1 is between the optical sensors 104 and 106 is pre-stored within the position determination module 1204. It should be noted that the optical sensor is able to detect the point of light when there is a line-of-sight between the optical sensor and the light source. It should further be noted that in some embodiments, the frame of reference FR1 is a frame of reference of the HMD 102 (FIG. 1). By applying the (x, y) position of the point on the imaging surface of the optical sensor and optical characteristics of the optical sensor, the position determination module 1204 determines that the bright spot originated somewhere along a ray, which is created from the light emitted by the light source. With the two optical sensors 104 and 106 and a baseline of the frame of reference FR1, e.g., a line passing through x-axis of the imaging surfaces of the optical sensors 104 and 106, an x-axis line of the frame of reference FR1, etc., between the two optical sensors 104 and 106 and the optical sensors 104 and 106 detecting light from a light source, there are two rays that intersect in the real world and the point of intersection is a position of the light source from the frame of reference FR1. In some embodiments, the frame of reference FR1 is the baseline of the HMD 102. The ray intersection calculation operation is stored as a logic, e.g., a computer code, a software program, etc., in the memory device 1202.

In various embodiments, the two rays may not intersect. In these embodiments, a position of a light source is determined by the position determination module 1204, using a closest point algorithm, as a mid-point between closest two points of the rays. For example, the position determination module 1204 determines a point on a ray detected by the optical sensor 104 that is closest to a point on a ray detected by the optical sensor 106. The position determination module 1204 calculates a mid-point between the two points and determines the mid-point to be a position of a light source that emits the two rays that are sensed by the optical sensors 104 and 106.

It should be noted that in some embodiments, the position determination module 1204 identifies one of the wearable devices WD1 thru WD10 from an identification code of the wearable device. For example, the position determination module 1204 is connected to and in communication with the synchronizer 1107 (FIG. 11A-1) via the communication devices 114 and 116 to obtain an identification code of one of the wearable devices WD1 thru WD10 to which a synchronization signal having the identification code of the wearable device is transmitted by the signal transmitter 1104 (FIG. 11A-1). Based on the identification code of the wearable device, the position determination module 1204 determines that light is reflected from a light source of the wearable device.

It should be noted that in some embodiments in which the light source LE1 is occluded from the optical sensor 104, a position of the occluded light source from the frame of reference FR1 is determined by the position determination module 1204 based on a previously determined position of the occluded light source from the frame of reference FR1 and a prediction of movement of the occluded light source. The previously determined position is determined during a time the light source LE1 is not occluded. In some embodiments, the previously determined position is determined during a calculation cycle of the position determination module 1204 immediately before, e.g., preceding, etc., a calculation cycle of determination of a position of the occluded light source from the frame of reference FR1. As an example of determining a position of the occluded light source, the position determination module 1204 estimates the movement of the occluded light source based on two positions from the frame of reference FR1 that are determined preceding to the determination of the position for the occluded light source and an amount of time passed from a movement of the occluded light source from a first one of the two positions to a second one of the two positions. To further illustrate, a velocity is calculated as a difference between the second position and the first position and the amount of time. The amount of time is calculated by the position determination module 1204 based on time that is provided by a clock source (not shown) that is coupled to the position determination module 1204. As another example of determination of a position of the occluded light source, the position is determined from information regarding movement of a finger of the user 101 on which the occluded light source is worn. To further illustrate, the position determination module 1204 accesses a trajectory of movement of the finger and/or joints of an arm of the user 101 from multiple trajectories of the finger and/or the joints stored in the memory device 1202, and determines a position of the occluded light source based on the trajectory. In this illustration, the trajectories are pre-calculated with respect to the frame of reference FR1. Moreover, in this illustration, a trajectory of a body part includes multiple positions that the body part is capable of achieving for the user 101 (FIG. 1). Furthermore, in this illustration, the trajectory of the body part excludes positions that the body part is constrained from achieving for the user 101. As yet another example of determination of a position of the occluded light source, both the trajectory and the velocity are used to determine a position of the occluded light source from the frame of reference FR1.

In various embodiments in which the light source LE1 is occluded from the optical sensor 104, a position of the occluded light source from the frame of reference FR1 of the HMD 102 is determined by the position determination module 1204 based on image data that is captured using the image capture device. The image data that is captured using the image capture device is stored as historical information in the memory device 1208 for access by the position determination module 1204.

Figure 13:
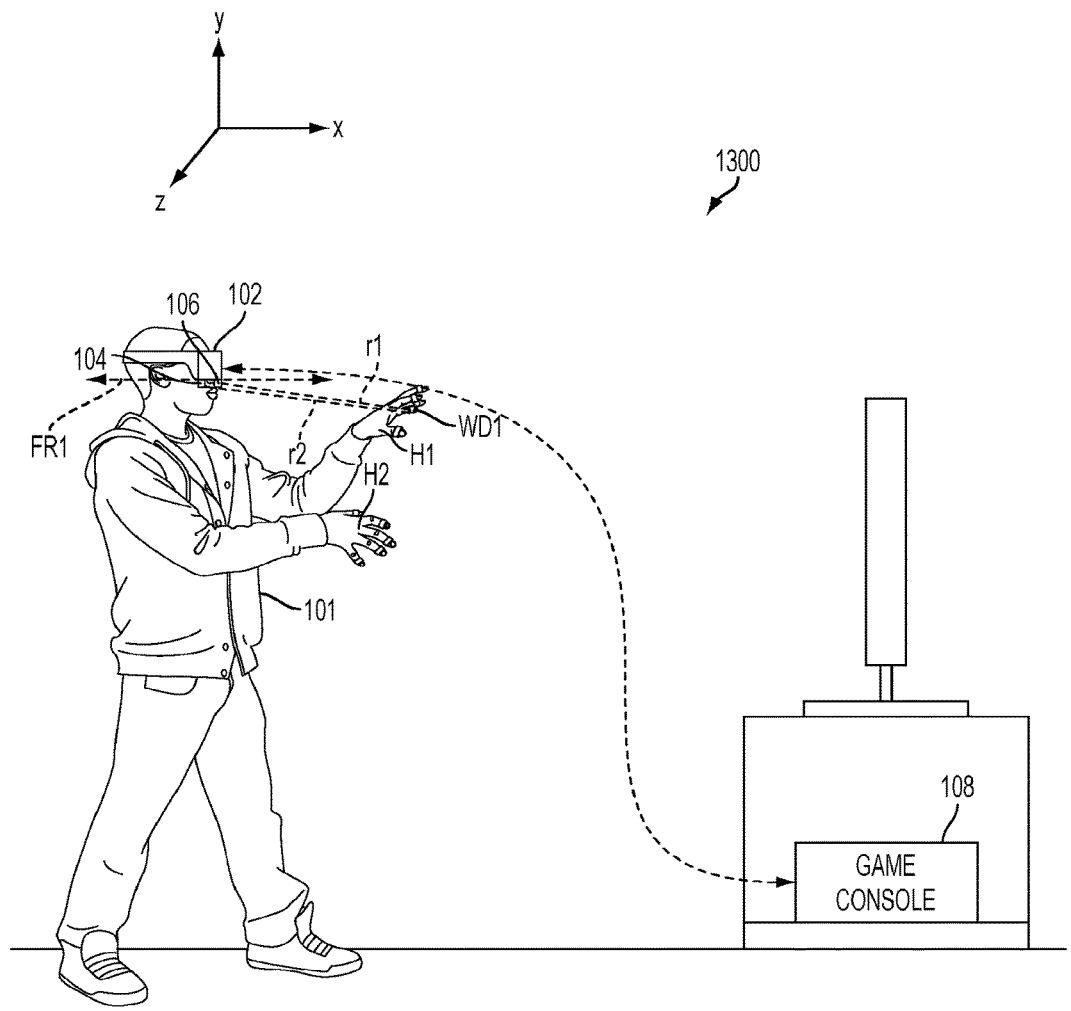
FIG. 13 is a diagram of a system to illustrate use of ray intersection calculation to determine a position of a light source from a reference frame of optical sensors on the HMD, in accordance with one embodiment of the present disclosure.

FIG. 13 is a diagram of an embodiment of a system 1300 to illustrate ray intersection calculation used to determine a position of the light source LE1 from the reference frame FR1 of the optical sensors 104 and 106. A ray of light r1 extends from the light source LE1 of the wearable device WD1 to the optical sensor 106. Moreover, a ray of light r2 extends from the light source LE1 to the optical sensor 104. Ray intersection calculation is applied to the two rays r1 and r2 by the position determination module 1204 (FIG. 12) to determine a point of intersection of the two rays and the point is a position of the light source LE1 with respect the reference frame FR1. In some embodiments, the position of the light source LE1 with respect to the reference frame FR1 is at a distance, e.g., a perpendicular distance, etc., from a point, e.g., a reference co-ordinate point (0, 0, 0), etc., on the reference frame FR1. In various embodiments, the position of the light source LE1 with respect to the reference frame FR1 is at distances in x, y, and z directions, as defined by an xyz co-ordinate system, from a point on the reference frame FR1.

In some embodiments in which the two rays r1 and r2 do not intersect each other, the ray intersection calculation is applied by determining two points, one on each ray, that are closest to each other. The ray intersection calculation further includes determining a mid-point between the two points as a position of the wearable device WD1 from which the two rays are emitted.

It should be noted that instead of two optical sensors 104 and 106, any number of optical sensors are used at the bottom edge of the HMD 102 (FIG. 1). An accuracy of a position of a light source increases as a number of optical sensors used to detect light from the light source increases.

In some embodiments, when ray intersection calculation cannot be used, e.g., when the light source LE1 is not occluded from the optical sensor 104 but is occluded from the optical sensor 106, when the light source LE1 is not occluded from the optical sensor 106 but is occluded from the optical sensor 104, when the light source LE1 is occluded from both optical sensors 104 and 106, etc., the position determination module 1204 determines a position of one of the light sources LE1 thru LE10, e.g., LE1, etc., from positions of one or more of the remaining of the light sources, e.g., LE2 thru LE10. For example, the position determination module 1204 extrapolates a line passing through positions of the light sources LE2 and LE3 until a pre-determined distance to determine a position of the light source LE1. Moreover, in these embodiments, the position determination module 1204 is pre-programmed with the pre-determined distance ranging between two adjacent fingers of the user 101 (FIG. 1). An example of two adjacent fingers includes an index finger of the left hand of the user 101 and a middle finger of the left hand. Another example of two adjacent fingers includes a middle finger of the right hand of the user 101 and a ring finger of the right hand. Further, in these embodiments, the positions of the remaining, e.g., unoccluded, etc., light sources are determined from electrical signals that are generated by the optical sensors 104 and 106 that detect light from the remaining light sources.

In several embodiments, the positions of the remaining light sources are used in conjunction with the velocity of movement of the occluded light source and/or the trajectory of a body part on which the occluded light source is worn to determine a position of the occluded light source.

In various embodiments, the position determination module 1204 determines a position of the wearable devices WD1 thru WD10 during calibration. In some embodiments, the calibration is done before playing a game or before navigating a virtual or an augmented reality environment. During the calibration, the game processor 110 (FIG. 1) sends a command via the communication devices 114 and 116 (FIG. 1) to the CPU 112 of the HMD 102 (FIG. 1) to display one or more images, e.g., images of a virtual object, etc., on the one or more display screens 118 (FIG. 1). When the one or more images are displayed, the game processor 110 sends a command to the CPU 112 to display an instruction to the user 101 to move his/her fingers on which the wearable devices WD1 thru WD10 are worn so that the one or more images are displayed in a manner, e.g., a virtual object falls in a circle, a virtual tank is hit with a missile, etc. As the user 101 moves his/her fingers within a range in the real world, positions of the wearable devices WD1 thru WD10 are determined by the position determination module 1204. Based on the position, the game processor changes positions of the one or more images to be displayed on the one or more display screens 118 and sends a command to the CPU 112 to move the one or more images according to the changed positions. A mapping between the movement of the fingers in the real world and movement of the one or more images is stored in the game memory device 120 (FIG. 1) of the game console 108. The mapping is determined during the calibration. During an interaction with a virtual or an augmented reality environment, the game processor 110 or the position determination module 1204 determines whether there is an error between movement that passes through various positions of the wearable devices WD1 thru WD10 received during the interaction and positions of the wearable devices WD1 thru WD10 received during the calibration for the same amount of movement of the one or more images.

The game processor 110 or the position determination module 1204 corrects for the error, e.g., changes a position of the one or more images, etc., during the interaction.

In some embodiments, the calibration is not performed. For example, when the glove 502 (FIG. 5) is used, the calibration is not performed.

FIGS. 14A, 14B, and 14C are used to illustrate an embodiment of a torso device 1402 for providing a frame of reference FR2 with respect to the reference frame FR1 when one or more of the wearable devices WD1 thru WD10 are occluded from the optical sensors 104 and 106. FIG. 14A is used to illustrate occlusion of the wearable devices WD9 and WD10. There is no line-of-sight between the light source LE9 of the wearable device WD9 and the optical sensor 104. Moreover, there is no line-of-sight between the wearable device WD10 and the light source LE10 of the optical sensor 104. The wearable devices WD9 and WD10 may be rotated on corresponding fingers of the user 101 so that the LEs 9 and 10 face palm of the right hand of the user 101 rather than facing to a dorsal side of the right hand to result in occlusion from the optical sensor 104. Similarly, there is occlusion between the wearable device WD3 and the optical sensor 106, and between the wearable device WD5 and the optical sensor 106.

FIG. 14B shows an embodiment of the torso device 1402 to provide the reference frame FR2 relative to the reference frame FR1 of the HMD 102. The torso device 1402 is attached to a torso of the user 101. For example, the torso device 1402 is integrated in a belt that is worn by the user 101. Examples of the belt include one that is made from a fabric or from leather. In some embodiments, the torso device 1402 is attached, e.g., via a magnet, via glue, via Velcro™, etc., to the belt. In various embodiments, the torso device 1402 is attached via a clip to a clothing, e.g. pants, etc., of the user 101. The torso device 1402 includes two optical sensors 1408 and 1410.

Moreover, the HMD 102 is modified to include two light sources 1404 and 1406. As an example, the light sources 1404 and 1406 are attached, e.g., via magnets, glue, Velcro™, etc. to the HMD 102 to modify the HMD 102. The modified HMD 102 is referred to herein as an HMD 1412. Examples of each light source 1404 and 1406 are the same as that provided above as an example of each of the light sources LE1 thru LE10 (FIG. 1).

The light sources 1404 and 1406 emit light that is detected by the optical sensors 1408 and 1410. In some embodiments, the light sources 1404 and 1406 emit light sequentially. In various embodiments, the light sources 1404 and 1406 emit light simultaneously.

The optical sensors 1408 and 1410 detect the light that is emitted by the light sources 1404 and 1406 to generate electrical signals. The electrical signals are used to determine a position of each light source 1404 and 1406 from the optical sensors 1408 and 1410. For example, electrical signals are communicated by a communication device 1414 of the torso device 1402 to the communication device 114 of the game console 108 (FIG. 1). The communication device 1414 receives the electrical signals and provides the electrical signals to an A-to-D converter (not shown) of the game console 108 and the A-to-D converter converts the electrical signals into digital data. The position of each light source 1404 and 1406 from the optical sensors 1408 and 1410 is used to provide a relative position and orientation between the reference frame FR1 and the reference frame FR2.

The position determination module 1204 is pre-programmed to determine a line, e.g. an x-axis line, etc., that passes through the positions of the optical sensors 1408 and 1410 to be the reference frame FR2. For example, a baseline that passes through imaging surfaces of the optical sensors 1408 and 1410 is determined to be the reference frame FR2. Moreover, the reference frame FR1 passes through the positions of the light sources 1404 and 1406. For example, the reference frame FR1 is pre-determined by the position determination module 1204 to be a line that passes through the positions of the light sources 1408 and 1410. It should be noted that the light sources 1404 and 1406 are located with respect to the HMD 102 so that the reference frame FR1 of the optical sensors 104 and 106 is the same as the reference frame of the light sources 1404 and 1406. For example, the light sources 1404 and 1406 are located with respect to, e.g., under, on, etc., the HMD 102 on a same line that passes through and between the optical sensors 104 and 106.

An image capture device, e.g., an image capture device of the game console 108, an image capture device location on a television, an image capture device of the HMD 102, etc., captures position and orientation of the reference frame FR2 and provides the position and orientation of the reference frame FR2 to the position determination module 1204. For example, an image capture device of the HMD 102 captures an image of position and orientation of the optical sensors 1402 and 1408, and provides the position and orientation via the communication devices 114 and 116 to the position determination module 1204.

In some embodiments, the torso device 1402 includes inertial sensors for measuring orientation of the optical sensors 1402 and 1408. The inertial sensors of the torso device 1402 provide the orientation of the optical sensors 1402 and 1408 via the communication device 1414 and the communication device 114 of the game console 108 to the position determination module 1204.

In various embodiments, both or one of inertial sensors and an image capture device are used to determine position and orientation of the optical sensors 1402 and 1408.

Upon determining the position and orientation reference frame FR2, the position determination module 1204 determines a relative position and orientation between the reference frames FR1 and FR2. For example, the position determination module 1204 determines a distance between the reference frames FR1 and FR2 and an angle formed between the two reference frames FR1 and FR2.

FIG. 14C is used to illustrate a determination of a position of the occluded wearable device WD10 with respect to the reference frame FR2. The wearable device WD10 emits light towards the optical sensors 1408 and 1410 of the torso device 1402. The optical sensors 1408 and 1410 sense the light to generate electrical signals, which are transmitted by the communication device 1414 to the communication device 114 of the game console 108 for converting into digital data by the A-to-D converter of the game console 108. The digital data is provided to the position determination module 1204 of the game console 108.

In a manner similar to that described above of determining a position of the light source LE1 of the wearable device WD1 from the frame of reference FR1 between the optical sensors 104 and 106, the position determination module 1204 (FIG. 12) determines a position of the light source LE10 of the occluded wearable device WD10 from the frame of reference FR2 between the optical sensors 1408 and 1410. Moreover, based on the relative position and orientation between the reference frames FR1 and FR2 and the position of the light source LE10 with respect to the reference frame FR2, the position determination module 1204 determines a position of the occluded light source LE10 of the wearable device WD10 with respect to the reference frame FR1.

Figure 15A:
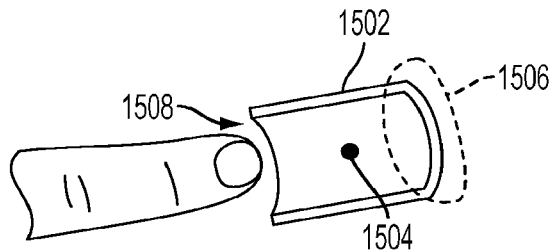
FIG. 15A is a diagram of a haptic feedback system that is used to provide haptic feedback to the user based on a state of a game, in accordance with one embodiment of the present disclosure.

FIG. 15A is a diagram of an embodiment of a haptic feedback system 1502 that is used to provide haptic feedback to the user 101 (FIG. 1) based on a state of a game. Moreover, the haptic feedback system 1502 includes a light source 1504, which is an example of any of the light sources LE1 thru LE10 (FIG. 1). An example of the haptic feedback system 1502 includes a thimble. In some embodiments, the haptic feedback system 1502 is made of a fabric, a plastic, or a metal.

The haptic feedback system 1502 has a closed end 1506 that covers a tip of a finger of the user 101. A finger of the user 101 is inserted into the haptic feedback system 1502 through an open end 1508, which is located in a direction opposite to the closed end 1506.

When there is a change in a game state of the game code that is executed by the game processor 110 (FIG. 1), e.g., a virtual user is attacking another virtual user that represents the user 101, a virtual hand of the user 101 touches a virtual wall or another virtual object in a game, etc., the haptic feedback system 1502 provides a sense of touch to the user 101 by applying a force, e.g., a vibration, etc., to the user 101's finger.

Figure 15B:
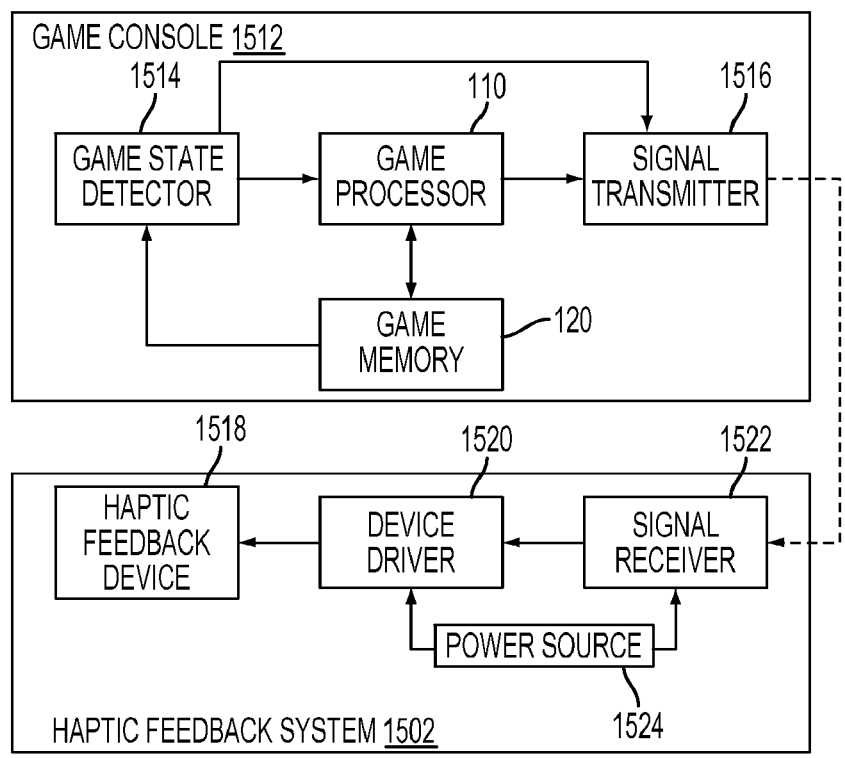
FIG. 15B is a diagram of a system used to illustrate control of the haptic feedback system by a game console, in accordance with one embodiment of the present disclosure.

FIG. 15B is a diagram of an embodiment of a system 1510 used to illustrate control of the haptic feedback system 1502 by a game console 1512. The game console 1512 is an example of the game console 108 (FIG. 1). The game console 1512 includes the game processor 110, the game memory 120, a game state detector 1514 and a signal transmitter 1516. Examples of the game state detector 1514 include a PLD, or an ASIC, or a processor, or a combination thereof. In some embodiments, the game state detector 1514 is implemented within the game processor 110. An example of the signal transmitter 1516 includes a modulator.

The haptic feedback system 1502 includes a haptic feedback device 1518, a device driver 1520, a signal receiver 1522, and a power source 1524. An example of the power source 1524 includes a battery and an example of the device driver 1520 includes one or more transistors. An example of the signal receiver 1522 includes a demodulator and an example of the haptic feedback device 1518 includes a tactile actuator, e.g., a vibration motor, etc. The power source 1520 provides power to the signal receiver 1522 and the device driver 1520.

The game state detector 1514 detects a state of the game code that is executed by the game processor 110 to determine whether haptic feedback is to be provided to the haptic feedback system 1502. For example, the game state detector 1514 detects that a signal indicating an input provided by the user 101 is received by the game processor 110 or that a portion of the game code is being executed by the game processor 110. In this example, the portion indicates that haptic feedback is to be provided to the user 101. Moreover, in this example, the signal indicating the input is received by the game processor 110 from the position determination module 1204. When the user 101 moves his/her fingers to interact with a game that is displayed on the one or more display screens 118 (FIG. 1) of the HMD 102, the position determination module 1204 determines positions of the wearable devices WD1 thru WD10 for providing to the game processor 110. The movement of the fingers is an example of the input received from the user 101. It should be noted that the user 101 moves his/her fingers during play of a game to touch a virtual object, e.g., a virtual wall, a cursor, a virtual animal, a virtual building, a virtual user, a virtual hand, a virtual finger, a virtual arm, a virtual environment, etc., that is displayed on the one or more display screens 118 of the HMD 102.

In some embodiments, the input provided by the user 101 changes a state of a game. For example, when the signal indicating the input is received by the game processor 110, the game processor 110 executes a next portion of the game code. The next portion indicates that haptic feedback be provided to the haptic feedback system 1502. Examples of a state of a game include a position of a virtual object in the game, a color of a virtual environment in the game, a texture of the virtual environment, a number of points assigned to an account of the user 101 in the game, a number of virtual gifts provided to the account of the user 101 in the game, etc.

Upon determining that a game state or the input from the user 101 indicates that haptic feedback be provided to the haptic feedback system 1502, the game state detector 1514 sends a feedback signal to the signal transmitter 1516. The signal transmitter 1516 generates a signal by modulating the feedback signal and sends the modulated signal to the signal receiver 1522 of the haptic feedback system 1502.

The signal receiver 1522 receives the modulated signal, demodulates the modulate signal to generate the feedback signal, and provides the feedback signal to the device driver 1520. Upon receiving the feedback signal, the device driver 1520 generates a current signal to drive the haptic feedback device 1518. When the haptic feedback device 1518 is driven, the haptic feedback device 1518 vibrates to provide feedback to the user 101 regarding a state of a game.

In various embodiments, the haptic feedback system 1502 is implemented within the glove 502 (FIG. 5). For example, the haptic feedback system 1502 is implemented within each finger portion of the glove 502 for receiving a signal transmitted.

Figure 16:
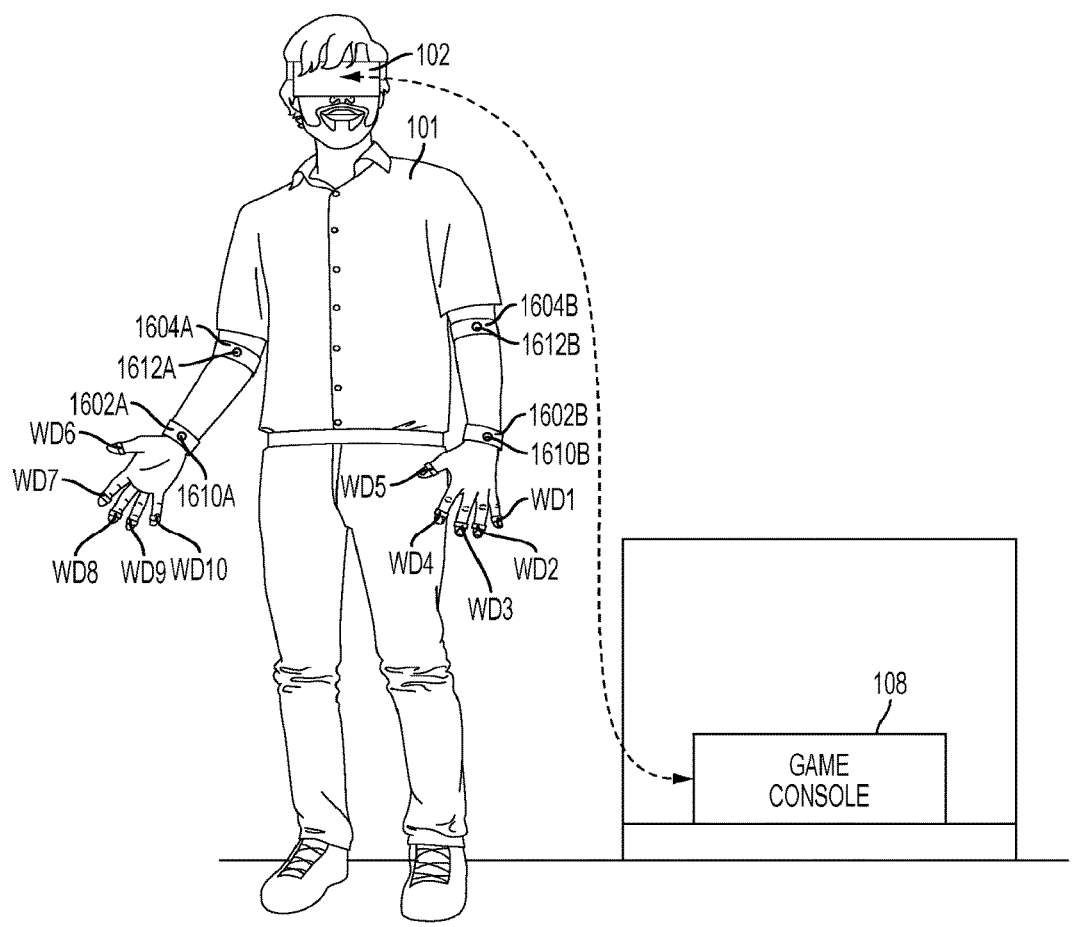
FIG. 16 is a diagram of a system indicating that wearable devices are worn on other body parts of the user, in accordance with one embodiment of the present disclosure.

FIG. 16 is a diagram of an embodiment of a system 1600 indicating that wearable devices are worn on other body parts of the user 101. For example, a wearable device 1602A is worn on a wrist on the right hand of the user 101 and another wearable device 1602B is worn on a wrist on the left hand of the user 101. As another example, a wearable device 1604A is worn around a right elbow of the user 101 and a wearable device 1604B is worn around a left elbow of the user 101.

Each wearable device 1602A, 1602B, 1604A, and 1604B is made of a fabric, or a plastic, or a metal. Each wearable device 1602A, 1602B, 1604A, and 1604B has a light source integrated into the wearable device. For example, the wearable device 1602A has a light source 1610A, the wearable device 1602B has a light source 1610B, the wearable device 1604A has a light source 1612A, and the wearable device 1604B has a light source 1612B.

In some embodiments, the wearable device 1602A is worn on any portion of a right forearm of the user 101 and the wearable device 1602B is worn on any portion of a left forearm of the user 101. In various embodiments, the wearable device 1604A is worn on any portion of a right upper arm of the user 101 and the wearable device 1604B is worn on any portion of a left upper arm of the user 101.

The wearable device 1602A provides a position of the right wrist of the user 101 and the wearable device 1602B provides a position of the left wrist of the user 101. Similarly, the wearable device 1604A provides a position of the right elbow of the user 101 and the wearable device 1604B provides a position of the left elbow of the user 101.

The light sources of the wearable devices 1602A, 1602B, 1604A, and 1604B emit light in synchronization with emission of light by the wearable devices WD1 thru WD10. For example, the light source 1610A emits light first, the light source 1610B emits light second, the light source 1612A emits light third, the light source 1612B emits light fourth, and then the light sources LE1 thru LE10 emit light in a sequential fashion, examples of which are provided above. As another example, the light sources LE1 thru LE10 emit light in a sequential fashion, then the light source 1610A emits light followed by the light source 1610B further followed by the light source 1612A and further followed by the light source 1612B. As yet another example, the light source 1610B emits light first, the light source 1610A emits light second, the light source 1612A emits light third, the light source 1612B emits light fourth, and then light sources LE1 thru LE10 emit light in a sequential fashion.

Movement of the elbows and the wrists of the user 101 act as an input during game play to result in a change in positions of the light sources 1610A, 1610B, 1612A, and 1612B. Positions of the light sources 1610A, 1610B, 1612A, and 1612B are determined by the signal detector 1200 (FIG. 12) in a manner similar to that described above of determining the positions of the light sources LE1 thru LE10 (FIG. 1). The positions of the light sources 1610A, 1610B, 1612A, and 1612B are communicated to the game processor 110 (FIG. 1) via the communication devices 116 and 114 (FIG. 1) during game play for changing a state of a game.

In some embodiments, the user 101 wears one or more of the wearable devices 1602A, 1602B, 1604A, and 1604B, and emission of light by the one or more of the wearable devices 1602A, 1602B, 1604A, and 1604B is synchronized with emission of light by the wearable devices WD1 thru WD10.

In various embodiments, the user 101 does not wear the wearable devices WD1 thru WD10 and wears one or more of the wearable devices 1602A, 1602B, 1604A, and 1604B. In these embodiments, the wearable devices 1602A, 1602B, 1604A, and 1604B emit light one at a time in synchronization, e.g., in sequence, etc., with each other. For example, the light source 1610A emits light first, the light source 1610B emits light second, the light source 1612A emits light third, and the light source 1612B emits light fourth. As another example, the light source 1610B emits light first, the light source 1610A emits light second, the light source 1612B emits light third, and the light source 1612A emits light fourth.

In various embodiments, each of the wearable devices 1602A, 1602B, 1604A, and 1604B has a built-in haptic feedback system, similar to the haptic feedback system 1502 (FIG. 15A) to provide haptic feedback to the user 101 during game play.

In some embodiments, each of the wearable devices 1602A, 1602B, 1604A, and 1604B has inertial sensors that capture an orientation of the wearable device. Moreover, the captured orientation is communicated via a communication device located within the wearable device and the communication device 114 of the game console to the position determination module 1204.

Figure 17A:
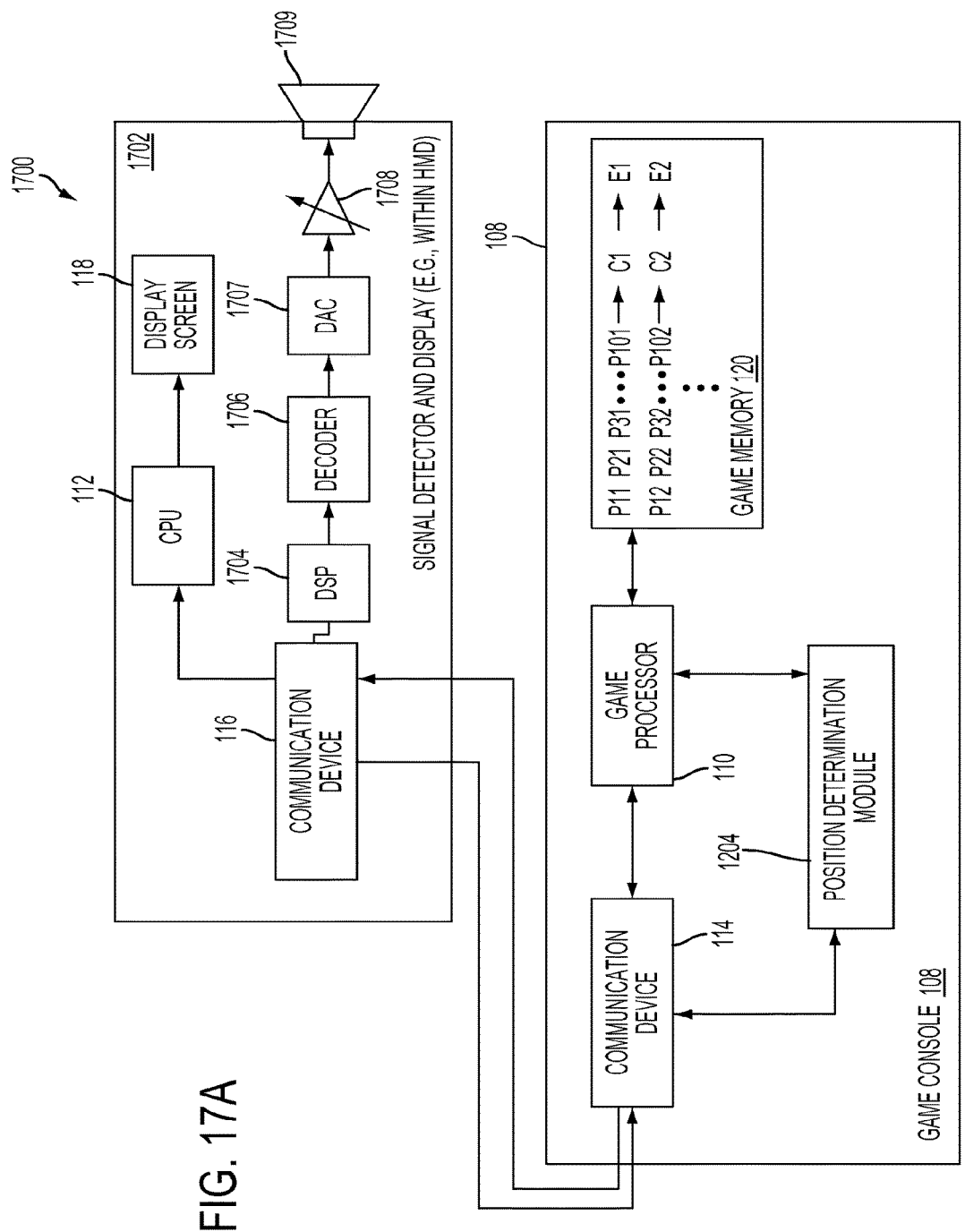
FIG. 17A is a diagram of a system to illustrate use of positions of wearable devices for determining a game command, in accordance with one embodiment of the present disclosure.

FIG. 17A is a diagram of an embodiment of a system 1700 to illustrate use of positions of wearable devices, e.g., the wearable devices WD1 thru WD10 (FIG. 1), etc., for determining an interface command, e.g., a game command, a command to navigate through a virtual environment, a command to navigate through an augmented reality environment, etc. The system 1700 includes a signal detector and display (SDD) 1702 and the game console 108. The SDD 1702 includes the communication device 116, the HMD CPU 112, and the one or more display screens 118. The SDD 1702 further includes a digital signal processor (DSP) 1704, a decoder 1706, a digital-to-analog converter (DAC) 1707, an amplifier 1708, and a speaker 1709.

In various embodiments, the SDD 1702 is implemented within the HMD 102 (FIG. 1). In some embodiments, the SDD 1702 includes any number of speakers.

A command is used to generate environment data. The position determination module 1204 determines positions, e.g., positions P11, P21, P31, P41, P51, P61, P71, P81, P91, P101, P12, P22, P32, P42, P52, P62, P72, P82, P92, P102, etc., of wearable devices, e.g., the wearable devices WD10 thru WD10, etc., and provides the positions to the game processor 110. For example, the positions P11 and P12 are of the wearable device WD1, the positions P21 and P22 are of the wearable device WD2, the positions P31 and P32 are of the wearable device WD3, the positions P41 and P42 are of the wearable device WD4, the positions P51 and P52 are of the wearable device WD5, the positions P61 and P62 are of the wearable device WD6, the positions P71 and P72 are of the wearable device WD7, the positions P81 and P82 are of the wearable device WD8, the positions P91 and P92 are of the wearable device WD9, the positions P101 and P102 are of the wearable device WD10, etc.

It should be noted that in some embodiments, the position determination module 1204 provides positions of a wearable device and an identification code of the wearable device to the game processor 110.

The game processor 110 identifies within the game memory 120 an interface command that corresponds to positions of wearable devices. For example, the game processor 110 determines based on a mapping stored between the positions P11, P21, P31, P41, P51, P61, P71, P81, P91, and P101 and a command C1, that the command C1 is to be executed when the wearable devices WD1 thru WD10 are at the corresponding positions P11, P21, P31, P41, P51, P61, P71, P81, P91, and P101. As another example, the game processor 110 determines based on a mapping stored between the positions P12, P22, P32, P42, P52, P62, P72, P82, P92, and P102 and a command C2, that the command C2 is to be executed when the wearable devices WD1 thru WD10 are at the corresponding positions P12, P22, P32, P42, P52, P62, P72, P82, P92, and P102.

In some embodiments, a command is associated with any number of positions of any number of wearable devices. For example, the command C1 is mapped with three positions of any three of the wearable devices WD1 thru WD10. As another example, the command C2 is mapped to six positions of any six of the wearable devices WD1 thru WD10.

The game processor 110 executes a command that is determined based on positions of wearable devices to generate environment data. For example, the command C1 is executed to generate environment data E1 and the command C2 is executed to generate environment data E2. In some embodiments, the environment data includes data that identifies a position of a virtual object in a game scene, a color of a game background in the game scene, a color of the virtual object, a texture of the game background, a size, a position, a color, a size, and/or a texture of a virtual object in a virtual reality scene, a color of a background in the virtual reality scene, a texture of the background in the virtual reality scene, a size, a position, a color, a size, and/or a texture of a virtual object in an augmented reality scene, etc.

In various embodiments, the game processor 110 executes a game command that is determined based on positions of wearable devices to generate game audio data, e.g., phonemes, phrases, alphanumeric characters, sentences, musical notes, etc. For example, the game command GC1 is executed to generate game audio data GA1 and the game command is executed to generate game audio data GA2.

Game environment data that is generated by the game processor 110 is sent via the communication devices 114 and 116 to the CPU 112. The CPU 112 renders game environment data to display a game environment, e.g., a game scene, a game, etc., on the one or more display screens 118. The user 101 views a game on the one or more display screens 118 to play the game.

Moreover, in some embodiments, game audio data that is generated by the game processor 110 based on positions of wearable devices is sent via the communication devices 114 and 116 to the DSP 1704. The DSP 1704 processes, e.g., equalizes, or filters, or cancels noise, or cancels echo, or a combination thereof, etc., from audio data to generate processed audio data and provides the processed audio data to the decoder 1706. The decoder 1706 decodes, e.g., interprets, converts, decompresses, etc., the processed audio data to generate decoded audio data. The decoded audio data is converted from a digital format into an analog format by the DAC 1707 to generate analog audio electrical signals. The analog audio electrical signals are amplified by the amplifier 1708 to generate amplified electrical signals. The amplified electrical signals are provided by the amplifier 1708 to the speaker 1709 to output sounds of a game.

It should be noted that in some embodiments, the position determination module 1204 is located within the HMD 102 instead of the game console 108.

Figure 17B:
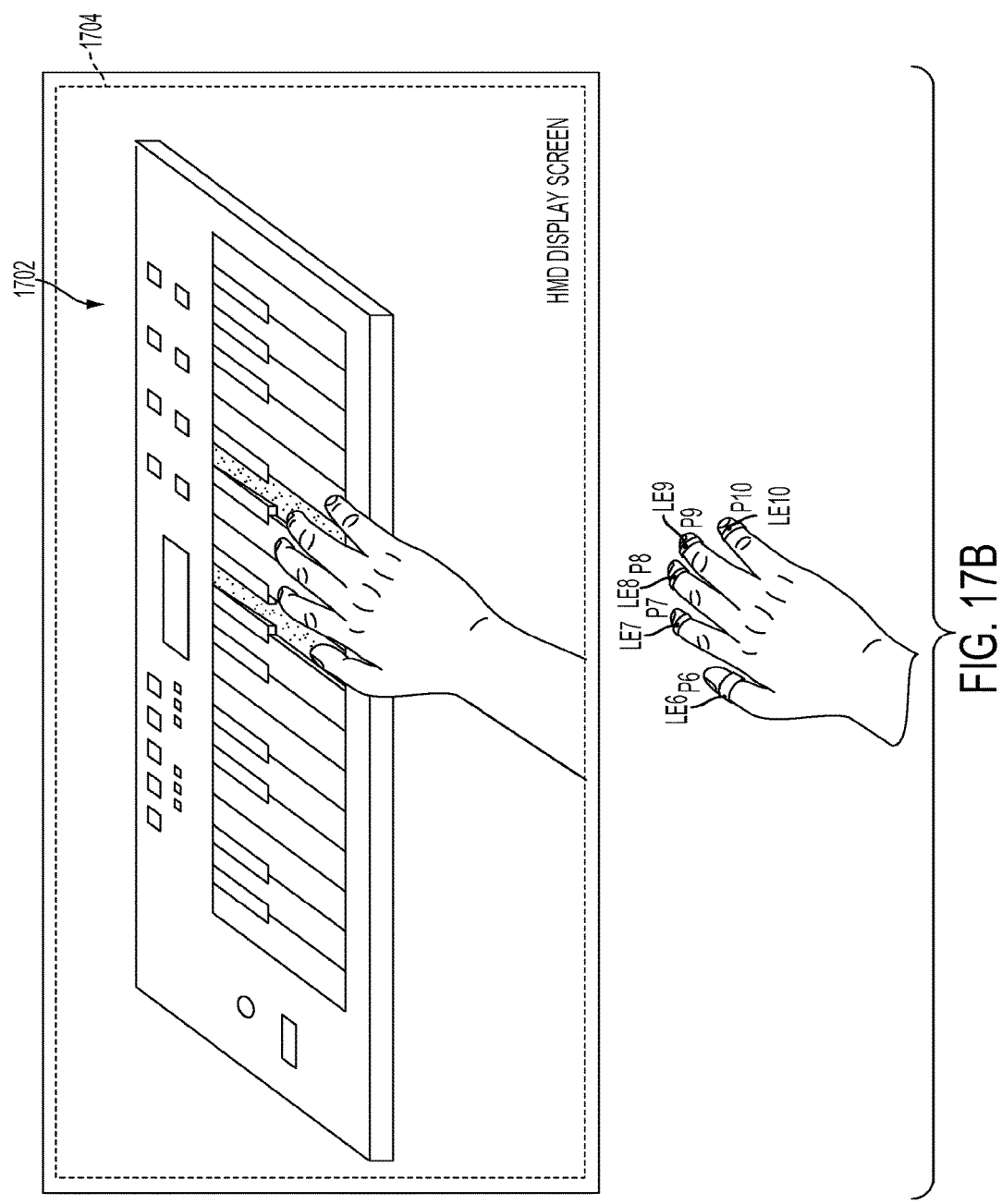
FIG. 17B is a diagram of a game that is displayed on a display screen of the HMD to illustrate a co-ordination between positions of wearable devices and images of virtual fingers that are displayed in a game displayed on the HMD, in accordance with one embodiment of the present disclosure.

FIG. 17B is a diagram of an embodiment of a game 1702 that is displayed on the one or more display screens 118 (FIG. 1) to illustrate a co-ordination between positions of the wearable devices WD1 thru WD10 and images of virtual fingers that are displayed in the game 1702. In some embodiments, each virtual finger is an example of a virtual object. The game 1702 includes a game image 1712 of a virtual keyboard and the virtual fingers.

When the user 101 performs a pressing action by lowering a thumb of his/her right hand and a ring finger of the right hand compared to remaining fingers of the right hand, a similar pressing action is performed within the game 1702. In the similar pressing action, a virtual thumb of a virtual right hand of the user 101 is lowered and a virtual ring finger of the virtual right hand is lowered compared to remaining fingers of the virtual right hand. Moreover, the game image 1712 shows a key of the virtual keyboard as being pressed by the virtual thumb and another key of the virtual keyboard as being pressed by the virtual ring finger. Furthermore, a sound of the keyboard being played is generated by audio speakers, e.g., the speaker 1709 (FIG. 17A), etc., that are implemented within the HMD 102 (FIG. 1).

Figure 17C:
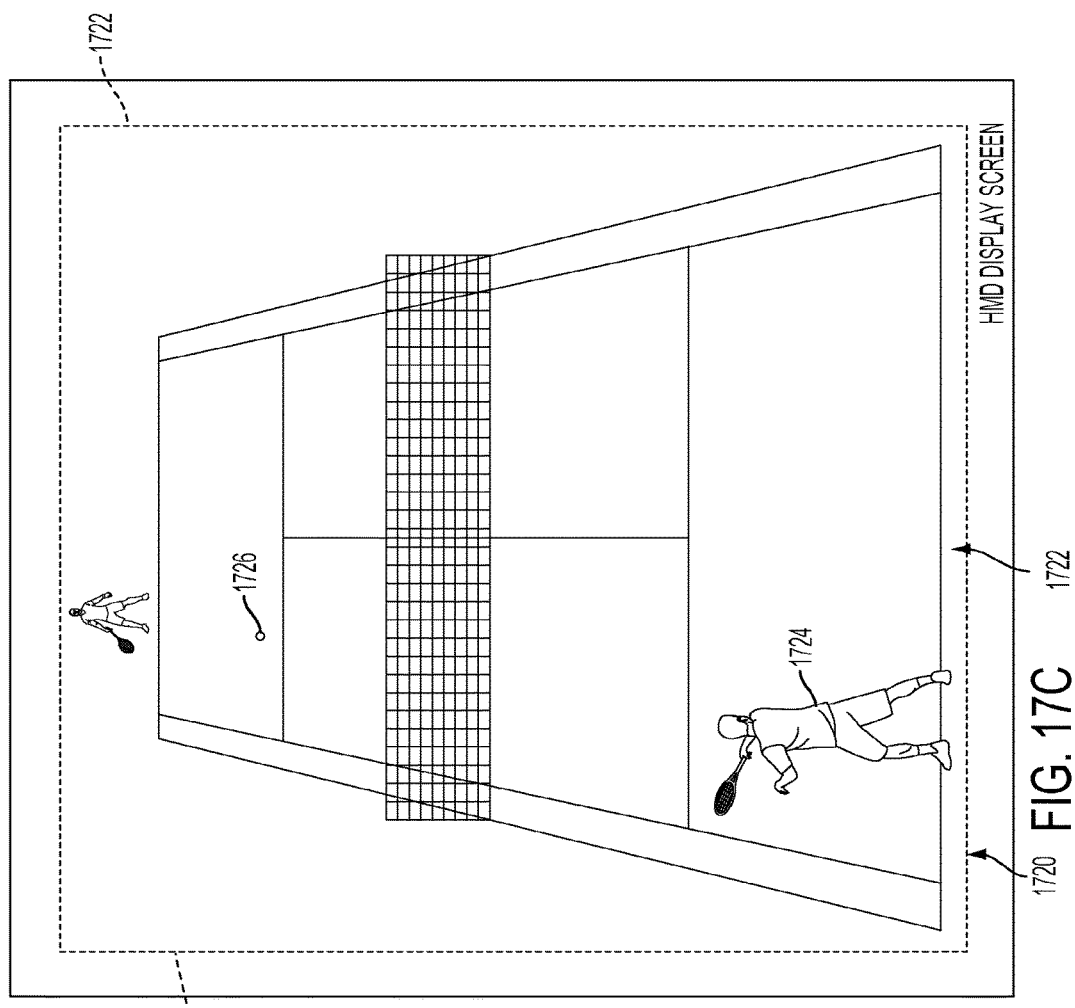
FIG. 17C is a diagram of a tennis game that is being played by the user while the tennis game is being displayed on a display screen of the HMD, in accordance with one embodiment of the present disclosure.

FIG. 17C is a diagram of an embodiment of a tennis game that is being played by the user 101 while the tennis game 1720 is being displayed on the one or more display screens 118 (FIG. 1). The tennis game 1720 includes a tennis image 1722 that is rendered on the one or more display screens 118 of the HMD 102. The user 101 performs a forearm action for his/her right hand to go over his/her left shoulder. When the user 101 performs the forearm action, positions of the wearable devices 1602A, 1602B, 1604A, and 1604B are determined by the position determination module 1204 (FIG. 12). The CPU 112 (FIG. 1) of the HMD 102 generates the tennis image 1722 in which a virtual user 1724 hits a virtual tennis ball 1726 by a performing virtual forearm action. In the virtual forearm action, a right virtual hand of the virtual user 1724 goes over a virtual shoulder of the virtual user 1724.

Figure 17F:
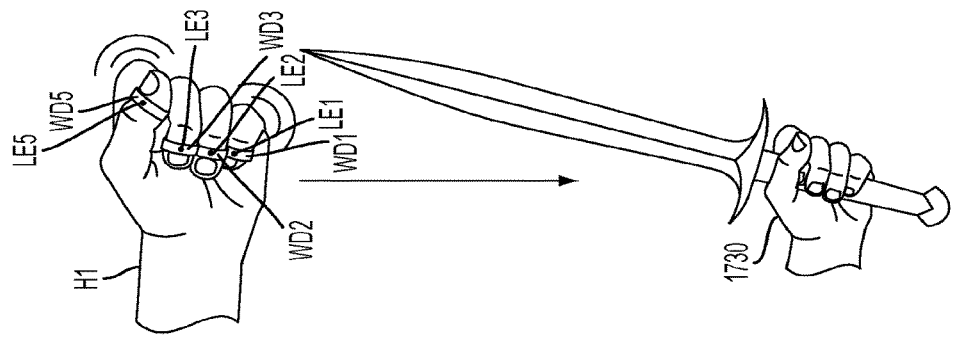
FIG. 17F is a diagram of illustrating a holding action performed by the user to hold a weapon in a game that is displayed on a display screen of the HMD, in accordance with one embodiment of the present disclosure.
Figure 17E:
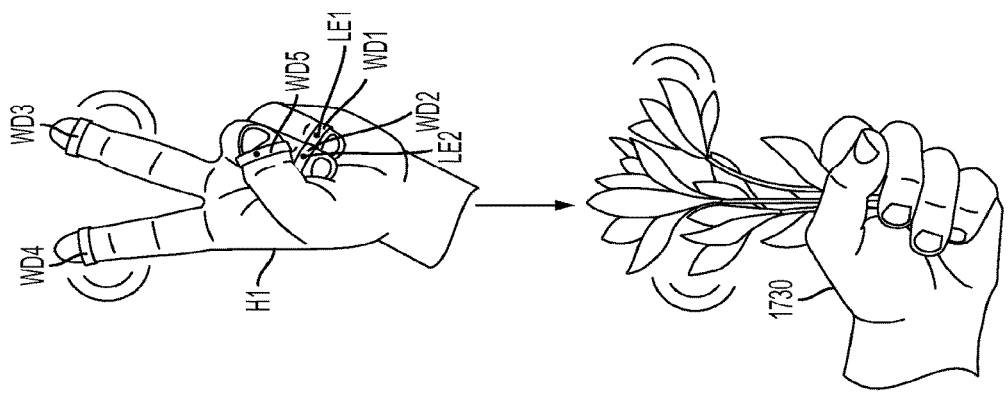
FIG. 17E is a diagram of a two finger gesture that is performed by the user to hold a virtual flower in a game displayed on the HMD, in accordance with one embodiment of the present disclosure.
Figure 17D:
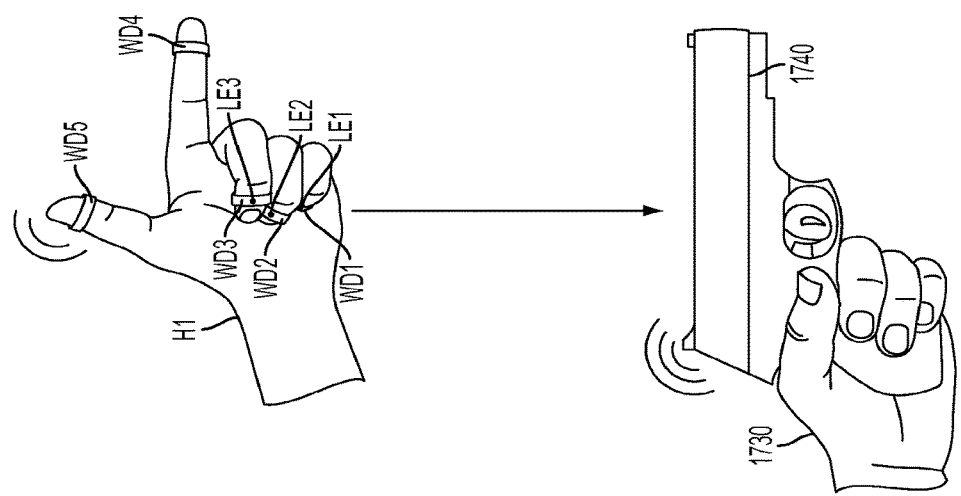
FIG. 17D is a diagram of a gesture performed to hold a virtual gun in a game displayed on the HMD, in accordance with one embodiment of the present disclosure.

FIGS. 17D thru 17I illustrate various gestures performed by the user 101 while wearing the wearable devices WD1 thru WD10. FIG. 17D is a gesture of an action for holding a gun, in which a virtual gun 1740 is held in a game that is displayed on the one or more display screens 118 (FIG. 1) of the HMD 102 (FIG. 1). In the holding gun action, the user 101 extends his/her index finger of the left hand H1 and his/her thumb of the left hand, and curls middle, ring, and little fingers of the left hand H1. When the holding gun action is performed, the CPU 112 (FIG. 1) of the HMD 102 displays an image of the gun 1740 being held by a virtual hand 1730 displayed in a game. In some embodiments, the gun 1740 appears in the virtual hand 1730 when the holding gun action is performed by the user 101.

FIG. 17E is a diagram of an embodiment of a two finger action that is performed by the user 101. In the two finger action, an index finger and a middle finger of the left hand H1 are raised while a ring finger, a little finger, and a thumb of the left hand are curled. During performance of the two finger action, the CPU 112 (FIG. 1) of the HMD 102 displays a virtual flower in the virtual hand 1730.

FIG. 17F is a diagram of an embodiment illustrating a holding action performed by the user 101 to hold a virtual weapon, e.g., a virtual sword, a virtual knife, a virtual stick, a virtual chain, a virtual whip, etc., in a game that is displayed on the one or more display screens 118 (FIG. 1) of the HMD 102 (FIG. 1). When the holding weapon action is performed, the CPU 112 (FIG. 1) of the HMD 102 displays a virtual sword wielded in the virtual hand 1730.

Figure 17I:
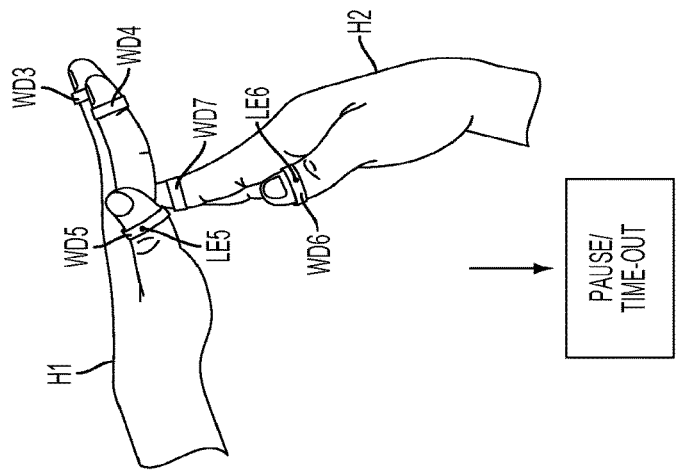
FIG. 17I is a diagram used to illustrate a pause gesture performed by the user and an effect of the pause gesture, in accordance with one embodiment of the present disclosure.
Figure 17H:
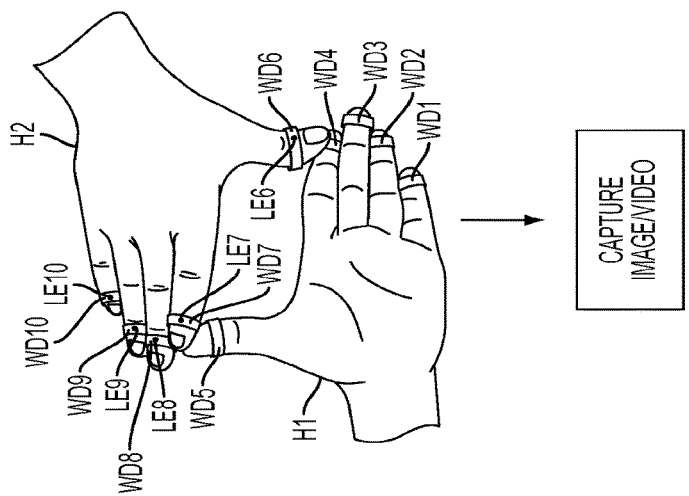
FIG. 17H is a diagram of a capture image gesture that is performed using both hands of the user to instruct an image capture device to capture an image or a video of a body part of the user or of a room in which the user is located, in accordance with one embodiment of the present disclosure.
Figure 17G:
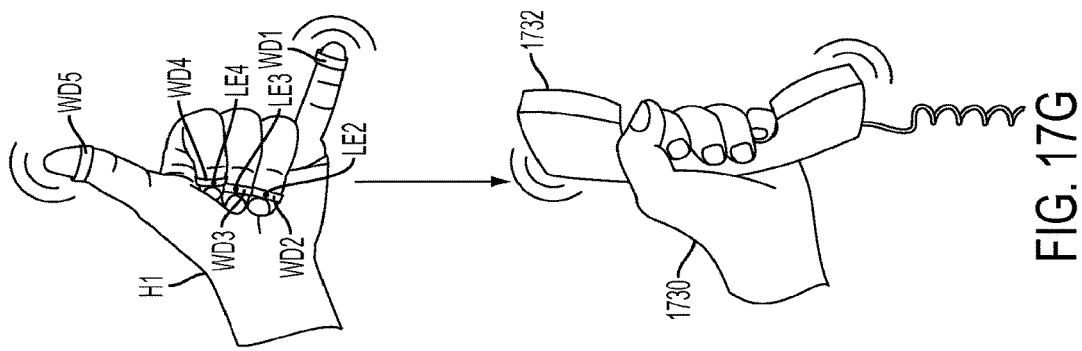
FIG. 17G is a diagram of a phone pickup action to illustrate use of a virtual phone in a game displayed on the HMD, in accordance with one embodiment of the present disclosure.

FIG. 17G is a diagram of an embodiment of a phone pickup action to illustrate use of a virtual phone 1732. When the user 101 (FIG. 1) extends his/her thumb and little finger of his/her left hand and curls an index finger, middle finger, and a ring finger of the left hand, the CPU 112 (FIG. 1) displays the virtual phone 1732 as being held by the virtual hand 1730 in a game that is displayed on the one or more display screens 118 (FIG. 1).

FIG. 17H is a diagram of an embodiment of a capture image gesture that is performed using both hands of the user 101 (FIG. 1) to instruct an image capture device to capture an image or a video of the body part, e.g., fingers, hands, wrists, forearm, palm, etc., of the user 101 or of a room in which the user 101 is located. For example, the HMD 102 includes an image capture device that is connected to an image processor (not shown) of the HMD 102. In some embodiments, the image processor of the HMD 102 is coupled to the communication device 116 (FIG. 1) of the HMD 102 and to the HMD memory 122 (FIG. 1). In various embodiments, the image processor of the HMD 102 is connected to another memory device instead of or in addition to the HMD memory 122. Upon determining that the capture image gesture is received by the image capture device of the HMD 102, the image processor of the HMD 102 instructs the image capture device to initiate or resume capturing an image or a video of the body part of the user 101 or of the room in which the user 101 is located. It should be note that when the image capture device of the HMD 102 is rear-facing, the image capture device captures an image of the room and when the image capture device is front-facing, the image capture device captures an image of the body part of the user 101. The capture image gesture is performed when the user 101 extends all of his/her fingers of his/her left hand and all of his/her fingers of his/her right hand, and touches the thumb of the left hand with the index finger of the right hand and touches the index finger of the left hand with the thumb of the right hand to form the capture image gesture.

In some embodiments, the capture image gesture is performed to trigger emission of light by the LEs 1 thru 10. For example, the SGD 901 (FIG. 9A) includes a switch (not shown) that is connected between the power source 610 (FIG. 9A) and the signal transmitter (FIG. 9A). Examples of the switch are provided above. The switch is connected to the image processor (not shown) of the HMD 102 and the image processor is further connected to the image capture device of the HMD 102 (FIG. 1). The image processor determines from an image captured by the image capture device of the HMD 102 that the capture image gesture is performed by the user 101 and sends a signal to the switch to close the switch. Upon closure of the switch, a power signal that is generated by the power source 610 is transferred via the switch to the signal transmitter 608. The signal transmitter 608 transmits the power signal 611 (FIG. 9A) to the LEs 1 thru 10 to enable the LEs 1 thru 10 to emit light.

FIG. 17I is a diagram of an embodiment to illustrate a pause, e.g., a timeout, etc., gesture performed by the user 101 and an effect of the pause gesture. Upon determining that the pause gesture is received, the image processor of the HMD 102 instructs the image capture device to pause capturing of images of the room or of the body part of the user 101.

In the embodiments in which the SGD 901 (FIG. 9A) includes the switch (not shown) that is connected between the power source 610 (FIG. 9A) and the signal transmitter 608 (FIG. 9A), the image processor of the HMD 102 determines that the pause gesture is performed. Upon determining that the pause gesture is performed by the user 101, the image processor of the HMD 102 sends a signal to the switch to open the switch. When the switch is open, a power signal that is generated by the power source 610 is not transferred via the switch to the signal transmitter 608 and the signal transmitter 608 does not transmit the power signal 611 (FIG. 9A). When the signal transmitter 608 does not transmit the power signal 611, the LEs 1 thru 10 stop or pause emitting light.

FIG. 18A is a diagram of an embodiment of various positions of hands of the user 101 to illustrate a change in a sampling rate or a change in a frequency, e.g., rate, etc., of emission of light by the light sources LE1 thru LE10 (FIG. 1) based on positions of wearable devices WD1 thru WD10 worn by the user 101. In a mode 1, it is determined by a hand position determination module (HPDM), which is further described below, that one or more of the wearable devices WD1 thru WD5 that are worn on the left hand of the user 101 are within a pre-determined position from one or more of the wearable devices WD6 thru WD10 that are worn on the right hand of the user 101. Upon determining that the wearable devices WD1 thru WD5 are within the pre-determined position from the wearable devices WD6 thru WD10, the HPDM instructs the sampler 904 (FIG. 9) via the communication devices 114 and 116 to decrease a sampling rate of sampling the digital data that is output by the A-to-D converter 906 (FIG. 9). The HPDM is connected to the sampler 904 via the communication devices 114 and 116.

In a mode 2, the HPDM determines that one or more of the wearable devices WD1 thru WD5 are not within the pre-determined position from one or more of the wearable devices WD6 thru WD10. In response to determining that the WD1 thru WD5 are not within the pre-determined position from the wearable devices WD6 thru WD10, the HPDM instructs the sampler 904 via the communication devices 114 and 116 to increase a rate of sampling digital data that is output by the A-to-D converter 906. The mode 1 is repeated by the user 101 after the mode 2 and a sampling rate of the sampler 904 is increased in a manner described above.

Figure 18B:
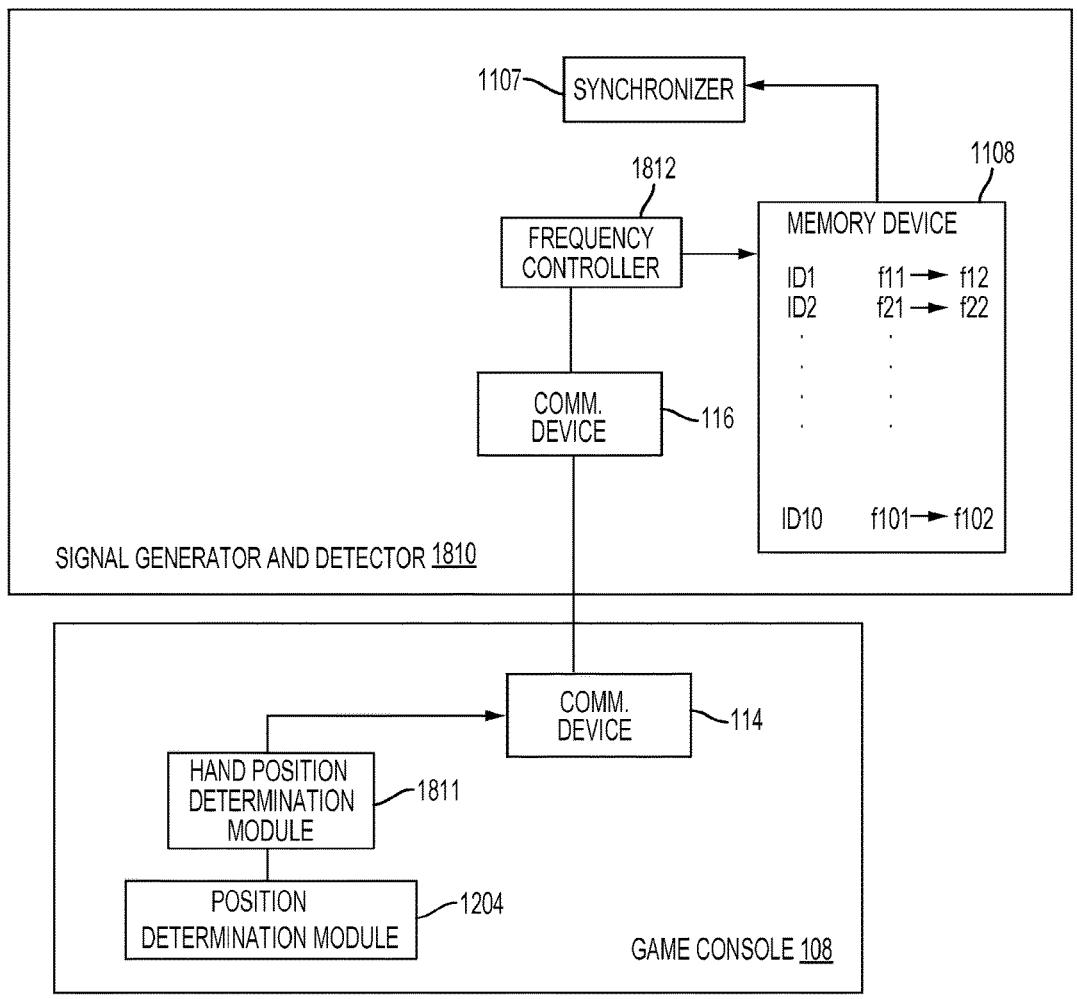
FIG. 18B is a diagram of an SGD to illustrate a change in a frequency of emission of light of a light emitter based on a change in a position of left and right hands of the user, in accordance with one embodiment of the present disclosure.

FIG. 18B is a diagram of an embodiment of an SGD 1810 to illustrate a change in a frequency of emission of light of a light emitter. The SGD 1810 is an example of the signal generator 1100 (FIG. 11A-1). The SGD 1810 includes a frequency controller 1812, the memory device 1108, and the synchronizer 1107. The remaining parts, e.g., the signal transmitter 1104 (FIG. 11A-1), the power source 610 (FIG. 11A-1), the signal transmitter 608 (FIG. 11A-1) of the SGD 1810, and the clock source 1109, etc., of the signal generator 1100 are not shown in FIG. 18B.

It should be noted that a module, as described herein, is implemented as a computer software that is stored on a non-transitory computer-readable storage medium, or as an ASIC, or as a PLD, or as a processor. An example of a non-transitory computer-readable storage medium includes a memory device, examples of which are provided above.

The position determination module 1204 provides positions of the wearable devices WD1 thru WD10 (FIG. 1) to the HPDM 1810. The HPDM 1810 determines based on the positions of the wearable devices WD1 thru WD10, whether positions of one or more of the wearable devices WD1 thru WD5 are within the pre-determined position from one or more positions of corresponding one or more of the wearable devices WD6 thru WD10. Upon determining that the positions of one or more of the wearable devices WD1 thru WD5 are within the pre-determined position from one or more positions of corresponding one or more of the wearable devices WD6 thru WD10, e.g., as in the case of mode 1 above, etc., the HPDM 1810 sends a signal to the frequency controller 1812 via the communication devices 114 and 116 to reduce frequencies of emission of light by the light sources LE1 thru LE10. Upon receiving the signal to reduce frequencies of emission of light by the light sources LE1 thru LE10, the frequency controller 1812 reduces the frequencies. For example, a frequency of emission of light of the light source LE1 is reduced from f11 to f12, and a frequency of emission of light by the light source LE2 is decreased from f21 to f22, and so on until a frequency of emission of light by the light source LE10 is reduced from f101 to f102. The synchronizer 1107 generates a synchronization signal having the decreased frequencies, e.g., f12, f22, f102, etc.

On the other hand, in response to determining that the positions of one or more of the wearable devices WD1 thru WD5 are not within the pre-determined position from positions of one or more of the wearable devices WD6 thru WD10, e.g., as in the case of mode 2 above, the HPDM 1810 sends a signal via the communication devices 114 and 116 to the frequency controller 1812 to increase frequencies of emission of light by the light sources LE1 thru LE10. Upon receiving the signal to increase frequencies of emission of light by the light sources LE1 thru LE10, the frequency controller 1812 increases the frequencies. For example, a frequency of emission of light of the light source LE1 is increased from f12 to f11, and a frequency of emission of light by the light source LE2 is increased from f22 to f21, and so on until a frequency of emission of light by the light source LE10 is increased from f102 to f101. The synchronizer 1107 generates a synchronization signal having the increased frequencies, e.g., f11, f21, f101, etc.

In some embodiments, the HPDM 1811 is located within the HMD 102.

In various embodiments, the frequency controller 1812, the synchronizer 1107, and the memory device 1108 are located within the game console 108 instead of in the HMD 102.

FIG. 19 is a diagram to illustrate different sequences of emission of light by the LEs 1 thru 10 (FIG. 1). For example, in a first sequence, the LEs 1 thru 10 emit light in a forward order. To illustrate, the LE1 emits light first, the LE2 emits light second, and so on until the LE10 emits light tenth. As another example, in a second sequence, the LEs 1 thru 10 emit light in a reverse order. To further illustrate, the LE10 emits light first, the LE9 emits light second, and so on until the LE1 emits light tenth. As yet another example, in a third sequence, the LEs 1 thru 5 emit light in a reverse order, and the LEs 6 thru 10 emit light in a forward order. For example, the LE5 emits light first, the LE4 emits light second, the LE3 emits light third, the LE2 emits light fourth, the LE1 emits light fifth, the LE6 emits light sixth, the LE7 emits light seventh, the LE8 emits light eighth, the LE9 emits light ninth, and the LE 10 emits light tenth. As another example, the LEs 1 thru 10 emit light in a random sequence, which is illustrated as a sequence 4 and a sequence 5 in FIG. 19.

Figure 20:
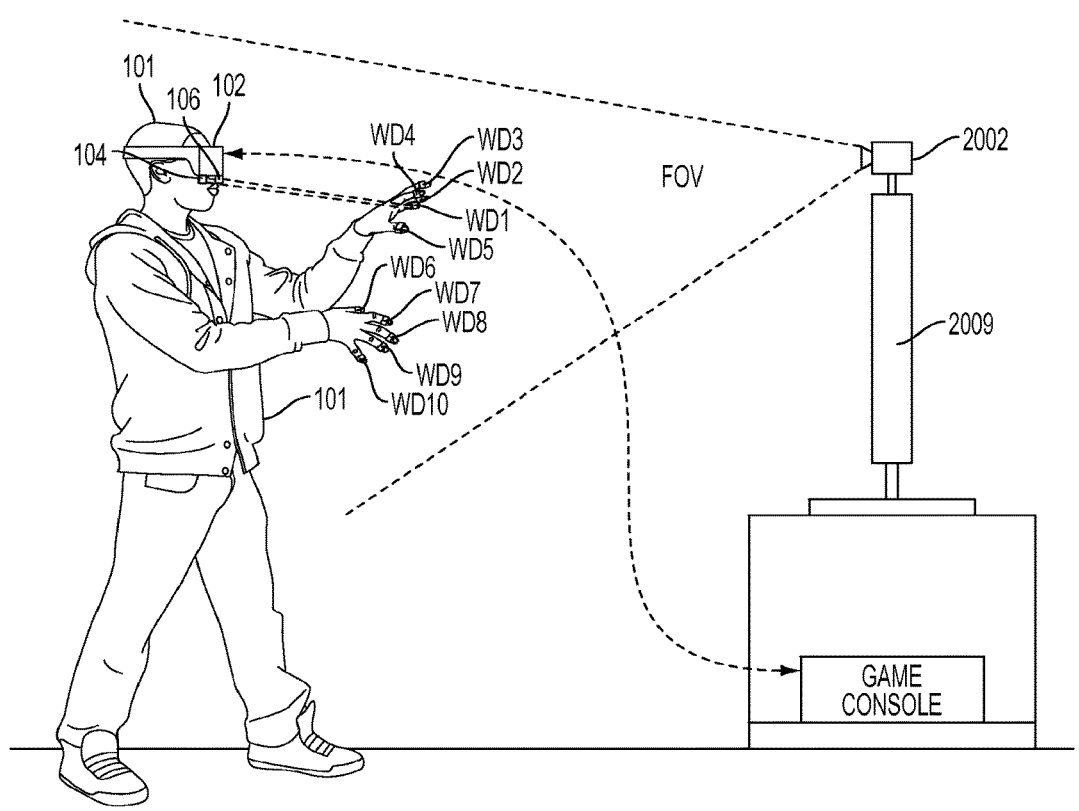
FIG. 20 is a diagram of a system to illustrate use of an image capture device for determining positions of wearable devices, in accordance with one embodiment of the present disclosure.

FIG. 20 is a diagram of an embodiment of a system 2000 to illustrate use of an image capture device 2002 to determining positions of the wearable devices WD1 thru WD10. The image capture device 2002 is located on top of a television 2004 and has a field-of-view for capturing image data of the wearable devices WD1 thru WD10. In some embodiments, the image capture device 2002 is located within the HMD 102 (FIG. 1). The image data captured by the image capture device 2002 is sent from the image capture device 2002 to the position determination module 1204 of the game console 108. For example, the image data is used when a light source is occluded from the optical sensor 104 (FIG. 1) but is not occluded from the optical sensor 106 (FIG. 1). As another example, the image data is used when a light source is occluded from the optical sensor 106 but is not occluded from the optical sensor 104. As another example, the image data is used when a light source is occluded from both optical sensors 104 and 106. The position determination module 1204 is connected to the communication device 114 (FIG. 1) of the game console 108 and to the game processor 110 (FIG. 1). The image capture device 2002 is connected to the game console 108 thru a wired connection or a wireless connection, both of which are described above. Upon receiving the image data, the position determination module 1204 parses the image data to determine positions of the light sources LE1 thru LE10. For example, the position determination module 1204 determines whether an intensity within a portion of the image data is greater than an intensity of the remaining portion of the image data and/or is of a different color than the remaining portion. Upon determining so, the position determination module 1204 determines a position of a light source within the image data and uses a map between an image-world reference co-ordinate system and a real-world reference co-ordinate system to translate the position to a position in the real-world, e.g., the room, etc. An example of the map between the image-world reference co-ordinate system and real-world reference co-ordinate system is a scaling between the image-world reference co-ordinate system and real-world reference co-ordinate system, which is stored in a memory device (not shown) or in the game memory device 120 (FIG. 1) of the game console 108. The positions of the wearable devices WD1 thru WD10 are provided by the position determination module 1204 to the game processor 110 to change a state of a game that is displayed on the HMD 102.

In some embodiments, the operations, described herein, as being performed by the position determination module 1204 of the game console 108 are performed by the game processor 108 (FIG. 1) of the game console 108.

In various embodiments, the image data that is captured by the image capture device 2002 is provided via a communication medium of the image capture device 2002 to the communication device 116 (FIG. 1) of the HMD 102 for storage as the historical information, which is described above.

Figure 21A:
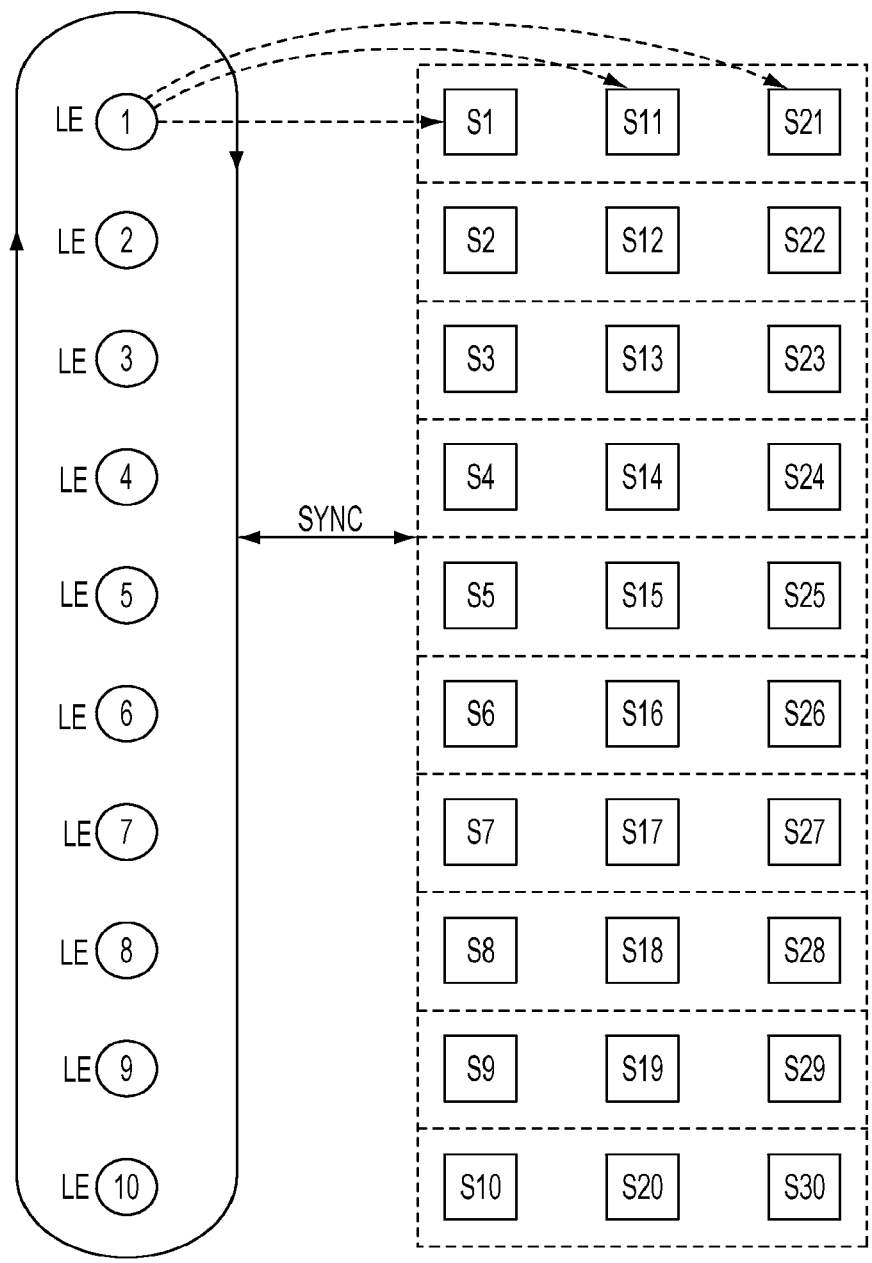
FIG. 21A is a diagram to illustrate synchronization between sampling of light by an optical sensor and emission of light by a light source, in accordance with one embodiment of the present disclosure.

FIG. 21A is a diagram to illustrate synchronization between sampling of light by an optical sensor and emission of light by a light source. The detection of light by an optical sensor is synchronized with emission of light by the light sources LE1 thru LE10. For example, when the optical sensor 104 (FIG. 1) samples light at a rate of 1000 hertz (Hz) and there are ten light sources LE1 thru LE10 that emit light at a frequency of 1/1000 second, the optical sensor 104 senses light from each LE1 thru LE10 at a frequency of 100 Hz. As another example, when the light source LE1 emits light, an optical sensor, e.g., the optical sensor 104, the optical sensor 106, etc., is activated to detect light during a sampling time window to generate a sample S1 that includes one or more electrical signals. In this example, when the light source LE2 emits light, the optical sensor is again activated to detect light during a sampling time window to generate another sample S2 that includes one or more electrical signals. Similarly, samples S3, S4, S5, S6, S7, S8, S9, and S10 are generated when the LEs 3 thru 10 emit light.

Continuing with the example, after a round of emission of light by the LEs 1 thru 10, the LE1 again emits light again during a second round. In this second round, the optical sensor is activated to sense light emitted from the LE1 during a sampling time window to generate a sample S11 that includes one or more electrical signals. Moreover, during the second round, the optical sensor is activated again to sense light emitted from the LE2 during a sampling time window to generate a sample S12 that includes one or more electrical signals. Similarly, during the second round, samples S13, S14, S15, S16, S17, S18, S19, and S20 are generated.

Moreover, continuing with the example, after the second round of emission of light by the LEs 1 thru 10, a third round is executed. During the third round, the optical sensor is activated to sense light emitted from the LE1 during a sampling time window to generate a sample S21 that includes one or more electrical signals. Also, during the third round, the optical sensor is activated again to sense light emitted from the LE2 during a sampling time window to generate a sample S22 that includes one or more electrical signals. Similarly, during the third round, samples S23, S24, S25, S26, S27, S28, S29, and S30 are generated.

Figure 21B:
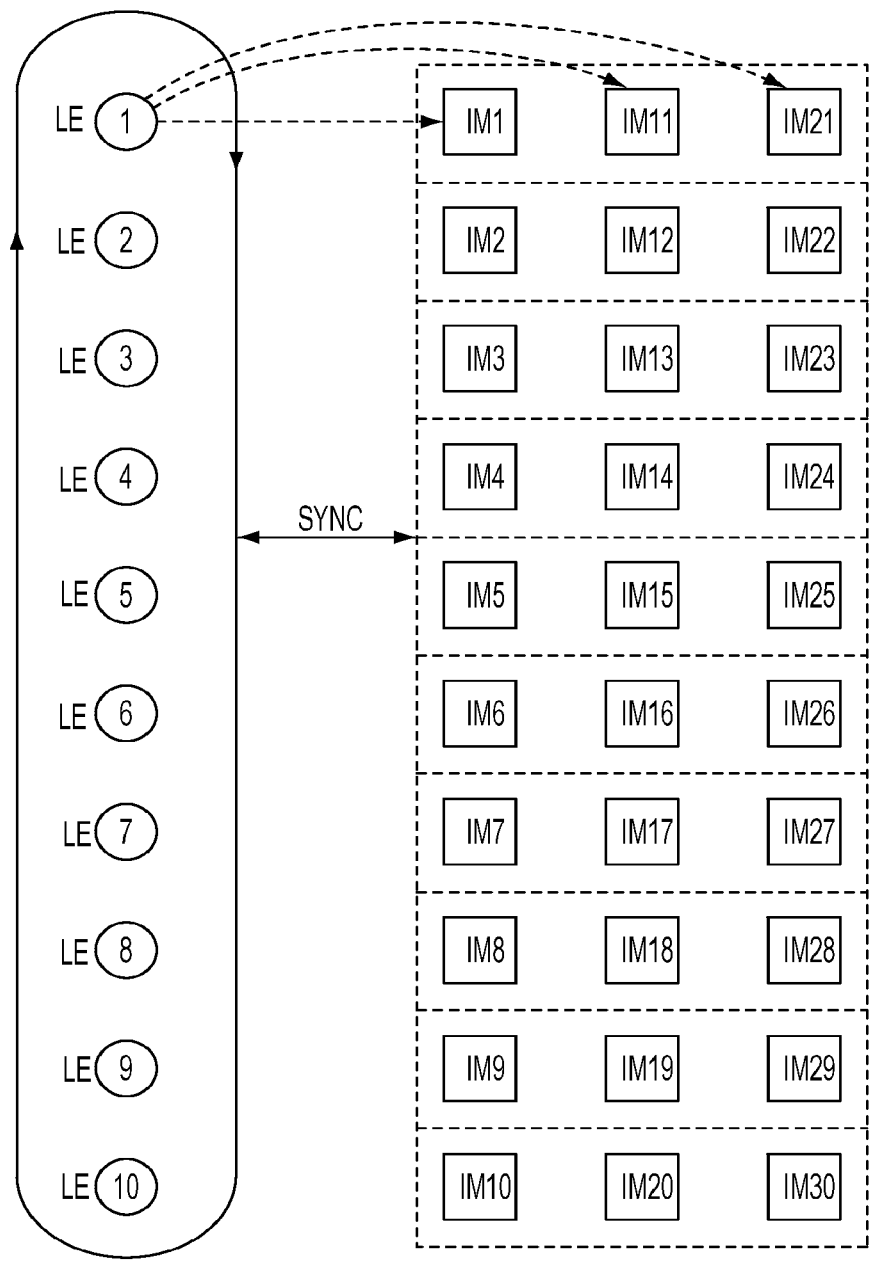
FIG. 21B is a diagram to illustrate synchronization between frequencies of emission of light by light sources and a shutter speed of capturing images by an image capture device, in accordance with one embodiment of the present disclosure.

FIG. 21B is a diagram to illustrate synchronization between frequencies of emission of light by the light sources LE1 thru LE10 and a shutter speed of the image capture device 2002.

In some embodiments, a shutter speed is a length of time a lens of an image capture device is open to capture an image of one or more wearable devices, described herein. An amount of light that reaches an image capture device is proportional to the shutter speed. Examples of shutter speeds include 1/1000 seconds, 1/500 seconds, 1/250 seconds, 1/125 seconds, 1/60 seconds, 1/30 seconds, etc.

An image capture rate, e.g., a rate at which images IM1, IM2, IM3, IM4, IM5, IM6, IM7, IM8, IM9, IM10, IM11, IM12, IM13, IM14, IM15, IM16, IM17, IM18, IM19, IM20, IM21, IM22, IM23, IM24, IM25, IM26, IM27, IM28, IM29, and IM30 are captured by an image capture device is synchronized to emission of light by the LEs 1 thru 10. For example, a frequency, e.g., the frequency f11 or the frequency f12 (FIG. 18B), etc., of emission of light by the LE1 is the same as a frequency of capturing the images IM1, IM11, and IM21. As another example, a frequency, e.g., the frequency f21, the frequency f22 (FIG. 18B), etc., of emission of light by the LE2 is the same as a frequency of capturing the images IM2, IM12, and IM22. As yet another example, a frequency of emission of light by the LEs 1 and 2 is the same as a frequency of capturing the images IM1 and IM2. As another example, a frequency of emission of light by the LEs 3 and 4 is the same as a frequency of capturing the images IM13 and IM14.

It should be noted that the images IM1, IM2, IM3, IM4, IM5, IM6, IM7, IM8, IM9, IM10, IM11, IM12, IM13, IM14, IM15, IM16, IM17, IM18, IM19, IM20, IM21, IM22, IM23, IM24, IM25, IM26, IM27, IM28, IM29, and IM30 are captured in a sequence shown in FIG. 21B. For example, first the image IM1 is captured, then the image IM2 is captured, the image IM3 is captured third, and so on, until the image IM30 is captured thirtieth.

In various embodiments, the image IM1 is captured after the light source LE1 emits light. A position of the light source LE1 is determined based on the light emitted by the light source LE1. After the image IM1 is captured, the light source LE1 emits light again and the image IM11 is captured based on the light emitted. A position of the light source LE1 in the image IM11 is determined based on the light that is emitted by the light source LE1 after the image IM1 is captured. After the image IM11 is captured, the light source LE1 emits light again and the image IM21 is captured. A position of the light source LE1 in the image IM21 is determined based on the that is light emitted by the light source LE1 after the image IM11 is captured.

In various embodiments, the CPU 112 is connected to the memory device 1108 (FIG. 11A-1) to store a shutter speed in the memory device 1108. In these embodiments, a shutter speed match controller (SSMC) (not shown) that is coupled to the memory device 1108 accesses the shutter speed and determines a frequency of emission of light by one or more of the light sources LE1 thru LE10 to be equal to or greater than the shutter speed. The SSMC is located within the signal generator 1100 (FIG. 11A-1) or in the signal generator 1101 (FIG. 11A-2), and stores the frequency of emission of light in the memory device 1108.

In several embodiments, the CPU 112 accesses a frequency of emission of light by one or more of the light sources LE1 thru LE10 from the memory device 1108 to determine a shutter speed for capturing of images by an image capture device, described herein.

Figure 21C:
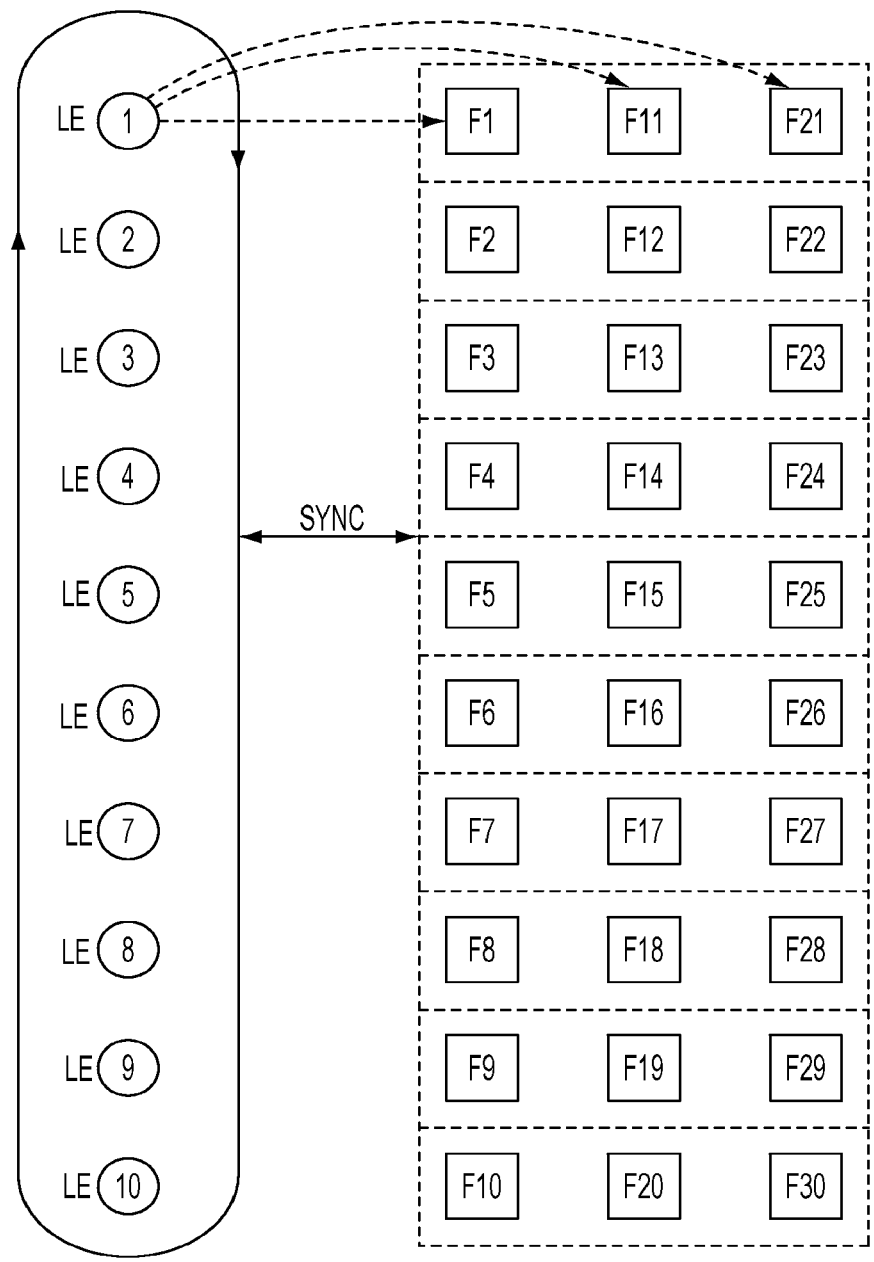
FIG. 21C is a diagram to illustrate synchronization between frequencies of emission of light by light sources and a frame rate of display of images by a graphical processing unit (GPU) of the HMD on a display screen of the HMD, in accordance with one embodiment of the present disclosure.

FIG. 21C is a diagram to illustrate synchronization between frequencies of emission of light by the light sources LE1 thru LE10 and a frame rate of display of images by the CPU 112 (FIG. 1) of the HMD 102 (FIG. 1) on the one or more display screens 118 (FIG. 1).

In some embodiments, a frame rate, calculated as frames per second, is a frequency of display of images, called frames, on the one or more display screens 118. In various embodiments, a frame is an image that is rendered by the CPU 112 on the one or more display screens 118 of the HMD 102. In these embodiments, the frame includes color values for each pixel on the one or more display screens 118 and transparency values for the pixels.

A frame rate, e.g., a rate at which frames F1, F2, F3, F4, F5, F6, F7, F8, F9, F10, F11, F12, F13, F14, F15, F16, F17, F18, F19, F20, F21, F22, F23, F24, F25, F26. F27, F28, F29, and F30 are displayed on the one or more display screens 118, etc., is synchronized to emission of light by the LEs 1 thru 10. For example, a frequency, e.g., the frequency f11 or the frequency f12 (FIG. 18B), etc., of emission of light by the LE1 is the same as a frequency of generation of the frames F1, F11, and F21. As another example, a frequency, e.g., the frequency f21, the frequency f22 (FIG. 18B), etc., of emission of light by the LE2 is the same as a frequency of generation of the frames F2, F12, and F22. As yet another example, a frequency of emission of light by the LEs 1 and 2 is the same as a frequency of generation of the frames F1 and F2. As another example, a frequency of emission of light by the LEs 3 and 4 is the same as sequence of generation of the frames F13 and F14.

In various embodiments, the frame F1 is displayed after the light source LE1 emits light and the frame F1 is generated based on a position of the light source LE1. The position of the light source LE1 is determined based on the light emitted by the light source LE1. After the frame F1 is displayed, the light source LE1 emits light again and the frame F11 is displayed based on the light emitted. A position of the light source LE1 in the frame F11 is determined based on the light that is emitted by the light source LE1 after the frame F1 is displayed. After the frame F11 is displayed, the light source LE1 emits light again and the frame F21 is displayed. A position of the light source LE1 in the frame F21 is determined based on the that is light emitted by the light source LE1 after the frame F11 is displayed.

In various embodiments, the CPU 112 is connected to the memory device 1108 (FIG. 11A-1) to store a frame rate in the memory device 1108. In these embodiments, a frame rate match controller (FRMC) (not shown) that is coupled to the memory device 1108 accesses the frame rate and determines a frequency of emission of light by one or more of the light sources LE1 thru LE10 to be equal to the frame rate. The FRMC is located within the signal generator 1100 (FIG. 11A-1) or n the signal generator 1101 (FIG. 11A-2), and stores the frequency of emission of light in the memory device 1108.

In several embodiments, the CPU 112 accesses a frequency of emission of light by one or more of the light sources LE1 thru LE10 from the memory device 1108 to determine a frame rate for display of images on the one or more display screens 118.

Figure 22:
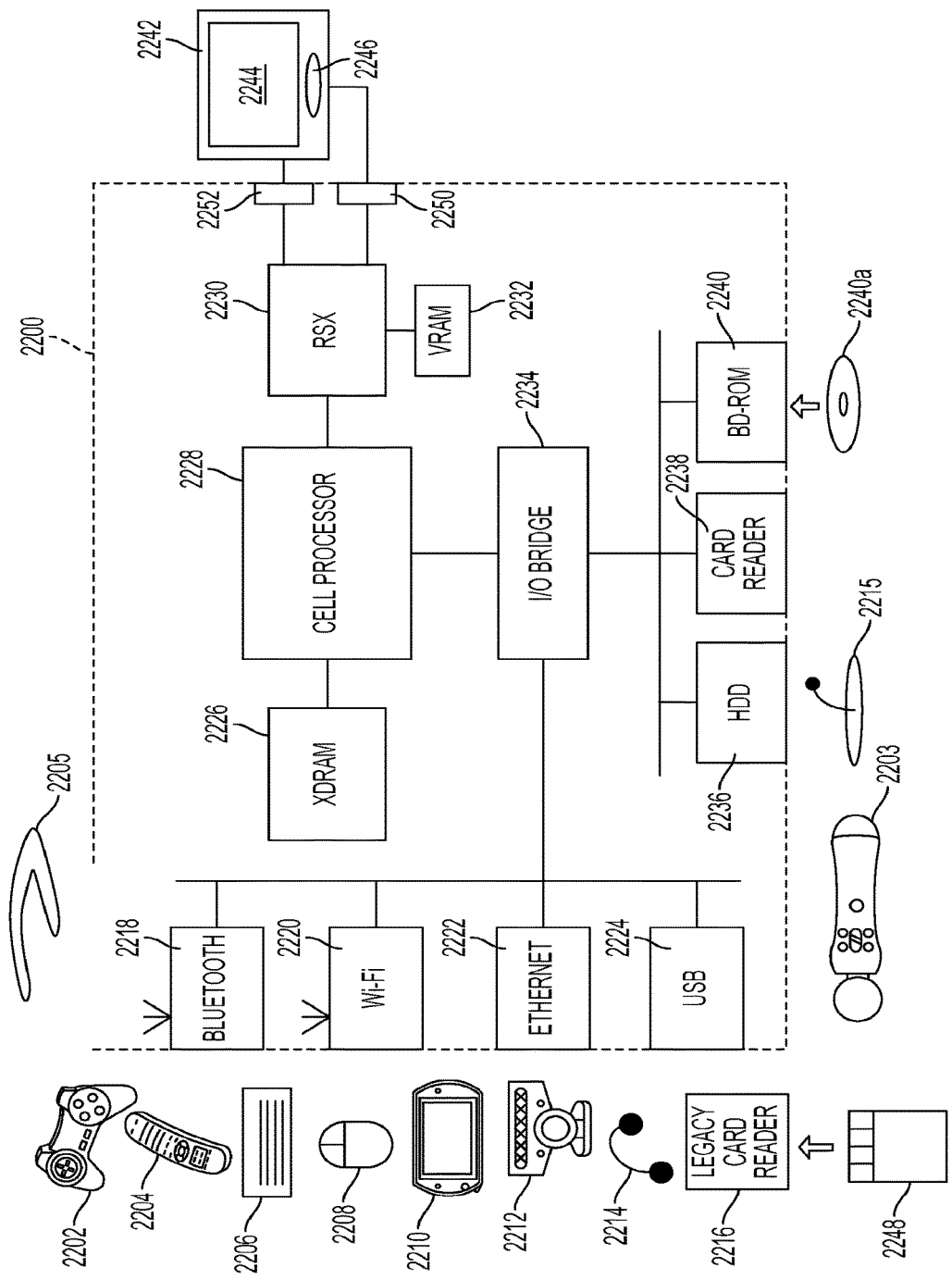
FIG. 22 is a block diagram of a game console that is compatible for interfacing with a hand-held controller (HHC) and an HMD, in accordance with one embodiment of the present disclosure.

FIG. 22 is a block diagram of an embodiment of a game console 2200 that is compatible for interfacing with a hand-held controller (HHC) and an HMD 2205, which is an example of the HMD 102 (FIG. 1). The game console 2200 is an example of the game console 108 (FIG. 1). In some embodiments, the game console 2200 is used to execute a game that is displayed on the HMD 2205. The game console 2200 is compatible for interfacing the HHC and the HMD 2205 with a game. The game console 2200 is provided with various peripheral devices connectable to the game console 2200. The game console 2200 has a cell processor 2228, a Rambus® dynamic random access memory (XDRAM) unit 2226, a Reality Synthesizer graphics processor unit 2230 with a dedicated video random access memory (VRAM) unit 2232, and an input/output (I/O) bridge 2234. The game console 2200 also has a Blu Ray® Disk read-only memory (BD-ROM) optical disk reader 2240 for reading from a disk 2240a and a removable slot-in hard disk drive (HDD) 2236, accessible through the I/O bridge 2234. Optionally, the game console 2200 also includes a memory card reader 2238 for reading compact flash memory cards, memory Stick® memory cards and the like, which is similarly accessible through the I/O bridge 2234. The I/O bridge 2234 also connects to Universal Serial Bus (USB) 2.0 ports 2224, a gigabit Ethernet port 2222, an IEEE 802.11b/g wireless network (Wi-Fi) port 2220, and a Bluetooth® wireless link port 2218 capable of supporting Bluetooth connections.

In operation, the I/O bridge 2234 handles all wireless, USB and Ethernet data, including data from one or more game controllers 2202 and 2203 and from the HMD 2205. For example, when the user 101 (FIG. 1) is playing a game generated by execution of a portion of a game program that is stored in the game memory device 120 (FIG. 1), the I/O bridge 2234 receives input data from the game controller 2202 or 2203 or from the HMD 2205 via a Bluetooth link and directs the input data to the cell processor 2228, which updates a current state of the game accordingly. Each game controller 2202 and 2203 is an example of the HHC.

The wireless, USB and Ethernet ports also provide connectivity for other peripheral devices in addition to game controllers 2202 and 2203 and the HMD 2205, such as, for example, a remote control 2204, a keyboard 2206, a mouse 2208, a portable entertainment device 2210, such as, e.g., a Sony Playstation Portable® entertainment device, etc., a video camera, such as, e.g., an EyeToy® video camera 2212, etc., a microphone headset 2214, and a microphone 2215. In some embodiments, such peripheral devices are connected to the game console 2200 wirelessly, for example, the portable entertainment device 2210 communicates via a Wi-Fi ad-hoc connection, whilst the microphone headset 2214 communicates via a Bluetooth link.

The provision of these interfaces means that the game console 2200 is also potentially compatible with other peripheral devices such as digital video recorders (DVRs), set-top boxes, digital cameras, portable media players, Voice over Internet protocol (IP) telephones, mobile telephones, printers and scanners.

In addition, a legacy memory card reader 2216 is connected to the game console 2200 via the USB port 2224, enabling the reading of memory cards 2248 of a kind used by the game console 2200. The game controllers 2202 and 2203 and the HMD 2205 are operable to communicate wirelessly with the game console 2200 via the Bluetooth link 2218, or to be connected to the USB port 2224, thereby also providing power by which to charge batteries of the game controller 2202 and 2203 and the HMD 2205. In some embodiments, each of the game controllers 2202 and 2203 and the HMD 2205 may also include memory, a processor, a memory card reader, permanent memory, such as, e.g., flash memory, etc., light emitters such as, e.g., an illuminated spherical section, LEDs, or infrared lights, etc., microphone and speaker for ultrasound communications, an acoustic chamber, a digital camera, an internal clock, a recognizable shape, such as, e.g., a spherical section facing the game console 2200, and wireless communications using protocols, such as, e.g., Bluetooth, Wi-Fi, etc.

The game controller 2202 is a controller designed to be used with two hands of the user 101, and game controller 2203 is a single-hand controller with an attachment. The HMD 2205 is designed to fit on top of a head and/or in front of eyes of the user 101. In addition to one or more analog joysticks and conventional control buttons, each game controller 2202 and 2203 is susceptible to three-dimensional location determination. Similarly, the HMD 2205 is susceptible to three-dimensional location determination. Consequently, in some embodiments, gestures and movements by the user 101 of the game controller 2202 and 2203 and of the HMD 2205 are translated as inputs to a game in addition to or instead of conventional button or joystick commands. Optionally, other wirelessly enabled peripheral devices, such as, e.g., the Playstation™ Portable device, etc., are used as a controller. In the case of the Playstation™ Portable device, additional game or control information, e.g., control instructions or number of lives, etc., is provided on a display screen of the device. In some embodiments, other alternative or supplementary control devices are used, such as, e.g., a dance mat (not shown), a light gun (not shown), a steering wheel and pedals (not shown), bespoke controllers, etc. Examples of bespoke controllers include a single or several large buttons for a rapid-response quiz game (also not shown).

The remote control 2204 is also operable to communicate wirelessly with the game console 2200 via the Bluetooth link 2218. The remote control 2204 includes controls suitable for the operation of the Blu Ray™ Disk BD-ROM reader 2240 and for navigation of disk content.

The Blu Ray™ Disk BD-ROM reader 2240 is operable to read CD-ROMs compatible with the game console 2200, in addition to conventional pre-recorded and recordable CDs, and so-called Super Audio CDs. The Blu Ray™ Disk BD-ROM reader 2240 is also operable to read digital video disk-ROMs (DVD-ROMs) compatible with the game console 2200, in addition to conventional pre-recorded and recordable DVDs. The Blu Ray™ Disk BD-ROM reader 2240 is further operable to read BD-ROMs compatible with the game console 2200, as well as conventional pre-recorded and recordable Blu-Ray Disks.

The game console 2200 is operable to supply audio and video, either generated or decoded via the Reality Synthesizer graphics unit 2230, through audio connectors 2250 and video connectors 2252 to a display and sound output device 2242, such as, e.g., a monitor or television set, etc., having a display screen 2244 and one or more loudspeakers 2246. The audio connectors 2250, in various embodiments, include conventional analogue and digital outputs whilst the video connectors 2252 variously include component video, S-video, composite video, and one or more High Definition Multimedia Interface (HDMI) outputs. Consequently, video output may be in formats such as phase alternating line (PAL) or National Television System Committee (NTSC), or in 2220p, 1080i or 1080p high definition. Audio processing, e.g., generation, decoding, etc., is performed by the cell processor 2208. An operating system of the game console 2200 supports Dolby® 5.1 surround sound, Dolby® Theatre Surround (DTS), and the decoding of 7.1 surround sound from Blu-Ray® disks.

In some embodiments, a video camera, e.g., the video camera 2212, etc., comprises a single charge coupled device (CCD), an LED indicator, and hardware-based real-time data compression and encoding apparatus so that compressed video data is transmitted in an appropriate format such as an intra-image based motion picture expert group (MPEG) standard for decoding by the game console 2200. An LED indicator of the video camera 2212 is arranged to illuminate in response to appropriate control data from the game console 2200, for example, to signify adverse lighting conditions, etc. Some embodiments of the video camera 2212 variously connect to the game console 2200 via a USB, Bluetooth or Wi-Fi communication port. Various embodiments of a video camera include one or more associated microphones and also are capable of transmitting audio data. In several embodiments of a video camera, the CCD has a resolution suitable for high-definition video capture. In use, images captured by the video camera are incorporated within a game or interpreted as game control inputs. In another embodiment, a video camera is an infrared camera suitable for detecting infrared light.

In various embodiments, for successful data communication to occur with a peripheral device, such as, for example, a video camera or remote control via one of the communication ports of the game console 2200, an appropriate piece of software, such as, a device driver, etc., is provided.

In some embodiments, the aforementioned system devices, including the game console 2200, the HHC, and the HMD 2205 enable the HHC and the HMD 2205 to display and capture video of an interactive session of a game. The system devices initiate an interactive session of a game, the interactive session defining interactivity between the user 101 and the game. The system devices further determine an initial position and orientation of the HHC and/or the HMD 2205 operated by the user 101. The game console 2200 determines a current state of a game based on the interactivity between the user 101 and the game. The system devices track a position and orientation of the HHC and or the HMD 2205 during an interactive session of the user 101 with a game. The system devices generate a spectator video stream of the interactive session based on a current state of a game and the tracked position and orientation of the HHC and/or the HMD 2205. In some embodiments, the HHC renders the spectator video stream on a display screen of the HHC. In various embodiments, the HMD 2205 renders the spectator video stream on a display screen of the HMD 2205.

Figure 23:
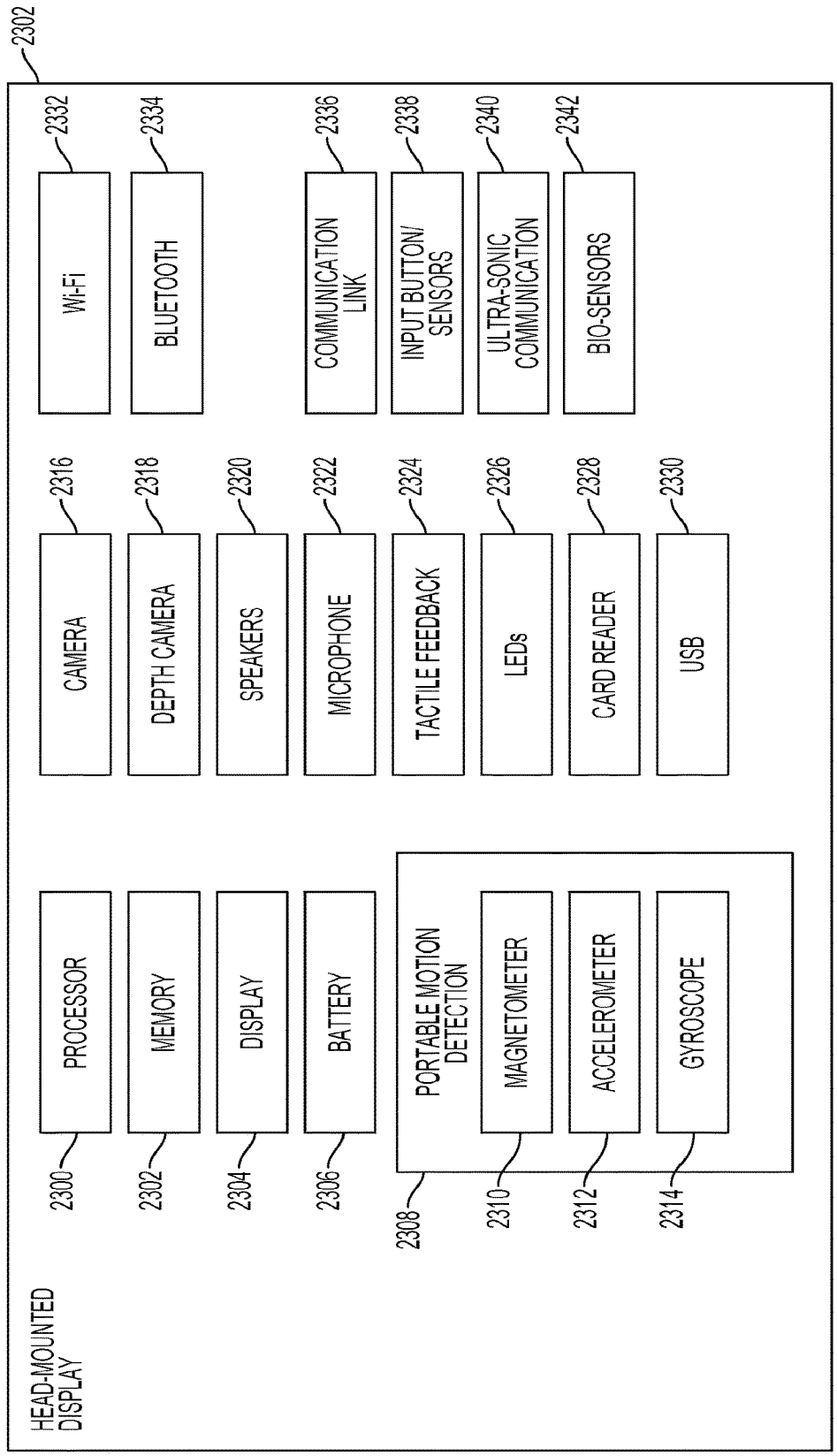
FIG. 23 is a block diagram of illustrating various components of an HMD, in accordance with one embodiment of the present disclosure.

With reference to FIG. 23, a diagram illustrating components of an HMD 2302 is shown. The HMD 2302 is an example of the HMD 102 (FIG. 1). The HMD 2302 includes a processor 2300 for executing program instructions. A memory device 2302 is provided for storage purposes. Examples of the memory device 2302 include a volatile memory, a non-volatile memory, or a combination thereof. A display device 2304 is included which provides a visual interface that the user 101 (FIG. 1) views. A battery 2306 is provided as a power source for the HMD 2302. A motion detection module 2308 includes any of various kinds of motion sensitive hardware, such as a magnetometer 2310, an accelerometer 2312, and a gyroscope 2314.

An accelerometer is a device for measuring acceleration and gravity induced reaction forces. Single and multiple axis models are available to detect magnitude and direction of the acceleration in different directions. The accelerometer is used to sense inclination, vibration, and shock. In one embodiment, three accelerometers 2312 are used to provide the direction of gravity, which gives an absolute reference for two angles, e.g., world-space pitch and world-space roll, etc.

A magnetometer measures a strength and a direction of a magnetic field in a vicinity of the HMD 2302. In some embodiments, three magnetometers 2310 are used within the HMD 2302, ensuring an absolute reference for the world-space yaw angle. In various embodiments, the magnetometer is designed to span the earth magnetic field, which is ±80 microtesla. Magnetometers are affected by metal, and provide a yaw measurement that is monotonic with actual yaw. In some embodiments, a magnetic field is warped due to metal in the real-world environment, which causes a warp in the yaw measurement. In various embodiments, this warp is calibrated using information from other sensors, e.g., the gyroscope 2314, a camera 2316, etc. In one embodiment, the accelerometer 2312 is used together with magnetometer 2310 to obtain the inclination and azimuth of the HMD 2302.

A gyroscope is a device for measuring or maintaining orientation, based on the principles of angular momentum. In one embodiment, instead of the gyroscope 2314, three gyroscopes provide information about movement across the respective axis (x, y and z) based on inertial sensing. The gyroscopes help in detecting fast rotations. However, the gyroscopes, in some embodiments, drift overtime without the existence of an absolute reference. This triggers resetting the gyroscopes periodically, which can be done using other available information, such as positional/orientation determination based on visual tracking of an object, accelerometer, magnetometer, etc.

The camera 2316 is provided for capturing images and image streams of the real-world environment. In various embodiments, more than one camera is included in the HMD 2302, including a camera that is rear-facing, e.g., directed away from the user 101 when the user 101 is viewing the display of the HMD 2302, etc., and a camera that is front-facing, e.g., directed towards the user 101 when the user 101 is viewing the display of the HMD 2302, etc. Additionally, in several embodiments, a depth camera 2318 is included in the HMD 2302 for sensing depth information of objects in the real-world environment.

The HMD 2302 includes speakers 2320 for providing audio output. Also, a microphone 2322 is included, in some embodiments, for capturing audio from the real-world environment, including sounds from an ambient environment, speech made by the user 101, etc. The HMD 2302 includes a tactile feedback module 2324 for providing tactile feedback to the user 101. In one embodiment, the tactile feedback module 2324 is capable of causing movement and/or vibration of the HMD 2302 to provide tactile feedback to the user 101.

LEDs 2326 are provided as visual indicators of statuses of the HMD 2302. For example, an LED may indicate battery level, power on, etc. A card reader 2328 is provided to enable the HMD 2302 to read and write information to and from a memory card. A USB interface 2330 is included as one example of an interface for enabling connection of peripheral devices, or connection to other devices, such as other portable devices, computers, etc. In various embodiments of the HMD 2302, any of various kinds of interfaces may be included to enable greater connectivity of the HMD 2302.

A Wi-Fi module 2332 is included for enabling connection to the Internet via wireless networking technologies. Also, the HMD 2302 includes a Bluetooth module 2334 for enabling wireless connection to other devices. A communications link 2336 is also included, in some embodiments, for connection to other devices. In one embodiment, the communications link 2336 utilizes infrared transmission for wireless communication. In other embodiments, the communications link 2336 utilizes any of various wireless or wired transmission protocols for communication with other devices.

Input buttons/sensors 2338 are included to provide an input interface for the user 101 (FIG. 1). Any of various kinds of input interfaces are included, such as buttons, touchpad, joystick, trackball, etc. An ultra-sonic communication module 2340 is included, in various embodiments, in the HMD 2302 for facilitating communication with other devices via ultra-sonic technologies.

Bio-sensors 2342 are included to enable detection of physiological data from a user. In one embodiment, the bio-sensors 2342 include one or more dry electrodes for detecting bio-electric signals of the user through the user's skin.

The foregoing components of HMD 2302 have been described as merely exemplary components that may be included in HMD 2302. In various embodiments, the HMD 2302 include or do not include some of the various aforementioned components.

Figure 24:
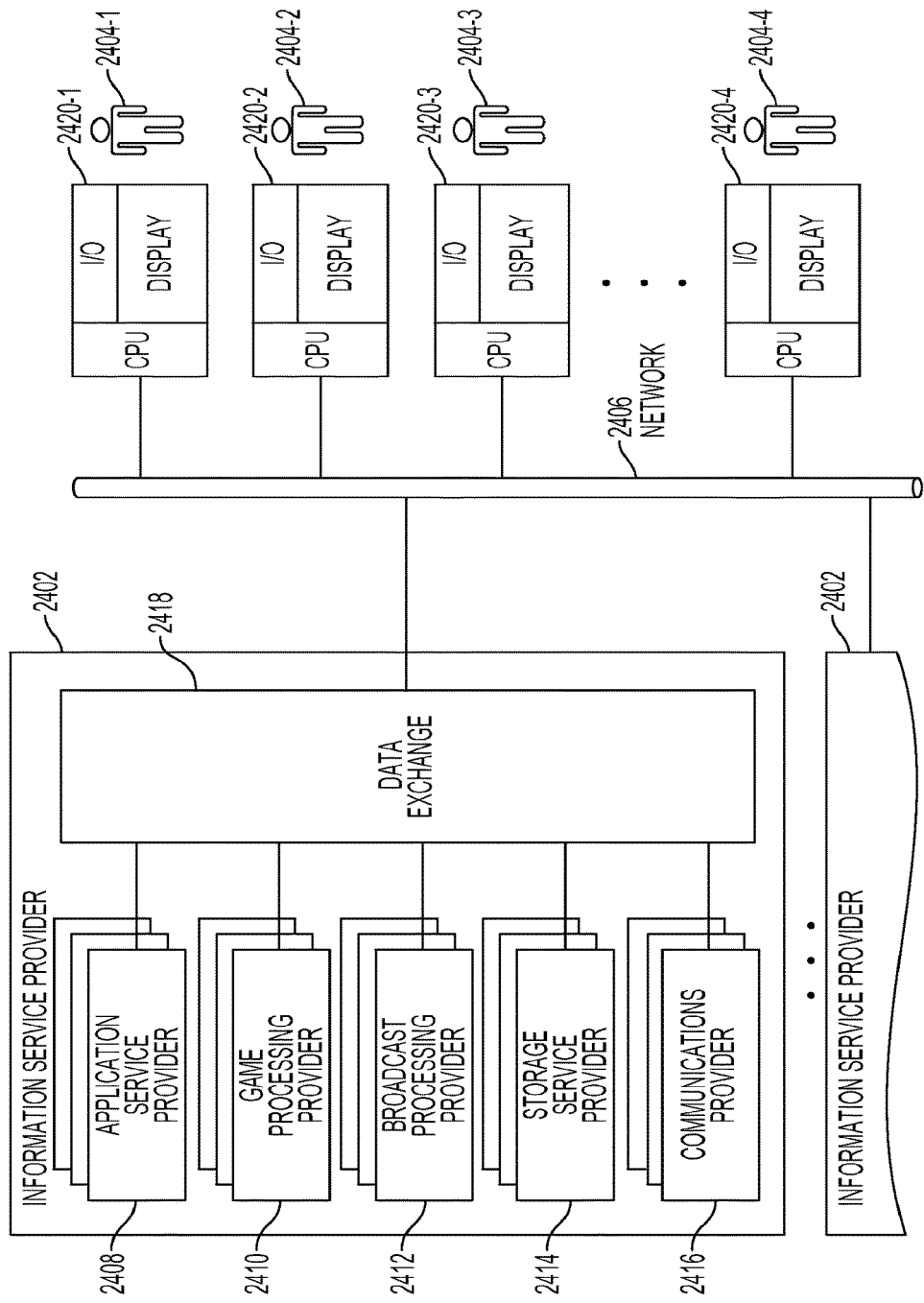
FIG. 24 illustrates an embodiment of an Information Service Provider (INSP) architecture used to communicate game data, in accordance with one embodiment of the present disclosure.

FIG. 24 illustrates an embodiment of an Information Service Provider (INSP) architecture. INSPs 2402 delivers a multitude of information services to users 2404-1, 2404-2, 2404-3, and 2404-4 geographically dispersed and connected via a computer network 2406, e.g., a local area network (LAN), a wide area network (WAN), or a combination thereof, etc. An example of the WAN includes the Internet and an example of the LAN includes an Intranet. Any of the users 2404-1, 2404-2, 2404-3, and 2404-4 is an example of the user 101 (FIG. 1). The user 2404-1 operates a client 2220-1, the user 2404-2 operates another client 2420-2, the user 2404-3 operates yet another client 2420-3, and the user 2404-4 operates another client 2420-4.

In some embodiments, each client 2420-1, 2420-2, 2420-3, and 2420-4 includes a central processing unit (CPU), a display, and an input/output (I/O) interface. Examples of each client 2420-1, 2420-2, 2420-3, and 2420-4 include a personal computer (PC), a mobile phone, a netbook, a tablet, a gaming system, a personal digital assistant (PDA), the game console 108 with a display device, the HMD 102 (FIG. 1), a desktop computer, a laptop computer, a smart television, etc. In some embodiments, the INSP 2402 recognizes a type of a client device and adjusts a communication method employed.

In some embodiments, an INSP delivers one type of service, such as stock price updates, or a variety of services such as broadcast media, news, sports, gaming, etc. Additionally, the services offered by each INSP are dynamic, that is, services can be added or taken away at any point in time. Thus, an INSP providing a particular type of service to a particular individual can change over time. For example, the client 2420-1 is served by an INSP in near proximity to the client 2420-1 while the client 2420-1 is in a home town of the user 2204-1, and client 2420-1 is served by a different INSP when the user 2404-1 travels to a different city. The home-town INSP will transfer requested information and data to the new INSP, such that the information "follows" the client 2420-1 to the new city making the data closer to the client 2420-1 and easier to access. In various embodiments, a master-server relationship is established between a master INSP, which manages the information for the client 2420-1, and a server INSP that interfaces directly with the client 2420-1 under control from the master INSP. In some embodiments, data is transferred from one ISP to another ISP as the client 2420-1 moves around the world to make the INSP in better position to service client 2420-1 be the one that delivers these services.

The INSP 2402 includes an Application Service Provider (ASP) 2208, which provides computer-based services to customers over the computer network 2406. Software offered using an ASP model is also sometimes called on-demand software or software as a service (SaaS). A simple form of providing access to a computer-based service, e.g., customer relationship management, etc., is by using a standard protocol, e.g., a hypertext transfer protocol (HTTP), etc. The application software resides on a vendor's server and is accessed by each client 2420-1, 2420-2, 2420-3, and 2420-4 through a web browser using a hypertext markup language (HTML), etc., by a special purpose client software provided by the vendor, and/or other remote interface, e.g., a thin client, etc.

Services delivered over a wide geographical area often use cloud computing. Cloud computing is a style of computing in which dynamically scalable and often virtualized resources are provided as a service over the computer network 2406. The users 2204-1, 2204-2, 2204-3, and 2204-4 do not need to be an expert in the technology infrastructure in the "cloud" that supports them. Cloud computing is divided, in some embodiments, in different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the computer network 2406, e.g., using servers, storage and logic, etc., based on how the computer network 2406 is depicted in computer network diagrams and is an abstraction for the complex infrastructure it conceals.

Further, the INSP 2402 includes a game processing server (GPS) 2410, also sometime referred to herein as a game processing provider, which is used by the clients 2420-1, 2420-2, 2420-3, and 2420-4 to play single and multiplayer video games. Most video games played over the computer network 2406 operate via a connection to a game server. Typically, games use a dedicated server application that collects data from the clients 2420-1, 2420-2, 2420-3, and 2420 and distributes it to other clients that are operated by other users. This is more efficient and effective than a peer-to-peer arrangement, but a separate server is used to host the server application. In some embodiments, the GPS 2410 establishes communication between the clients 2420-1, 2420-2, 2420-3, and 2420, which exchange information without further relying on the centralized GPS 2410.

Dedicated GPSs are servers which run independently of a client. Such servers are usually run on dedicated hardware located in data centers, providing more bandwidth and dedicated processing power. Dedicated servers are a method of hosting game servers for most PC-based multiplayer games. Massively multiplayer online games run on dedicated servers usually hosted by the software company that owns the game title, allowing them to control and update content.

A broadcast processing server (BPS) 2412, sometimes referred to herein as a broadcast processing provider, distributes audio or video signals to an audience. Broadcasting to a very narrow range of audience is sometimes called narrowcasting. A final leg of broadcast distribution is how a signal gets to the clients 2420-1, 2420-2, 2420-3, and 2420, and the signal, in some embodiments, is distributed over the air as with a radio station or a television station to an antenna and receiver, or through a cable television or cable radio or "wireless cable" via the station. The computer network 2206 also brings, in various embodiments, either radio or television signals to the clients 2420-1, 2420-2, 2420-3, and 2420, especially with multicasting allowing the signals and bandwidth to be shared. Historically, broadcasts are delimited, in several embodiments, by a geographic region, e.g., national broadcasts, regional broadcasts, etc. However, with the proliferation of high-speed Internet, broadcasts are not defined by geographies as content can reach almost any country in the world.

A storage service provider (SSP) 2414 provides computer storage space and related management services. The SSP 2414 also offers periodic backup and archiving. By offering storage as a service, the clients 2420-1, 2420-2, 2420-3, and 2420-4 use more storage compared to when storage is not used as a service. Another major advantage is that the SSP 2414 includes backup services and the clients 2420-1, 2420-2, 2420-3, and 2420-4 will not lose data if their hard drives fail. Further, a plurality of SSPs, in some embodiments, have total or partial copies of the data received from the clients 2420-1, 2420-2, 2420-3, and 2420-4, allowing the clients 2420-1, 2420-2, 2420-3, and 2420-4 to access data in an efficient way independently of where the clients 2420-1, 2420-2, 2420-3, and 2420-4 are located or of types of the clients. For example, the user 2404-1 accesses personal files via a home computer, as well as via a mobile phone while the user 2404-1 is on the move.

A communications provider 2416 provides connectivity to the clients 2420-1, 2420-2, 2420-3, and 2420-4. One kind of the communications provider 2416 is an Internet service provider (ISP) which offers access to the computer network 2406. The ISP connects the clients 2420-1, 2420-2, 2420-3, and 2420-4 using a data transmission technology appropriate for delivering Internet Protocol datagrams, such as dial-up, digital subscriber line (DSL), cable modem, fiber, wireless or dedicated high-speed interconnects. The communications provider 2416 also provides, in some embodiments, messaging services, such as e-mail, instant messaging, and short message service (SMS) texting. Another type of a communications Provider is a network service provider (NSP), which sells bandwidth or network access by providing direct backbone access to the computer network 2406. Examples of network service providers include telecommunications companies, data carriers, wireless communications providers, Internet service providers, cable television operators offering high-speed Internet access, etc.

A data exchange 2418 interconnects the several modules inside INSP 2402 and connects these modules to the clients 2420-1, 2420-2, 2420-3, and 2420-4 via computer network 2406. The data exchange 2418 covers, in various embodiments, a small area where all the modules of INSP 2402 are in close proximity, or covers a large geographic area when the different modules are geographically dispersed. For example, the data exchange 2402 includes a fast Gigabit Ethernet within a cabinet of a data center, or an intercontinental virtual LAN.

It should be noted that in various embodiments, some embodiments described herein are combined with one or more of remaining embodiments described herein.

Embodiments of the present disclosure are practiced with various computer system configurations including hand-held devices, microprocessor systems, microprocessor-based or programmable consumer electronics, minicomputers, mainframe computers and the like. Several embodiments of the present disclosure can also be practiced in distributed computing environments where tasks are performed by remote processing devices that are linked through a wire-based or wireless network.

With the above embodiments in mind, it should be understood that a number of embodiments of the present disclosure employ various computer-implemented operations involving data stored in computer systems. These operations are those involving physical manipulation of physical quantities. Any of the operations described herein that form part of various embodiments of the present disclosure are useful machine operations. Several embodiments of the present disclosure also relate to a device or an apparatus for performing these operations. The apparatus is specially constructed for the required purpose, or the apparatus is a general-purpose computer selectively activated or configured by a computer program stored in the computer. In some embodiments, various general-purpose machines are used with computer programs written in accordance with the teachings herein, or it is more convenient to construct a more specialized apparatus to perform the required operations.

Various embodiments of the present disclosure are embodied as computer-readable code on a non-transitory computer-readable medium. The non-transitory computer-readable medium is any data storage device that can store data, which is thereafter be read by a computer system. Examples of the non-transitory computer-readable medium include hard drives, network attached storage (NAS), read-only memory (ROM), random-access memory, compact disc-ROMs (CD-ROMs), CD-recordables (CD-Rs), CD-rewritables (RWs), magnetic tapes and other optical and non-optical data storage devices. In some embodiments, the non-transitory computer-readable medium include computer-readable tangible medium distributed over a network-coupled computer system so that the computer-readable code is stored and executed in a distributed fashion.

Although the method operations were described in a specific order, it should be understood that in some embodiments, other housekeeping operations are performed in between operations, or operations are adjusted so that they occur at slightly different times, or are distributed in a system which allows the occurrence of the processing operations at various intervals associated with the processing, as long as the processing of the overlay operations are performed in the desired way.

Although various embodiments have been described in some detail in the present disclosure for purposes of clarity of understanding, it will be apparent that certain changes and modifications are practiced within the scope of the appended claims. Accordingly, the present embodiments are to be considered as illustrative and not restrictive, and the various embodiments described in the present disclosure are not to be limited to the details given herein, but are modified within the scope and equivalents of the appended claims.

The invention claimed is:

1. A method for tracking positions of finger portions of a glove, comprising:
    sending, from a head-mounted display (HMD), a power signal to the glove configured to be worn on a user's hand, wherein the finger portions have a plurality of light emitters, wherein the power signal is received by the glove to generate a charge from the power signal, wherein the charge is stored in the glove to for supplying power to the plurality of light emitters;
    detecting, by a plurality of sensors on the HMD, light emitted by the plurality of light emitters of the finger portions for facilitating generation of data, wherein the light is emitted using the power produced from the power signal received by the glove, wherein the plurality of sensors provide a frame of reference for determining one or more positions of one or more of the finger portions of the glove, wherein the one or more positions of the one or more of the finger portions are determined with respect to the frame of reference based on the data; and
    determining changes to the one or more positions of the one or more finger portions with respect to the frame of reference based on additional data, wherein the additional data is generated based on additional light that is generated by the plurality of light emitters and after the additional light is detected by the plurality of sensors on the HMD.

2. The method of claim 1, further comprising:
    mapping the positions of the finger portions of the glove to a plurality of positions of a virtual object representing the finger portions of the glove for display of an image of the virtual object on the HMD.

3. The method of claim 1, further comprising:
    capturing image data of the HMD; and
    determining the frame of reference from the image data of the HMD, wherein the frame of reference provides a position of the HMD in a real-world environment.

4. A method for tracking positions of finger portions of a glove, comprising:
    sending, from a head-mounted display (HMD), a power signal to the glove configured to be worn on a user's hand, wherein the finger portions have a plurality of light emitters;
    detecting, by a plurality of sensors on the HMD, light emitted by the plurality of light emitters of the finger portions for facilitating generation of data, wherein the light is emitted using power produced from the power signal received by the glove, wherein the plurality of sensors provide a frame of reference for determining one or more positions of one or more of the finger portions of the glove, wherein the one or more positions of the one or more of the finger portions are determined with respect to the frame of reference based on the data,
    wherein determining the one or more positions include:
        determining a line along which one of the plurality of light emitters of one of the finger portions is located with respect to one of the plurality of sensors;
        determining another line along which the one of the plurality of light emitters of the one of the finger portions is located with respect to another one of the plurality of sensors; and
        determining that the one of the plurality of light emitters is located at a position at an intersection of the line and the other line; and
    determining changes to the one or more positions of the one or more finger portions with respect to the frame of reference based on additional data, wherein the additional data is generated based on additional light that is generated by the plurality of light emitters and after the additional light is detected by the plurality of sensors on the HMD.

5. The method of claim 1, further comprising:
    sending a synchronization signal from the HMD to one of the finger portions, wherein the synchronization signal has an identifier of one of the plurality of light emitters of the one of the finger portions;
    receiving the synchronization signal;
    determining whether the identifier received within the synchronization signal matches a stored identifier; and
    determining to provide the power from the power signal to the one of the plurality of light emitters in response to an indication that the identifier received within the synchronization signal matches the stored identifier.

6. The method of claim 1, further comprising providing a time delay period after which the power from the power signal is provided to the light emitter.

7. The method of claim 1, wherein the plurality of light emitters are located on a dorsal side of the glove.

8. A system comprising:
    a glove configured to be worn on a hand of a user, wherein the glove has a plurality of finger portions, wherein the finger portions have a plurality of light emitters,
    a head-mounted display (HMD) coupled to the glove, wherein the HMD is configured to send a power signal to the glove, wherein the HMD has a plurality of sensors, wherein the plurality of sensors are configured to detect light emitted by the plurality of light emitters of the finger portions for facilitating generation of data, wherein the light is emitted using power produced from the power signal received by the glove, wherein the plurality of sensors provide a frame of reference, wherein the glove includes:
a receiver configured to receive receiving the power signal; and
a charge storage device configured to generate a charge from the power signal,
wherein the charge storage device is configured to store the charge for supply of the power to the plurality of light emitters; and
a controller coupled to the HMD, wherein the controller is configured to determine one or more positions of one or more of the finger portions of the glove, wherein the one or more positions of the one or more finger portions are determined with respect to the frame of reference based on the data, wherein the controller is configured to determine changes to the one or more of the positions of the one or more finger portions with respect to the frame of reference based on additional data, wherein the additional data is generated based on additional light that is generated by the plurality of light emitters and is detected by the plurality of sensors on the HMD.

9. The system of claim 8, wherein the controller is configured to map the positions of the finger portions of the glove to a plurality of positions of a virtual object representing the finger portions of the glove for display of an image of the virtual object on the HMD.

10. The system of claim 8, wherein the plurality of sensors are configured to generate a plurality of electrical signals from the light, wherein the HMD further includes:
an analog-to-digital converter configured to convert the electrical signals from an analog form to a digital form to generate a digital signal; and
a sampler coupled to the analog-to-digital converter, wherein the sampler is configured to sample the digital signal to generate the data.

11. The system of claim 8, further comprising:
an image capture device configured to capture image data of the HMD, wherein the controller is coupled to the image capture device, wherein the frame of reference provides a position of the HMD in a real-world environment, wherein the controller is configured to determine the frame of reference from the image data of the HMD.

12. A system comprising:
a glove configured to be worn on a hand of a user, wherein the glove has a plurality of finger portions, wherein the finger portions have a plurality of light emitters;
a head-mounted display (HMD) coupled to the glove, wherein the HMD is configured to send a power signal to the glove, wherein the HMD has a plurality of sensors, wherein the plurality of sensors are configured to detect light emitted by the plurality of light emitters of the finger portions for facilitating generation of data, wherein the light is emitted using power produced from the power signal received by the glove, wherein the plurality of sensors provide a frame of reference; and
a controller coupled to the HMD, wherein the controller is configured to determine one or more positions of one or more of the finger portions of the glove, wherein the one or more positions of the one or more finger portions are determined with respect to the frame of reference based on the data,
wherein to determine the one or more positions, the controller is configured to:
determine a line along which one of the plurality of light emitters of one of the finger portions is located with respect to one of the plurality of sensors;
determine another line along which the one of the plurality of light emitters of the one of the finger portions is located with respect to another one of the plurality of sensors; and
determine that the one of the plurality of light emitters is located at a position at an intersection of the line and the other line,
wherein the controller is configured to determine changes to the one or more of the positions of the one or more finger portions with respect to the frame of reference based on additional data, wherein the additional data is generated based on additional light that is generated by the plurality of light emitters and is detected by the plurality of sensors on the HMD.

13. The system of claim 8,
wherein the HMD includes a transmitter configured to send a synchronization signal from the HMD to one of the finger portions, wherein the synchronization signal has an identifier of one of the plurality of light emitters of the one of the finger portions,
wherein the glove includes a receiver configured to receive the synchronization signal,
wherein the glove includes a comparator configured to determine whether the identifier received within the synchronization signal matches a stored identifier; and
wherein the glove includes a switch coupled to the comparator, wherein the switch is configured to provide the power from the power signal to the one of the plurality of light emitters in response to an indication from the comparator that the identifier received within the synchronization signal matches the stored identifier.

14. The system of claim 8, wherein the plurality of light emitters are located on a dorsal side of the glove.

15. A method for determining a position of a wearable object that is occluded, comprising:
wirelessly sending, from a head-mounted display (HMD), a power signal to a storage device of a wearable device, wherein the wearable device has a light emitter and is configured to be worn on a finger of a user's hand, wherein the HMD is configured to be worn on a head of the user and provides a first frame of reference;
detecting, by a plurality of sensors on a torso device, light emitted by the light emitter of the wearable device to facilitate generation of a set of data, wherein the light is emitted by using power stored in the storage device, wherein the torso device provides a second frame of reference; and
determining a position of the finger wearing the wearable device with respect to the first frame of reference based on the set of data and a relative position between the first frame of reference and the second frame of reference.

16. The method of claim 15, further comprising:
detecting, by the plurality of sensors of the torso device, light emitted from a plurality of light emitters on the HMD to facilitate generation of another set of data; and
determining the relative position between the first and second frames of reference based on the other set of data.

17. The method of claim 15, further comprising:
determining a position of the second frame of reference based on inertial sensor data received from the torso device; and
determining a position of the first frame of reference from image data captured by an image capturing device, wherein the image data includes an image of the HMD.

18. The method of claim 15, wherein the light emitter is occluded from a plurality of sensors of the HMD.

* * * * *